US007602723B2

(12) United States Patent
Mandato et al.

(10) Patent No.: US 7,602,723 B2
(45) Date of Patent: Oct. 13, 2009

(54) MODEL FOR ENFORCING DIFFERENT PHASES OF THE END-TO-END NEGOTIATION PROTOCOL (E2ENP) AIMING QOS SUPPORT FOR MULTI-STREAM AND MULTIMEDIA APPLICATIONS

(75) Inventors: Davide Mandato, Fellbach (DE); Andreas Kassler, Lauingen (DE); Teodora Guenkova-Luy, Ulm (DE)

(73) Assignees: Sony Deustschland GmbH, Cologne (DE); Nokia Siemens Networks GmbH & Co. KG, Munich (DE)

( * ) Notice: Subject to any disclaimer, the term of this patent is extended or adjusted under 35 U.S.C. 154(b) by 842 days.

(21) Appl. No.: 10/896,319

(22) Filed: Jul. 21, 2004

(65) Prior Publication Data

US 2005/0157660 A1 Jul. 21, 2005

Related U.S. Application Data

(63) Continuation-in-part of application No. PCT/EP03/00309, filed on Jan. 14, 2003.

(30) Foreign Application Priority Data

Jan. 23, 2002 (EP) ................................ 02001600
Jan. 28, 2002 (EP) ................................ 02001900

(51) Int. Cl.
*H01R 31/08* (2006.01)

(52) U.S. Cl. .................................................. 370/236

(58) Field of Classification Search ................. 370/252, 370/395.2, 395.21, 229–240
See application file for complete search history.

(56) References Cited

U.S. PATENT DOCUMENTS 6,354,748 B1 * 3/2002 Vrvilo ........................ 709/204

(Continued)

FOREIGN PATENT DOCUMENTS

EP 1 067 736 1/2001

(Continued)

OTHER PUBLICATIONS

Mandato D.: "Deliverable 1.2—Concepts for Service adaption, scalability and QoS handling on mobility enabled networks" Mar. 31, 2001, IST—Information Society Technologies, IST-1999-10050 Brain XP002202057.

(Continued)

*Primary Examiner*—Kwang B Yao
*Assistant Examiner*—Tung Q Tran
(74) *Attorney, Agent, or Firm*—Oblon, Spivak, McClelland, Maier & Neustadt, L.L.P.

(57) ABSTRACT

The underlying invention generally relates to the field of mobile computing in a networking environment with distributed multimedia applications and technologies. More specifically, it is directed to the concept of the End-to-End Negotiation Protocol (E2ENP) phases, which enable a pre-negotiation (802, 804, 805), fast negotiation (806) and a fast, dynamic renegotiation (808) of the end-to-end quality and capabilities for telecommunication sessions (102), for multiple configurations of two or a multiplicity of end peers and/or intermediate components in a consistent, reliable, and incremental way by enabling the mobile users' applications to efficiently and timely react to QoS violations. In this context, the invention proposes a model for defining user profiles and terminal capability information in such a way that hierarchical QoS contract specifications (1108), e.g. compelling correlations (804) across different sets of QoS contracts (1108) for related media streams (206), can be enforced and used for deriving negotiable information. As a reference implementation of this concept, this invention proposes a novel usage of the Session Initiation Protocol (SIP, 910) standardized by the Internet Engineering Task Force (IETF) in conjunction with extensions of the Session Description Protocol Next Generation (SDPng, 912) specification based on the Extensible Markup Language (XML) in order to implement concepts of the End-to-End QoS Negotiation Protocol (E2ENP, 908).

44 Claims, 15 Drawing Sheets

800

U.S. PATENT DOCUMENTS

| | | | | |
|---|---|---|---|---|
| 6,707,820 | B1 * | 3/2004 | Arndt et al. | 370/395.2 |
| 2005/0272438 | A1 * | 12/2005 | Holur et al. | 455/452.2 |
| 2006/0185010 | A1 * | 8/2006 | Sultan | 726/12 |

FOREIGN PATENT DOCUMENTS

| | | | | |
|---|---|---|---|---|
| EP | 1 158 740 | | | 11/2001 |
| EP | 1 213 895 | B1 | | 6/2002 |
| EP | 1248431 | | * | 9/2002 |

OTHER PUBLICATIONS

Mandato D.: "Presentation: Concepts of Service Adaption, Scalability, and QoS Handling on Mobility enabled Networks" Sep. 10, 2001, IST—Information Society Technologies, IST Mobile Communication Summit 2001, XP002205058.

Kutscher et al: "Session Description and Capability Negotiation" Nov. 21, 2001, IETF, Internet Engineering Task Force XP002205059.

Neureiter G et al: "The BRAIN quality of service architecture for adaptable services with mobility support" IEEE International Symposium on Personal, Indoor and Mobile Radio Communications, XX, XX, vol. 1, Sep. 18, 2000, pp. 445-450, XP002168301.

Chao-Ju Hou et al: "Communication middleware and software for QoS control in distributed real-time environments" Computer Software and Applications Conference, 1997, COMPSAC '97. Proceedings., The Twenty-First Annual International Washington, DC, USA Aug. 13-15, 1997, Los Alamitos, CA, USA, IEEE Comput. Soc, US, Aug. 13, 1997, pp. 558-561, XP010247361.

Ott M et al: "An architecture for adaptive QoS and its application to multimedia systems design" Computer Communications, Elsevier Science Publishers BV, Amsterdam, NL, vol. 21, No. 4, Apr. 10, 1998, pp. 334-349, XP004115276.

Campbell A T et al: "Programmable Mobile Networks" Computer Networks and ISDN Systems, North Holland Publishing. Amsterdam, NL, vol. 31, No. 7, Apr. 8, 1999, pp. 741-765, XP000700300.

* cited by examiner

900

1200

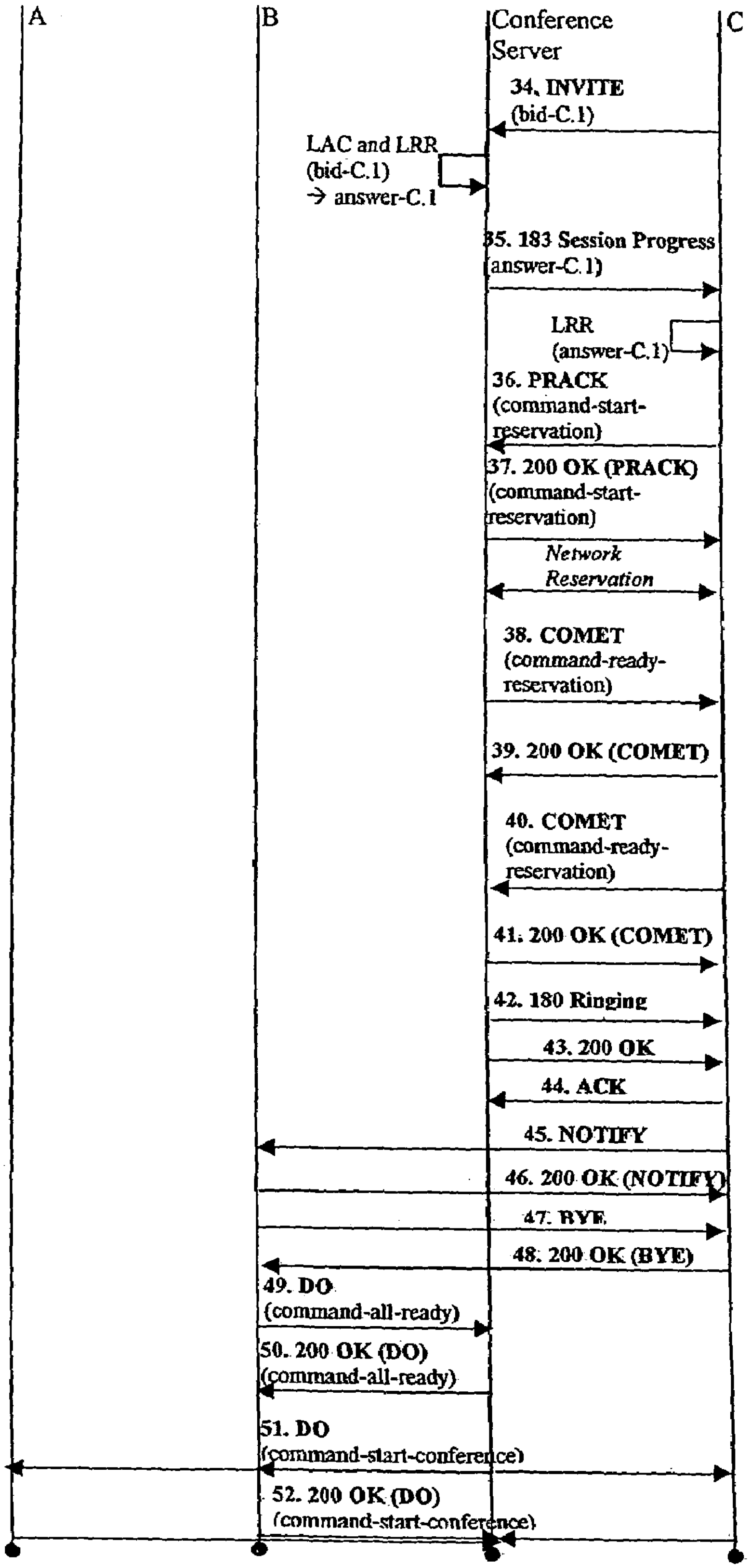
Fig. 13c Example of a many-to-many scenario

MODEL FOR ENFORCING DIFFERENT PHASES OF THE END-TO-END NEGOTIATION PROTOCOL (E2ENP) AIMING QOS SUPPORT FOR MULTI-STREAM AND MULTIMEDIA APPLICATIONS

FIELD AND BACKGROUND OF THE INVENTION

This is a continuation-in-part of copending International Application PCT/EP03/00309 having an international filing date of 14 Jan. 2003.

The underlying invention generally relates to the field of mobile computing in a wireless mobile networking environment with distributed multimedia applications and technologies. More specifically, it is directed to the field of Quality-of-Service (QoS) management for adaptive real-time services running on mobile devices which support different access technologies in dynamic wireless Internet Protocol (IP) networks, thereby including research and development issues which are especially related to multimedia middleware and resource reservation mechanisms. In this context, the invention proposes a model for defining user profile and terminal capability information in such a way that hierarchical QoS contract specifications (e.g. compelling correlations across different sets of QoS contracts for related media streams) can be enforced and used for deriving negotiable information.

As a reference implementation of this concept, this invention proposes a novel usage of the Session Initiation Protocol (SIP) standardized by the Internet Engineering Task Force (IETF) in conjunction with extensions of the Session Description Protocol Next Generation (SDPng) specification based on the Extensible Markup Language (XML) in order to implement End-to-End QoS Negotiation Protocol (E2ENP) concepts. The concept of the proposed solution according to the underlying invention is based on a proposal which has originally been identified in "Concepts for Service Adaptation, Scalability and QoS Handling on Mobility-Enabled Networks" (IST1999-10050 BRAIN Deliverable 1.2, Mar. 31, 2001, http://www.ist-brain.org/), in the following referred to as [BRAIN], along with a specific reference architecture. In this context, a set of basic requirements shall be derived. Thereby, a discussion shall be opened concerning this set of requirements and the choice of an optimal solution with regard to said requirements.

The Internet has proven to be a successful architecture for delivering a broad set of electronic services (including—among many others—telephony, electronic messaging, and audio/video services), not only to sedentary but also to nomadic users. Micro and macro IP mobility and wireless IP technologies in fact pave the way to the full integration of the Internet with the second and third generation of mobile phone systems. In order to achieve this object, next generation IP networks and applications will have to address the increasingly important challenges of wireless access, mobility management, the provision of Quality of Service (QoS), and multimedia services.

A paramount problem that mobile users will most likely face within this context is how to cope with limited amount resources at the end systems and in the network, and unstable environment conditions. Mobile users are in fact expected to incur more frequently on the unfortunate case of haying their QoS contracts being no longer supported by the network infrastructure, due to various reasons like: wireless link quality degradations, horizontal and/or vertical-handovers, limited amount of mobile terminal resources. In the rest of this document, these unfortunate cases shall be referred to as "QoS violations". By assuming proper resource overprovision in the backbone, it can be expected that QoS violations will most likely originate in the access network, especially in the radio part thereof.

Furthermore, mobile multimedia applications dealing with multiple media streams of information being exchanged simultaneously with a multiplicity of peers will require an effective and efficient way of handling QoS requirements, especially in front of the aforementioned unstable environment conditions.

A possible way of coping with unstable environment conditions is to enable the mobile users' applications to efficiently and timely react to QoS violations, by planning counteractions ahead. Peers can in fact negotiate off-line various alternative QoS contracts at different levels of abstraction, so that at connection establishment time and whenever QoS violations occur, agreements on how to most effectively adapt to the mutated conditions can be timely reached among the peers.

Furthermore, peers can follow a specific procedure for effectively enforcing the pre-negotiated QoS contracts, by avoiding to request any network resource reservation before local resources at all the involved peers have been determined and reservations thereof have been accordingly made. This procedure is further addressed as "Economy Principle".

The overall solution combining the above-mentioned two planning mechanisms shall now be called "End-to-End Negotiation Protocol" (E2ENP).

In particular, it should be noted that the negotiation of capabilities (e.g. codecs) is hereby regarded as a separate issue, complementary to the negotiation of user's QoS preferences and profile information. Intelligent, adaptive applications and/or middleware can thus make effective use of any such information negotiated end-to-end by the peers in order to choose the best adaptation strategy in reaction to a given QoS violation as described in [BRAIN].

BRIEF DESCRIPTION OF THE PRESENT STATE OF THE ART

According to the state of the art, different methods and technologies are currently available concerning the problem of QoS management in mobile environments, which are closely related to the topic of the underlying invention. In order to understand the context of the invention, it is necessary to briefly explain the main features involved with said technologies.

In the European patent application EP 01 122 366.6, the E2ENP protocol has been introduced and described in detail. Said invention presents a framework for achieving dynamic end-to-end QoS negotiation and control coordination for distributed multimedia applications. The framework builds upon dynamic capability negotiation and specification of adaptation paths and (alternative) QoS contracts based on user preferences. In, particular, a protocol is presented providing end-to-end negotiation of alternative QoS, capabilities, preferences and/or configurations based on extensions of IP-based protocols like SIP, RTSP and/or SDP, in coordination with mechanisms for network resource reservation (e.g. RSVP), local terminal resource reservation (e.g. CPU, memory, power, auxiliary devices) and adaptation mechanisms. To this extent, and with respect to two or more peers, six phases are identified by which peers are enabled to establish multi-party, multi-stream and/or multimedia communications. In detail, these phases are protocol discovery, pre-negotiation, multi-stream time synchronization and QoS correlation, fast-negotiation (obeying the economy principle), re-negotiation (obeying the economy principle), and resource reservation and/or release. All these six phases can be concatenated or executed at different times.

In “Concepts for Service Adaptation, Scalability and QoS Handling on Mobility-Enabled Networks” [BRAIN], the foundations of the E2ENP concept is presented.

In “RTP Payload for Redundant Audio Data” (RFC 2198, Network Working Group, September 1997) by C. Perkins et al., in the following referred to as [RFC2198], and “RTP Profile for Audio and Video Conferences with Minimal Control” (Columbia University, work in progress, <draft-ietf-avt-profile-new-09.txt>) by H. Schulzrinne et al., in the following referred to as [RTP-Profile], the possibilities of quick re-negotiations via in-band signaling are described. However, this kind of signaling concerns only changes of codecs and the redundant support of differently coded media without considering the respective effects when QoS should be supported.

In “Integration of Resource Management and SIP—SIP Extensions for Resource Management” (IETF SIP Working Group, work in progress, <draft-ietf-sip-manyfolks-resource-01.txt>) by W. Marshall et al., in the following referred to as [SIPRES01], and “SIP Extensions for Resource Management” (IETF Draft, November 2000, <draft-ietf-sip-many-folks-resource-00>) by W. Marshall et al., in the following referred to as [Marsh00], the authors present a multi-phase call-setup mechanism that makes network QoS and security establishment a precondition to sessions initiated by the Session Initiation Protocol (SIP) and described by the Session Description Protocol (SDP). Network resources are reserved before the session is started using existing network resource reservation mechanisms (like RSVP). The resource management protocol is interleaved between two phases of call signaling and participants are invited after resources are available in the network. A confirmation of the preconditions is explicitly signaled. Resource management is done only for the network resources. An extension to SDP is introduced to determine whether the preconditions are met. However, [SIPRES01] and [Marsh00] do not consider pre-negotiation of QoS and the integration of local and peer resource management.

In “Confirmation of SDP Preconditions” (IETF Internet Draft, work in progress, <draft-camarillo-manyfolks-confirm02.txt>) by G. Camarillo, in the following referred to as [Cama00], an additional direction attribute is introduced to indicate which party sends the confirmation of the preconditions. Finally [Cama00] provides a mechanism to perform third party call control in SIP when SDP preconditions are used. However [Cama00], does not consider pre-negotiation of QoS and the integration of local and peer resource management.

In “A Syntax for Describing Media Feature Sets” (RFC 2533, 5GM/Content Technologies, March 1999) by G. Klyne, in the following referred- to as [RFC2533], the author presents a format to express media feature-sets that represent media handling capabillities. In addition, an algorithm is provided that matches the feature sets. It might be used to determine if the capabilities of a sender and receiver are compatible. This matching algorithm is improved in “A revised media feature set matching algorithm” (IETF Media Feature Registration WG, work in progress, <draft-klyne-conneg-feature-match- 02.txt>) by G. Klyne (ed.), in the following referred to as [Conneg00]. In addition, in “Identifying Composite Media Features” (IETF Conneg Working Group, work in progress, <draft-ietf-conneg-feature-hash-05.txt>) by G. Klyne (ed.), in the following referred to as [Conneg00a], an abbreviated format for composite media feature sets is described that use a hash of the feature representation to describe the composite. This can be used to provide an abbreviated form for referencing an arbitrary feature set expression, independent of any particular mechanism for de-referencing. [RFC2533] together with [CONNEG00] and [CONNEG00a] or “SDP Simple Capability Negotiation Requirements” (IETF MMUSIC Working Group, work in progress, <draft-andreasen-mmusic-sdp-simcap-reqts-00.txt>) by F. Andreasen, in the following referred to as [SDPCN01], do neither integrate existing Internet protocols, nor include the concept of pre-negotiating alternative QoS contracts, nor integrate local-, network- and peer-resource reservation mechanisms.

In “SDP Simple capability negotiation” (IETF MMUSIC Working Group, work in progress, <draft-andreasen-mmusic-sdp-simcap00.txt>) by F. Andreasen, in the following referred to as [SDPCN00], the author states the requirement that a capability set should contain a handle (similar to the hash mentioned above) allowing for easy referencing of the capability set.

In “Protocol-Independent Content Negotiation Framework” (RFC 2703, 5GM/Content Technologies, September 1999) by G. Klyne, in the following referred to as [RFC2703], the author presents an abstract framework for a protocol-independent content negotiation for the resources with which it interacts. It does however not provide the content negotiation process. It identifies the need for expressing the capabilities of the sender and the data resource to be transmitted, the capabilities of the receiver and the need for a protocol to exchange these capabilities. Negotiation is carried out by a series, of negotiation metadata exchanges. The negotiation stops, as soon as a specific data file to be transmitted has, been found. The sender transfers the data if the sender determines the file, otherwise the receiver informs the sender. This proposal therefore relates to content negotiation, instead of dealing with pre-negotiation of configurations QoS contracts and capabilities. The solution proposed in [RFC2703] also does not integrate local-, peer-, as well as network-resource reservation.

In “An Offer/Answer Model with SDP” (IETF Internet Draft, work in progress, <draft-rosenberg-mmusic-sdp-offer-answer00.txt>) by J. Rosenberg and H. Schulzrinne, in the following referred to as [SDPOA00], a complete model for one-to-one capabilities negotiation with SDP is described. However, this model has problems by the definition of mutually referred information and information on grouping media streams because of the flat-hierarchy structure of the SDP. Additionally this model concerns only capability negotiation but no QoS support.

In “Requirements for Session Description and Capability Negotiation” (IETF Internet Draft, work in progress, <draft-kutscher-mmusic-sdpng-req-01.txt>) by D. Kutscher et al., in the following referred to as [SDPNG01], the requirements of a framework dealing with session description and end-point capability negotiation in multi-party multimedia conferencing scenarios are identified. Thereby, said document provides a set of requirements relevant for a framework for a session description and an end-point capability negotiation in multi-party multimedia conferencing scenarios. Depending on user preferences, system capabilities or other constraints, different configurations can be chosen for the conference. The need of a negotiation process among the peers is identified, but not described in order to determine a common set of potential configurations and to select one of the common configurations to be used for information exchange. This capability negotiation is used to get a valid session description compatible with the end system capabilities and user preferences of the potential participants. Different negotiation policies may be used to reflect different conference types. They also identify the need for network resource reservation coupled with session setup. Finally a proposal is drafted for describing capabilities and providing the negotiation language but not a protocol. However, the solution proposed in [SDPNG01] does neither consider the negotiation protocol for determining a common set of QoS configuration nor integrate local, peer and network resource reservation. In addition, it does neither integrate the process of referencing configurations by handles, nor build upon the QoS contract concept. Moreover, said solution deals only with codec negotiation, without considering terminal capabilities and network resource reservation mechanisms.

The most recent version of this IETF draft, "Session Description and Capability Negotiation" (IETF Internet Draft, work in progress, <draft-ietf-mmusic-sdpng-03.txt>) by D. Kutscher et al., in the following referred to as [SDPNG03], provides detailed XML Schema specification and a prototype of the Audio Codec and RTP Profiles. Compared to such a latest, more complete version of this IETF proposal, the E2ENP features (as an extension of that proposal):

- notion of the E2ENP phases,
- new SDPng sections and various configurations thereof, according to the format of the PDUs associated with the various E2ENP phases,
- use of explicit <session> element in the new <purpose> section, instead of the <owner> element in the <conf> section (which still remain, but for other purposes),
- the negotiation and use of session identifiers derived (e.g. via hash) from the <session> in order to limit the size of E2ENP PDUs, in which the <session> (with a calculated hash) is used in the first PDU of any given E2ENP phase or concatenation thereof.
- leasing of negotiated information,
- concatenation of negotiated information,
- the original <def> now substituted by the new <qosdef> sections,
- support of any type of network and/or protocol version in the <cfg> section,
- extensions to the Audio Codec and RTP Profiles,
- possibility to model QoS correlation and time synchronization constraints at any level of abstraction, for a local enforcement of the given terminal device or for delegating this to a third-party component (e.g. conference bridge),
- handling of third-party-assisted negotiation scenarios, and
- handling of video-codec information.

The two documents "Connection-Oriented Media Transport in SDP" (IETF MMUSIC Working Group, work in progress, <draft-ietf-mmusic-sdp-comedia-01.txt>) by D. Yon, in the following referred to as [SDPC00], and [SDPNG03] identify the necessity of defining which of the communication parties are with respect to the connection mode—sender, receiver or sender-receiver. Additionally, [SDPC00] identifies the necessity of denoting that a single port might be used for sending or receiving of the differently coded media with the same content. This respective definition with SDP is problematic because of the flat structure of the protocol, on the other hand, SDPng as described in [SDPNG03] with an XML-schema can perform cross references for the respective description. For the needs of QoS negotiations the identification of the sender and/or the receiver parties may serve the speeding up of the negotiation by choosing the most appropriate negotiation mode (push, pull or push-pull).

The author of [SDPCN00] proposes a set of SDP extensions providing a minimal and backward compatible capability negotiation mechanism. [SDPCN00] adds SDP extensions for capability negotiation, only.

In "Codec capabilities Attribute for SD" (IETF Internet Draft, work in-progress, <draft-beser-mmusic-capabilities00.txt>) by B. Beser, in the following referred to as [Beser00], the author extends SDP so that the end-points know the codec choices and can agree on a common set. The communication partner can thus obtain the originators capabilities and preferences. However, the solution proposed in [Beser00] only provides SDP extensions necessary for end-points to negotiate codecs.

In "capability Description for Group Cooperation" (IETF Internet Draft, work in progress, <draft-ott-mmusic-cap00.txt>) by J. Ott et al., in the following referred to as [Ott99], a notation for describing potential and specific configurations of end systems in multi-party collaboration sessions is given. This enables mechanisms to define end system capabilities, calculate a set of common capabilities and to express a selected media description for use in session descriptions. They do not provide a protocol for capability exchange. However, the solution proposed in [Ott99] only provides a notation for configuration description.

In "Simple Conference Control Protocol" (IETF Internet Draft, work in progress, <draft-ietf-mmusic-sccp-01.txt>) by C. Bormann et al., in the following referred to as [Bor00], the authors define services for a simple conference control protocol (SCCP) for tightly coupled conferences. Member management, application/session management and access control rules for distributed application resources are defined. The conference's state, which might be established using SIP, is managed during the lifetime using SCCP. This includes the finding of appropriate configurations, negotiating for configurations and changing the configuration. However, no interaction with local- and network-resource management is intended. The SCCP also does not cover the handling of QoS contracts and how to pre-negotiate configurations thereof.

The document "The QoS Broker" (IEEE Multimedia-Magazine, Spring 1995 (2)1, pp. 53-67) by K. Nahrstedt and J. M. Smith, in the following referred to as [Nahr95], presents a model for an end-point architecture based on a QoS Broker, which is a functional entity that orchestrates resources at the endpoints and co-ordinates resource management across layers. In order to configure the system properly, the broker uses admission control and negotiation. Negotiation among peer entities leads to a valid configuration, which involves all necessary components of the communication system. The model described in [Nahr95], however, does neither integrate existing Internet protocols nor considers other resources like battery power or wireless sub-network availability.

In "SIP Requirements for Support of Multimedia and Video" (IETF Internet Draft, work in progress, <draft-levin-sip-for-video-00.txt>) by O. Levin, in the following referred to as [Levin01], presents a set of requirements for a call-control protocol for real-time multimedia support over IP. capabilities have to be expressed, capabilities have to be signaled to identify the amount of resources that are necessary, and a call control mechanisms is needed to open/close/modify media streams within the boundaries set forth by capabilities and reserved resources. Also they propose to announce new capabilities (if available) during a session. In addition, the peers have to agree on a common set of codecs to be used. A session control mechanism to start/stop the media streams is put as a requirement.

However, [Levin01] does not consider the integration of local, remote and network resource management into a coherent framework; rather, [Levin01] only provides requirements. Neither protocols nor mechanisms to enforce the requirements are proposed.

In the documents

"Concepts for Service. Adaptation, Scalability and QoS Handling on Mobility-Enabled Networks" [BRAIN], "QoS Support for an All-IP System Beyond 3G" (IEEE Communication Magazine, August 2001, Vol.39, No.8) by T. Robles, A. Kadelka, H. Velayos, A. Lappetelainen, A. Kassler, H. Li, D. Mandato, J. Ojala and B. Wegmann, in the following referred to as [Roble01], "BRENTA—Supporting Mobility and Quality of Service for Adaptable Multimedia Communication" (in: Proceedings of the IST Mobile Communications Summit 2000, Galway, Ireland, October 2000, pp. 403-408) by A. Kassler et al., in the following referred to as [Kassl00], and "An Open Endsystem Architecture for Adaptable Multimedia Services with QoS Support" (in: Proceedings of the BRAIN workshop, London, 2000) by A. Kassler et al., in the following referred to as [Kassl00a], an end system architecture has been presented that integrates local, peer and network resource reservation into a framework for end-to-end QoS management, in which user Preferences and adaptation paths are used together with QoS states to negotiate QoS at application level. Interaction with local resource management is introduced. The layered architecture provides support for different types of applications.

The Three Documents

"Concepts for Service Adaptation, Scalability and QoS Concepts on Mobility-Enabled Networks" (IST Global Summit 2001, Barcelona, September 2001, pp. 285-293) by D. Mandato, A. Kassler, T. Robles, G. Neureiter, in the following referred to as [Manda00], "Handling End-to-End QoS in Mobile Heterogeneous Networking Environments" (PIMRC 2001, San Diego, Sep. 30, 2001 to Mar. 10, 2001, pp. C-49-C-54) by D. Mandato, A. Kassler, T. Robles and G. Neureiter, in the following referred to as [Manda00a], and "Grouping of Media Lines in SDPII (IETF Internet Draft, work in progress, <draft-ietf-mmusic-fid-04.txt>) by G. Camarillo et al., in the following referred to as [Cama01], discuss the possibility of grouping of media streams but do not consider criteria for the grouping, the possibility of recursive group building (a group of many groups) and the treatment of real, pseudo-real and non-real time information media streams that also may be grouped. Besides, [Manda00] and [Manda00a] define negotiation steps that may or may not run at one shot, but not independent phases and have no requirement for the consistency of the negotiated QoS information during a negotiation phase and after it. Thereby, in [Manda00] the core concepts of the E2ENP are disclosed. The treatment of colliding "economy principle" applications is also not considered. Furthermore, [Manda00] and [Manda00a] describe the possibility of setting and managing adaptation paths for the QoS adaptation, which is controlled by a third party component (QoS-Broker). The possibility that the end-parties perform and control the negotiations on their own is not considered.

In "A Framework for End-to-End user Perceived Quality of Service negotiation" (IETF Internet Draft, work in progress, <draft-bos-mmusic-sdpqos-framework-00.txt>) by L. Bos et al., in the following referred to as [Bos01], an end-to-end user-perceived QoS negotiation is described, with the presumption that some intermediate components and services may strongly be involved in the end-decision about the negotiated QoS-information of the end peers. The decision as described may be taken over some standard "contract types". Although it is mentioned that the signaling and the data path may go different ways through the network, it is suggested that some intermediate components on the way of the negotiation path may influence the negotiation though in general having nothing to do with the data-paths. By this protocol model the network is not transparent. The negotiation process according to [Bos01] is performed at one shot interleaving also with some non-QoS information (e.g. security, network admittance, etc.), no protocol modularity and information consistency with respect to QoS are considered. With the model of [Bos01], it is only possible to use push mode for the negotiation, which may be restrictive for some applications and services. The adaptation paths are only degrading ("Degradation Path") and fixed. (There is no possibility to perform different transitions between the agreed QoS contracts.) The model of [Bos01] suggests negotiations of QoS only on media stream level without considering some media stream dependencies like groups and media stream hierarchies.

In "Fundamental Questions Regarding End-to-End QoS" (work in progress, <draft-bergsten-e2eqos-questions-00.txt>) by A. Bergsten, K. Nemeth, I. Cselenyi and G. Feher, in the following referred to as [Berg01], a list of key questions (actually, real requirements) are proposed. More specifically, "1) the exchange of QoS-related information and 2) enforcement of QoS-related decisions" are indicated as "enhancements required in order to provide predictable end-to-end QoS". The E2ENP meets both these requirements, insofar as it defines an application-level protocol dealing with the first requirement, and enforces resource management according to the economy principle.

More specifically, with respect to the second requirement, the E2ENP assumes the existence of the Extended Socket Interface (ESI), described in [BRAIN] and [Roble01], in which details of network resource management are hidden to applications. This means that the ESI offers a level of abstraction, upon which QoS-aware middleware and applications can be built. Should however the ESI not be available, the E2ENP assumes that applications and/or middleware will be able to derive network-level QoS contracts from high-level QoS contracts, as well as use low-level monitored information for triggering application and/or middleware QoS adaptation mechanisms.

More specifically, in [Bergol] the following five points are mentioned:

1. "The access network: The probability of congestion is the highest in the access network, thus it is very likely that some kind of mechanism supporting the QoS information is necessary here." This is exactly the assumption made in [BRAIN], [Roble01] (from which the original concept of E2ENP originates), in which the ESI abstraction allows applications and/or middleware (leveraging the E2ENP), not only to use in general any kind of network architecture available, but also (more particularly) to make a similar assumption concerning the access network.
2. "End-to-end signaling between applications: It shall be assumed that a high level information exchange must be the first of QoS session initiation in several cases." This is exactly one of the requirements that the E2ENP targets. In addition, the E2ENP deals with proactive pre-negotiations of alternative QoS contracts, and of higher-level QoS contracts as well. The E2ENP furthermore offers in addition a full-blown set of procedures for handling re-negotiations.

3. "Inter-domain communication, particularly on peering link: An automatic service announcement is needed, something like BGP, but with QoS enhancements. In addition, it is considerable to have a mechanism, which actually provides inter-domain provisioning of these resources." The E2ENP is a pure end-to-end application-level protocol, in which only the peers (and eventually some intermediate components, like conference bridges or transcoders) are directly involved. Lower level functionality dealing with intra- and/or inter-domain network resource management and routing is hidden to the E2ENP, thanks to the ESI, or equivalent abstraction. This means that the E2ENP is a pure application-level protocol, which peers can use to communicate over any network architecture.
4. "Identifying, which customer to penalize in case of a network congestion: When a sever congestion occurs and a contract has to be breached, it should be under the control of the network." The E2ENP is compatible with this requirement, since the E2ENP assumes that the detection of QoS violation is carried out by the underlying network architecture.
5. "Providing requirement information for customers: Customers could inform the service providers about the current and intended network utilization, specifying e.g. the expected destinations and traffic volumes. The operator could then use this knowledge to dimension its network better, and also to calculate the amount of services to buy from the neighboring operators." This is exactly the assumption made in [BRAIN] and [Roble01], from which the original concept of E2ENP originates.

More specifically, users can not only provide "current and intended network utilization, specifying for example the expected destinations and traffic volumes" in terms of application-level QoS contracts pre-negotiated with the network provider (during the process described below), but also exchange with peers sets of alternative QoS contracts (the APs), and at different levels of abstractions, so as to take into account inter-media stream relationships (with APs as well).

Finally, in [Berg01] the need of having peers agreeing with their network providers about the type of Quality of Service along with pricing information is described, before any session establishment. This is similar to the process described above, where the user specifies the Application-level QoS information which eventually gets mapped to network level QoS contracts validated against pre-arrangements with the network provider, or via direct communication with the latter. How these low-level processes are accomplished in the scope of E2ENP, thanks to the ESI abstraction (or similar functionality).

The three documents

"Conferencing Using SIP" (IETF Internet Draft, work in progress, <draft-khartabil-sip-conferencing-00.txt>) by H. Khartabil, in the following referred to [Khart01], "Models for Multi-party Conferencing in SIP" (IETF SIPPING Working Group, work in progress, <draft-rosenberg-sip-conferencing-models-01.txt>) by J. Rosenberg and H. Schulzrinne, in the following referred to as [Rosen01], and "Models for Multi-party Conferencing in SIP" (IETF SIPPING Working Group, work in progress, <draft-ietf-sipping-conferencing-models-00.txt>) by J. Rosenberg and H. Schulzrinne, in the following referred to as [Rosen00a], introduce models for multi-party conferencing which consider scenarios like one-to-many and many-to-many connections. The described models take advantage of a centralized architecture using conference server. In this case, there is no direct end-to-end communication between the end peers and the application of E2ENP could be performed in several different ways:

direct signaling between the end peers, data path over the conference server, indirect signaling between the end peers over the conference server, direct data connection between the end peers, and indirect signaling between the end peers over the conference server and data path over it.

Such application of E2ENP may require different message sequences and E2ENP-structure for every different scenario. The models of [Khart01], [Rosen01] and [Rosen00a] are mainly concerned with the description of the message sequences by a conferencing scenario using a centralized component. By necessary capabilities- and/or QoS-negotiations and respective reservations these sequences may undergo changes if E2ENP should also be applied to such scenarios. The advantage of E2ENP application in a scenario with some centralized components is that the communication model can be reduced to one-to-many scenario.

In the following, a number of terms needed for the definition of the claims and the description of the underlying invention, shall be given.

Adaptation Path: An ordered set of QoS contracts indicating user's specific preferences and wishes that can be used for allowing applications and/or middleware to take adaptation strategies in a pre-planned way. Typically, the most important QoS contract (i.e. the one the system should try to enforce by default) is the first one indicated in the path. Additionally, an AP may include the specification of rules defining the circumstances under which the system should enforce a different QoS contract, out of the given set thereof.

Association: A group of media streams associated with a given peer. As sub-case of media streams grouping, an Association groups all the media streams originating from and/or terminating on the given user's terminal device, and connecting to a given peer within the given session. Therefore, the specification of an association shall include an identifier of the peer (e.g. a URL, a phone number, or a pair of IP-address and port number).

Answerer: The answerer is a participant of a SIP session which generates a response to a proposed multimedia session description of an offerer (see below). The response contains a description of the conditions under which the proposed session description of the offerer can be supported. [SDPOA00]

Association or Groups Adaptation Paths: Modeled as an adaptation path, a configuration of alternative associations or groups, along with their QoS contexts and steam-level QoS contracts, can be used for allowing applications and/or middleware to take adaptation strategies in a pre-planned way.

Capability: Associated with a hardware and/or software profile of a terminal-device, a capability describes the ability of this device to perform certain tasks and/or handle certain information-types. A single-capability may be associated with ascertain amount of hardware and/or software resources (each handling a given information type). A capability associated with a given single type of information can be used to present this information at one or many QoS levels. On the other hand a given QoS level can be associated with different capability sets (e.g. different codecs can produce one and the same QoS level as seen from the application).

Connection Mode: The connection mode refers to an actual data media stream exchanged by the peers. This information is the media (audio, video, etc.) directly perceivable by the end user. The connection mode states who are the sender and who are the receiver parties of the media streams.

Data Path: The network path taken by the media data (audio, video, text, etc.).

Economy Principle: The economy principle dictates the order of resource reservation. As network resources are shared and are thus more expensive as terminal resources, it is better to first reserve resources on all terminals and then proceed with network resource reservation.

End-to-End QoS Pre-Negotiation: A process that end peers can perform before the actual start of a session, and independently of the session itself, for exchanging—in a non-obliged manner—information about configurations of QoS specifications, deduced from their QoS-profiles. These configurations include-adaptation paths, so that the end peers can proactively agree on the way to react to possible QoS changes or QoS violations in an effective and efficient manner. The pre-negotiation massage-exchange has informational character for the end peers, and is used not only for informing each other ahead about the capabilities and performance possibilities applicable to the given set of peers, but also for reaching agreements on redefining some of those configurations. In this way, the peers are thus able to establish a common vocabulary, a priori of any specific business. The results of this process are scoped in time, and can be used multiple times within their validity interval.

End-to-End QoS Compact Negotiation: A process that end peers can perform either before or at the actual start of a session in order to agree on a given QoS level to be enforced for the given session and media streams, based on results of a previously applied end-to-end QoS pre-negotiation process, (assumed the validity of those results still applies at the time this process is run). This process is considerably faster compared to the case of the end-to-end QoS full negotiation, since only references of pre-negotiated information are actually exchanged among peers. At completion of the end-to-end QoS compact negotiation process, the end peers have agreed on the QoS-profiles they are going to use for the communication.

End-to-End QoS Full Negotiation: A process that end peers can perform either before or at the actual start of a session in order to agree on a given QoS level to enforce for the given session and media streams, eventually by redefining some of the originally proposed configurations of QoS specifications. At completion of the end-to-end QoS compact negotiation process, the end peers have agreed on the QoS profiles they are going to use for the communication.

End-to-End QoS Compact Re-Negotiation: A process that end peers can trigger upon detection of either a QoS change or a QoS violation in order to agree on a given QoS level to be enforced for the given session, based on results of a previously applied end-to-end QoS pre-negotiation process, (assumed the validity of those results still applies at the time this process is run). This process is considerably faster compared to the case of the end-to-end QoS full re-negotiation one, since only references of pre-negotiated information are actually exchanged among peers. At completion of the end-to-end QoS compact re-negotiation process, the end peers have agreed on new QoS-profiles they are going to use for the communication.

End-to-End QoS Full Re-Negotiation: A process that end peers can trigger upon detection of either a QoS change or a Qos violation in order to agree on a given QoS level to be enforced for the given session and media streams, eventually by redefining some of the originally proposed configurations of QoS specifications. At completion of the end-to-end QoS full re-negotiation process, the end peers have agreed on new QoS-profiles they are going to use for the communication.

Flow: A flow is a set of packets passing an observation point in the network during a certain time interval. All packets belonging to a particular flow have a set of common properties derived from the data contained in the packet and from the packet treatment at the observation point as described in "Requirements for IP Flow Information Export" (see <draft-ietf-ipfix-reqs-00.txt>) by J. Quittek et al., in the following referred to as [Quit00]. As an example, all packets for a given flow should have the same. 5-tuple (protocol ID, source network address, destination network address, source port number, destination port number). Simple media streams (i.e. those without multiplexed layers) and layers get mapped to flows at transport layer, where they are used for reservation. One flow can carry one layer of a given media stream, or a given simple media stream en-bloc.

Group of Media Streams: Based on various criteria, media streams can be logically grouped for enforcing some constraints, e.g. grouping all audio media streams for enforcing translation, grouping all media streams opened by a given user on a multi-user terminal in order to enforce quotas. A group may also contain only one media stream. Groups are useful for representing bundles of Media streams, which QoS-aware applications can handle as a whole when trading off quality to resource availability, among a multiplicity of equivalent bundles and within a given QoS context. Each group is associated with a QoS context.

Intermediate Components: The intermediate components are any network components situated on the signaling and/or the data path between two end-devices (terminals) which can understand the through-coming protocol the end-devices use at least on network level. The intermediate components can be routers, proxies, independent services, parts of a broker, etc. The intermediate components build the network between the end peers.

Layer: Media streams can be coded into multiple Layers, where each Layer enhances incrementally the level of detail relative to the given base information (carried by the so-called "base layer"). This means that adding Layers can progressively increase-the level of detail of the base information. Each layer can be mapped to a given flow.

Negotiation Mode: The negotiation mode refers to the signaling path and the negotiation information used by the peers for exchanging information on the management and the control of the data media streams. The negotiation mode states who are the offerer and who are the answerer parties by the negotiation.

Mediator: The mediator is a functionality of a peer to redirect incoming calls to one or more other peers according to some profile pre-settings of the user and/or the service provider of the respective peer with such facilitating functionality.

Offerer: The offerer is a participant of a SIP session which generated a multimedia session description the offerer whishes to use by opening the multimedia session. This description is conveyed to the answerer (see above). [SDPOA00]

Peer: A service or an end-device associated with an end user.

Quality of Service (QoS): The collective effect of service performance, which determines the degree of satisfaction of a user of the service according to a definition from the ITU-T (former CCITT) Recommendation E.800. Thereby, QoS can be described for each service with a set of parameters that characterize the service. As an example, for a video conferencing service, QoS can be defined as the overall end-to-end QoS as observed by the end user, which can be measured by parameters like frame rate, visual quality and delay.

QoS Change: The change of the QoS contract initiated by the service user.

QoS Context: A QoS context identifies an arrangement of QoS parameters that shall be enforced throughout a given set of media streams. A QoS context is a logical entity modeled as a specialization of the QoS contract concept.

QoS Contract: Agreement between a user and a given service provider, specifying QoS requirements and constraints, as well as the policies required to keep track about QoS during all phases of said service. QoS contracts generalize the concept of media stream-level QoS contracts and of higher-level contracts, the so-called QoS contexts. This means that QoS contracts can be organized in a hierarchical structure.

QoS Contract Type: Captures the structure of a class of QoS contracts, by identifying how individual QoS contracts specify the QoS properties over a given set of QoS parameter types, also known as dimensions in "QML: A Language for Quality of Service Specification" (HP-Lab Technical Reports, HPL-98-10, 980210) by S. Frolund and J. Koistinien, in the following referred to as [Frolu98]. Each parameter type consists of a name and a domain of values. QoS specifications can be simply intended as a set of constraints over said domains, one per parameter type.

QoS Level: The multidimensional QoS space of parameters that characterizes a service can be partitioned into multiple discrete sub-spaces. A given sub-space is denoted as QoS level and shall be distinguishable from another QoS level by the service user. A QoS contract describes a specific QoS Level and is used to enforce such a level in case re-negotiation takes place. In other words, users perceive QoS levels as the result of applying certain QoS contracts to the given services. There might be however some natural, application-specific, or business specific predefined partitions of the QoS space, wherein users can then map their own QoS contracts to QoS levels (belonging to the given partition) to various extents (one-to-one, intersection, different granularity, etc.).

QoS Parameter: A QoS parameter is a functional representation of one single characteristic of a given service (as an example, the overall end-to-end delay).

Following the definitions set forth in "Information Technology—Quality of Service: Framework" (ITU-T Recommendation X.641, 12/97, ISO/IEC 13236:1998), in the following referred to as [ISOX641], QoS parameters (in ISO terminology, the QoS characteristics) identify measurable QoS-related quantities and can be further classified into generic, specialized, and derived ones:

Generic QoS parameters try to capture a common underlying QoS parameter that can be applied to any particular circumstance, independently thus of what it is applied to.

Specialized QoS parameters are concrete instances of generic QoS characteristics (eventually, generic QoS characteristics can be sufficiently concrete to be used as is, but in most of the cases a specialization is required to capture the system- or network-specific peculiarity). For instance, a generic Time Delay QoS characteristic can be further specialized so as to reflect system implementation specific issues. The specialization approach is well suited for addressing complex distributed systems, by mapping QoS characteristics at appropriate levels of abstractions.

Derived QoS parameters capture the dependencies between QoS characteristics, based on mathematical relationships. Some derived QoS characteristics may even be statistical in nature (e.g. maximum, minimum, range, mean value, variance and standard deviation, n-percentile, statistical moments, etc.). Even derived QoS parameters can be specialized much like the generic ones. Therefore, specialization and derivations can be regarded as orthogonal transformations of QoS characteristics. However, it must be noted that derivation may involve more than one generic/derived/specialized QoS characteristic (e.g. availability is a function of reliability and maintainability).

QoS Profile: A collection of data specifying end user preferences in terms of QoS, concerning the usage of a given service. QoS-profiles may be stored on the user's terminal device, or in specific databases.

QoS Specification: General term for identifying set of QoS parameters and constraints specified by a user for a given service.

QoS Violation: The violation of a QoS contract caused by the service provider.

Session: A set of lasting connections between two or more peers (user end-devices or servers), usually involving the exchange of many packets of "associated information" (the information of a session is concerned with a certain topic) among the peers. According to "SDP: Session Description Protocol": (IETF Request for Comments: 2327, April 1998) by M. Handley and V. Jacobson, in the following referred to as [Handl98], a multimedia session is "a set of multimedia senders and receivers and the data media streams flowing from senders to receivers. A multimedia conference is an example of a multimedia session". Here, two types of session with respect to their context are recognized:

Media Session—The media session has the context of transferring user-perceivable data between peers.

Signaling Session—The signaling session has the context of negotiation of media session settings and stays in general invisible for the end user. SIP, SCCP, etc. can be used to perform a signaling session. The signaling session is visible for the application and may become visible for the user only if the application requires some user inrevention or user event generation (e.g. popping up a GUI-window with requirement to press one or another virtual button).

It should be noted that some protocols (e.g. the Real-Time Transfer Protocol, RTP) can carry both the media data and the media description, thus performing in parallel the media transfer and the signaling.

Signaling Path: The network path taken by the SIP messages.

Media stream: The continuous unidirectional exchange of information between two peers at application level. Different types of Media streams may exist: audio, video, data, text, or any combination thereof. A given party may act as a pure media stream source (which exclusively sends out information), as a pure media stream sink (which collects media streamed information from the other party such as a Video-on-Demand service), or as both media stream source and media stream sink (which is typical of a conversational mode such as a videoconference service). One media stream can be mapped to one or multiple flows.

In the following section, different possible communication scenarios shall be described which can occur in a multimedia environment, and which will benefit from the use of an End-to-End QoS Negotiation Protocol (E2ENP).

The section first introduces key definitions of the parties and the components considered for the communication, as well as the structures that they build to form the communication architecture.

The described architectures are associated with some specific services. Different communication modes the participants use for negotiating QoS are considered. For defining the use cases, the following aspects are taken into account:

who the communicating parties are, who the initiator of the connection is, how many communicating parties participate in a specific communication scenario, what kind of structure said communicating parties build, and what kind of connection mode (unicast or multicast) is applied.

Some examples are finally provided to show the working idea of the scenarios.

The end-system communicating parties—offerers and answerers —are the active components of any end-to-end negotiation. According to the definitions set forth above, the offerers and the answerers are peers: The offerer is the party which starts the connection negotiation process. The answerers are the parties contacted by the offerer, which the wishes to establish a connection with. The various parties may take in the actual communication an active role, as a sender (i.e. sending or sending/receiving media streams), or a passive role, as a receiver (i.e. receiving media streams).

Another type of communication party is the intermediate component. These components can differ in terms of complexity to various extents and can be employed on different levels of the network connection. The intermediate components can be all the devices (proxies, router, etc.) and services within the network (e.g. naming, allocation, presence, etc.). The intermediate components in this case are just passive actors only supporting the building of the connection between the end peers but not interfering in the negotiation processes between them. The assumption of the E2ENP is that no intermediate components take part to the negotiation process, rather, they may influence some of the negotiated information before or after the negotiation has taken place. That is why it is necessary to consider intermediate components with respect to their functionality and influence on the negotiated information.

By establishing a connection it is important to state:

1. The negotiation mode describes the sequence of exchanging capability- and QoS-contract information and which party sends first its contract. To this extent, the following modes are differentiated:
   a. The push mode is used when an offerer makes an offer to the answerer about how the connection settings should be made and declares ahead its capabilities and QoS wishes. The push mode can be used with one-to-one telephone-like Voice-over-IP (VoIP) communication.
   b. The pull mode is used when an offerer calls the answerer without declaring wishes about the connection settings. The offerer retrieves this information from the answerer and adapts its wishes upon the received profile. This mode can be used for different services like "video on demand" or by "virtual lecturing" when the central peer ("VOD server" or the lecturer) predefine profiles to be used.
   c. In some cases it may be necessary to use push-pull mode whenever the offerer not only makes an offer about the connection settings to the answerer, but also retrieves simultaneously the answerer's settings.
2. The Connection Mode: The knowledge which peer is the sender and which the receiver serves to establish, which of the negotiation modes (push/pull) is more reasonable to use by starting a negotiation.
3. The connection works (especially in cases where there are more then one participant)
   a. as a multicast to a group of receiver parties,
   b. as a unicast to every receiving party.
4. The number of the communication parties is the information which is needed for determining which of the negotiation modes (push/pull) is more reasonable to use and in what sequence the negotiation sub-processes would take place. The communication parties can form the following connection structures:
   a. One-to-one: This can be a telephony case between two parties. A typical service example here is VoIP (see example below).
   b. One-to-many—This is the case of VoD-service or online lecturing (see example below).
   c. Many-to-many—A typical example here is the virtual conferencing (see example below).

In the following section, some examples of communication scenarios shall be described to better recognize the needs of a negotiation protocol. Since the very simple peer-to-peer (one-to-one) communication is already thoroughly discussed in the literature [SDPOA00], the following scenarios consider some more complex communication patterns. The scenarios describe some typical situations that may occur by dynamic communications and by multi-party connections. The influence of the mobility of devices and persons with respect to mobile networks is shown. Some ideas of possible information dependencies and the way of describing this are introduced. The examples show some aspects of the multi-party-communication in which the usage of intermediate components as passive communication parties may be involved.

The example depicted in FIG. 1 shows a call relocation 108 in a switch situation of a telecommunication session 102 for a one-to-one communication scenario 100 exhibiting the idea of how the future phone-like communication can be arranged. The two users 104*a*+*b* involved in said scenario shall be called. Mary and Kate.

Mary receives on her Internet-enabled watch **106*a*1 a call from her friend Kate who wants to tell about her new boyfriend. The call carries a message indicating "who is calling" (the identification of the caller) and "what the call is all about" (subject in formation). Mary's watch 106*a*1 is not capable of showing the received high-resolution pictures 112 since its monitor is quite small and monochrome, so it automatically starts to search a device 106*a*2 which can do that. It connects to the home central server and finds out that Mary's profile indicates she is authorized to use a smart terminal device 106*a*2 in her room. The watch 106*a*1 contacts the "room" device 106*a*2 for relocating the session 103 and informs Mary that there is a call 110 waiting for her at her "room" device 106*a*2. For this reason, Mary moves to her room to pick up the call 110. Meanwhile, Kate knows that Mary has accepted her call 110 but needs some time for the relocation 108 procedure 108. This information is then forwarded by an appropriate protocol. She also knows that Mary will be able to accept the call 110 on a video-enabled terminal device 106*a*2, so that they will be able to exchange the pictures. Once in her room, Mary can access her smart terminal device 106*a*2** to speak with her friend.

Mary: "Hi, Kate! Well, you have a new boyfriend?"[1]

Kate: "Hi, I have also some great pictures of him."

(Finally, Kate is able to send a few digitalized high-resolution pictures 112 to Mary and even a few short video clips of her preferred rock band.)

This scenario relates to the case of a Personal Area Network 604 (PAN), in which a third-party-assisted negotiation 806 of capabilities and QoS needs to be carried out on an end-to-end basis. This means that Mary's watch **106*a*1 shall be able to negotiate on behalf of the newly discovered smart device 106*a*2** (proxying mechanism).

Alternatively, the negotiation 806 process could directly be carried out by Mary's "room"device **106*a*2 with Kate's terminal device 106*b*: In this case, the relocation mechanism 108 would completely-hand over the the complete connection establishment process to the new device 106*a*2** (redirect mechanism).

As a sub-case of this scenario 100, it is of course also possible that no relocation 108 is required at all, in which the negotiation 806 process could be carried out directly by Mary's watch **106*a*1 with Kate's terminal device 106*b*. Such a subcase corresponds the very simple one-to-one communication as described in [SDPOA00]. This case is shown on FIG. 8** along with the negotiation phases of the signaling protocol.

The example as depicted in FIG. 2 shows a virtual lecturing in a situation of a one-to-many communication scenario 200 in which one lecturer 202 (Prof. T. Martin) and three students **204*a-c* (A, B and C) are involved. Thereby, it shall be assumed that Prof. T. Martin is attending a conference in Rome, while at the same time he should have his usual lecturing schedule at the university of Berlin. He has arranged with his students A, B and C that he would be giving the lecture on line, by taking advantage of a free slot in the conference schedule, and has thus announced that the session 102 will start at 2:00 p.m. To this extent, Prof. T. Martin has configured his hotel-room computer to support several different sending profiles corresponding to the devices of his students. At 1:00 p.m. his PDA informs him that the first students have started a negotiation 806 (or 809) for opening a connection session 102 with his computer in his hotel-room. Prof. T. Martin goes to his room and at 1:55 p.m. he makes a round the table check of the participants A, B and C before finally starting the lecturing session 102**. The lecturing connection carries' identification information as being of academic importance and that is why it is not charged for, or the charges are accounted on a university account.

This example describes the case of a one-to-many communication scenario 200. Such kind of communication is equivalent also to the case of a "video-on-demand" (VoD) service, with the major difference that in the example described above the transmission is live rather than pre-recorded as in the VoD case. Therefore, each receiver A, B and C in the present example will be able to receive only the same information at (nominally) the same time. A1

The following example as depicted in FIG. 3 can be treated as a simple form of a videoconference **1204*a/b* (FIG. 12) in a many-to-many communication scenario 300 in which the four users 302*a-d*** (Caroline, Martha, Miranda and a secretary) are involved.

It shall be assumed that Caroline and Martha are employees of a fashion design corporation in Los Angeles. They are working on a joined project concerning a new collection with their French colleague Miranda. Every week the ladies **302*a-c* make a videoconference 1204*a/b* on the current state of the development of the collection. Caroline and Martha send their designs to Miranda for check and approval. Since Miranda is traveling quite a lot and has not enough time for writing nice reports for her boss, she has authorized her secretary to arrange her models review in order to prepare a presentation for the boss. When the conference finally takes place, Miranda, Caroline and Martha can start exchanging audio and video content as well as images and text messages. Meanwhile, the secretary 302*d*** is listening online and taking the minutes of the conference as well as Miranda's remarks.

This scenario 300 addresses the case of information originating from different sources. This is the case of a group of related information media streams 206, in which the users may require correlation 304 among exchanged media streams 206 (e.g. at the secretary end-point).

This scenario 300 addresses the case of information originating from different sources. This is the case of a group of related information media streams 206, in which the users may require correlation 804 among exchanged media streams 206 (e.g. at the secretary end-point).

The following example as depicted in FIG. 4 pertains to a many-to-many communication scenario 400 showing a complex scenario of a videoconference **1204*a/b* in which the four users 402*a-d* (Susanne Jones, two examiners and Mr. Jones) are involved. Thereby, it shall be assumed that Susanne Jones is making a public opened PhD pre-exam and she has invited her dad to passively participate to her online examination session 102, by giving him a session-connection key for joining the examination session 102 as a listener 404+*d*. She is making an online presentation, which is multicasted to her supervisors 404+*c* pand to a group of listeners. The initial arrangements of the session 102 are made between Susanne's terminal 404*a* and the supervisorst terminals 404*b+c*, since the supervisors 402*b+c* exchange online notes about the presentation in order to be able to guide Susanne for her real exam and to point out the positive and the negative sides of this presentation. The remarks are written directly over the presentation pages or on a common white board. The notes are conjoint with the running presentation and the initial arrangements define this correspondence (correlation 304**).

As soon as the initial arrangements are met, the exam starts. The listener **402*d* and the other listeners can join at a later moment since they do not interfere with the running exam as active participants. Any of the listeners joining the session 102 can get information on the current rating of the presentation. Susanne's dad terminal 404*d* joins the session 102 signing to get the presentation itself and the ratings, which her PhD supervisors 402***b*+c give. The terminal 404*d* makes the corresponding arrangements with the Susanne's terminal 404*a* and the terminals 404*b*+c of the supervisors 402*b*+c according to preset profiles corresponding to the wishes of Susanne's dad, so that he joins the presentation multicast and gets the ratings as unicasts.

For a proper course of said scenario 400, it is necessary to have a notion of how to group the single media streams 206 and who the interested parties for a running media stream 206 are. In such scenarios, it is important to define groups of participants and groups of media streams 206 in a session 102. It is also possible that hierarchical grouping structures for communication are formed.

This scenario 400 also shows that sometimes not only real-time traffic but also non-real-time traffic should be treated as high-priority traffic: For example, the media stream 206 of subtitles carrying live-translation of the exam for a foreign participant has to be considered as pseudo-real-time, insofar as if it did not pace with the content—or did not get delivered at all—it would be of no use. In this case, the non-real-time traffic (sub-titles) is associated to a given degree with the real-time one (live video).

Said scenario 400 can also be applied to network 604 games and online conferences with several working groups. Considering the complexity of such a scenario 400, it may or may not be necessary to make certain pre-arrangements and plannings of the multi-party connection.

The example depicted in FIG. 5 exhibits some additional aspects of the multi-party communication considering also the usage of some services that support the discovery of the communication parties and services, and the start of the negotiation 806 (or 809). Thereby, two mobile users 508*a*+*b* (Dr. R. Harris and his assistant, Mr. A. Frank) are involved in said-scenario.

In this example, it shall be assumed that. Dr. Harris is traveling from Frankfurt to Paris and has to participate in a videoconference 1204*a/b* with his French colleagues concerning the performance of a brain operation of a patient in Paris. His colleagues are sending him online current monitoring information of the patient. They make also a discussion about the performance of the operation in order to be able to start as soon as Dr. Harris arrives at the hospital in Paris. When Dr. Harris enters the train 502, he wirelessly plugs his terminal into the train LAN. The train server is now informed that Dr. Harris is present within the train LAN. Mr. Frank gets on the train 502 in Strasbourg. By entering the train 502 he also wirelessly plugs his terminal on the train LAN and thus discovers that his boss is already in another wagon of said train 502. (It shall be assumed that the train is completely booked, and therefore Mr. Frank had no chance to reserve a seat close to Dr. Harris.) Mr. Frank issues a call to join the running conference too. Thereby, the terminals of Dr. Harris and Mr. Frank build an "ad-hoc" network 604 and use the terminal of Dr. Harris as a connection to the "outside world" re-transmitting the conference media streams 206 to the terminal of Mr. Frank.

This scenario 500 is an example of virtual presence by using the train server as a discovery service. But it is also possible to have some other intermediate services like naming and/or allocation services, etc., or devices like proxies or registrars. In this case, the intermediate components only support the building of the connection between the end peers without actively participating in the negotiations 808 and 809 that the end peeks perform.

In the following section, the issues concerning how to handle QoS in multimedia applications dealing with multiple types and numbers of concurrent media streams 206 shall be discussed. The key aspects of the proposed solution according to the underlying invention, the pre-negotiation 802 of application-level QoS and the co-ordination of distributed resource management, in which the so-called "economy principle" is applied, are then presented in detail. The requirements identified in this section are collected in a requirement list which also contains information about dependencies among the identified requirements.

A paramount problem that mobile users will most likely face within the context of next generation IP networks 604 and applications is how to cope with limited amounts of resources at the end systems and in the network 604, and unstable environment conditions. Hence, the following requirement can be postulated:

| |
|---|
| Requirement 1: Developers and users of mobile and/or fixed terminals SHALL be able to deal with unstable environment conditions, especially when enforcing QoS. |

Multi-media sessions 102 may contain several media streams 206 of basic types (i.e. audio, video, and data). As an example, one session 102 for a given user's perspective could consist of two video media streams 206 and four audio media streams 206 generated from different peers (or even from one peer in a surround scenario). The given user would then wish to specify the QoS she wants to get for each single media stream 206, and in addition any parameter that might determine the inter-media stream 206 behavior. Typically, videoconference 1204*a/b* applications deal with voice and video media streams 206, which must be synchronized at the end terminal. Non-synchronized videoconference 1204*a*/bs may not be satisfactory in some scenarios.

Additionally, some level of correlation 804 may be required between some or all of the aforementioned media streams 206, on a time and/or QoS basis. This correlation 804 constitutes a generalization of the time synchronization 805 problem. For instance, electronic game applications and/or media-rich interactive applications might feature bundles of audio and video media streams 206, which are associated with objects to be presented to the user. For example, a moving and/or rotating cube can be displayed on a monitor with its faces textured with images from video media streams 206; and different audio media streams 206, each associated with a cube face, can be played whenever the corresponding face is oriented to a certain direction.

To this extent, applications shall be able to guarantee not only that related media streams 206 are played within given temporal relationships (sheer time-synchronization), but also that the combined QoS of a given bundle of media streams 206 lies within some given constraints (QoS-correlation 804). For instance, just continuing the game application example, it might make no sense to have some facets of the cube being displayed in black and white videos, and the others as high quality color videos at higher frame rates, even though the images were completely synchronized from a sheer temporal perspective. It would rather make more sense to display all facets displaying black and white movies at the highest available frame rate, thus avoiding the pointless consumption of resources to get color images to the detriment of the frame rate at which said images would be displayed.

Of course the decision of what level of correlation 804 should be enforced at QoS level among a set of media streams 206 is left to the developers' and even to the user's discretion.

Therefore, multi-stream applications may require in addition to the specification of timing relationships among groups of media-streams 206, also a specification of QoS correlation 804. Actually this distinction is not completely identifying two orthogonal aspects, since time-synchronization can be regarded as a special case of QoS-correlation 804. In the case that a given media stream 206 is composed of a number of distinct transport layer flows (e.g. as generated by multilayered codecs), these issues are even more obvious.

Requirement 2: Developers and users of multimedia applications dealing with multiple media streams 206 MAY augment their QoS specifications by including QoS correlation 804 and time-synchronization aspects.

One should note that the bundling of media streams 206 is not only application- or user-dependent, but it can also be structured according to a hierarchical scheme.

For instance, in videoconference 1204*a/b* applications it can make sense to distinguish (and therefore treat differently) different groups of media streams 206, so as to identify multiple concurrent instances of the videoconference 1204*a/b* and, within each videoconference 1204*a/b* session 102, the various associations of the given user with multiple peers (each association being a bundle of correlated media streams 206).

This proposal thus models multi-stream time synchronization 805 and QoS correlation 804 constraints as high-level QoS contracts 1108, associate with the list of the affected media streams 206. Furthermore, it allows recursively bundling such high-level QoS contracts 1108 among themselves, thus leading to a hierarchical QoS Specification scheme, i.e. equivalent to a tree. Each such leaf represents a media stream 206 and has a QoS contract 1108 associated. Parent node are associated with a high-level QoS contract 1108, specifying for their children QoS levels in terms of multi-stream, Time synchronization 805 and QoS correlation 804 constraints.

Furthermore, users may prioritize and grant different amounts of resources to various (multimedia) applications. This is especially important for handheld devices with limited resources, like memory, battery-power as described in [BRAIN]. This approach leads to even higher-level Time synchronization 805 and QoS correlation 804 constraints, which are to be enforced locally by the terminal device. The corresponding high-level QoS contracts 1108 extend the tree data model at the root. Such additional high-level QoS contracts 1108 are however not meant to be negotiated with peers. Rather, each peer can enforce high-level QoS contracts 1108 independently. Alternatively, high-level QoS contracts 1108 can be enforced globally throughout a given closed set of peers, once a coordinator has been selected.

Requirement 3: Developers and users of multimedia applications dealing with multiple media streams 206 SHOULD structure their QoS specifications in a hierarchical manner.

A possible way to cope with QoS violations and QoS changes is to enable the mobile users' applications to efficiently and timely react to those events, by planning counteractions ahead.

In this manner, whenever QoS violations occur, agreements on how to most effectively adapt to the mutated conditions can be timely reached among the peers. The overall solution combining these two planning mechanisms is hereby-called End-to-End Negotiation Protocol 908 (E2ENP) (E2ENP 908).

Requirement 4: The E2ENP 908 SHALL include mechanisms and means for planning ahead proper counteractions, coping with otherwise unpredictable events resulting from QoS violations (e.g. handovers) or QoS changes (e.g. User changing profile information when roaming).

The hierarchical QoS specification can be enhanced for helping the applications deciding how they should react during overload situations in order to be compliant with the users' wishes.

The sheer negotiation 806 of a single QoS level makes in fact sense only at run time, since only at run time the network provider can be involved in a third-party-assisted negotiation 806 (in which the actors are an initiator, a Provider, and one or multiple Responders according to [ISOX641]). In order to harmonize with the current terminology used in the IETF community, the following naming convention will be used in the scope of the underlying invention: offerer 914, instead of initiator, and answerer 911, instead of responder. This is necessary if network resources have to be reserved explicitly for providing tighter QoS guarantees.

However, the, need has been identified to speed up the most critical phases of mobile multimedia services (including not only converzational and conference services, but also information retrieval) from a QoS perspective: namely, connection establishment and handovers. This, because the underlying traffic is typically delay-sensitive and the use of heterogeneous and mobile networks 604 may imply limited bandwidth and network 604 capacity, as well as frequent handovers. The solution hereby proposed is to properly planning ahead a set of QoS levels in order to cope with current and future amount of resources.

Besides, each set can be quickly and uniquely referenced at QoS (re-)negotiation times, by associating each element in the set with a unique identifier.

Furthermore, special features of the end-applications and services may require different negotiation 806 modes and different orders of the exchanged messages.

Finally, it should be noted that any QoS information derives from the knowledge of available resources. Since any given user-perceivable quality may be achieved by using different resources (e.g. codecs), it is necessary to gather information about resources in order to be able to create QoS contract(s) 1108 accordingly. Furthermore, information about resources is also used for carrying out resource reservations.

Requirement 5: The E2ENP 908 SHALL include mechanisms and means for quickly and efficiently performing QoS negotiations 806 and QoS re-negotiations 808.
Requirement 6: The E2ENP 908 SHALL include mechanisms and means for defining the information exchange modes (push, pull, push-pull), since with different applications and services different negotiation 806 schemes may be necessary.
Requirement 7: The E2ENP 908 SHALL handle QoS information derived from knowledge about available resources (e.g. codecs).
Requirement 8: The E2ENP 908 SHALL include mechanisms and means for specifying and pre-negotiating multiple alternative levels of QoS.
Requirement 9: Each QoS level SHALL be described by a specific QoS-contract 1108.
Requirement 10: The E2ENP 908 SHALL include mechanisms and means for uniquely referencing each pre-negotiable level of QoS during QoS negotiations 806 and QoS re-negotiations 808 in order to keep signaling minimal.

Mobile users require the capability of changing their mobile terminal points of attachment to the network 604 while retaining the old network 604 address, as well as maintaining any active telecommunication sessions 102 three possible types of events may occur (handover).

Given that users typically have business relationships with a specific network provider (e.g. a subscription with an ISP or a prepaid card with a Telecom operator), three possible types of handover may occur:

Horizontal Handover: The handover takes place within a given administrative domain of a network provider, and within the same type of access network 604.

Vertical Handover: The handover takes place between two different types of access networks 604 and/or across the administrative boundary between two network providers.

When dealing with handovers, users must be prepared to face changes in network resource availability, depending not only on the type of access network 604 accessed, but also on the type of business relationships the users may have with the various network 604 operators accessed. In some extreme cases, the users might try in fact to access the network 604 owned by a network 604 operator, with which the users have no business relationship at all, or which can restrict users' access or limit the amount of resources allotted to said users. Pricing aspects also play a key role.

All this means that the users must be prepared to experience dramatic QoS violations whenever handovers occur, but also to advantageously leverage any potential improvement, whenever during such handovers the users access networks 604 with more resources and/or less restrictions.

---

Requirement 11: The E2ENP 908 SHALL assume that users will have preventively validated their preferred alternative levels of QoS against what their preferred network provider can actually support.

---

Following the rationale set forth in the previous paragraph, peers could manage to agree not only on a given QoS contract 1108, but also on alternative ones, which can be advantageously used whenever the network 604 and/or terminal resource availability changes over time.

In such a way, each peer would exactly know which alternative QoS contract 1108 (and under what conditions) shall be enforced in order to cope with a critical QoS change or with any QoS violation with respect to the currently enabled QoS contract 1108.

The concept of adaptation path prescribes the specification of alternative QoS contracts 1108 in addition to the nominal one, along with a set of rules indicating which alternative QoS contract 1108 should be enforced upon which circumstance. The alternative QoS contracts 1108 typically describe lower levels of QoS compared to the one specified by the nominal QoS contract 1108. More specifically, adaptation policies will identify well-defined adaptations of the nominal QoS contract 1108 to a set of alternate degraded QoS specification (i.e. lower levels of QoS), in correspondence to well defined sets of QoS changes and/or violations, as monitored by the overall middleware as described in "QoS Aspect Languages and their Runtime Integration" (in: Lecture Notes in Computer Science, Vol. 1511, Springer-Verlag) by J. P. Loyall et al., in the following referred to as [Loyal].

In the scope of the underlying invention, the terminology indicated in [BRAIN] is applied, in which adaptation path (AP) is used instead of Degradation Path in order to highlight that adaptation could actually be used also, to upgrade a given quality, should more resources become available at a later time (e.g. in the case of hand-over).

---

Requirement 12: The E2ENP 908 SHALL allow users pre-defining adaptation paths.
Requirement 13: Each element of an adaptation path SHALL be a QoS contract 1108.
Requirement 14: Each single media stream 206 in each given session 102 SHOULD be associated with a given QoS contract 1108.
Requirement 15: Each QoS contract 1108 SHALL be associated with a unique identifier.
Requirement 16: The E2ENP 908 SHALL enforce specifying and pre-negotiating a chosen QoS contract 1108 out of any given adaptation path, as the default QoS contract 1108 that application(s) shall use when starting media streaming.
Requirement 17: Additionally, an adaptation path COULD include the specification of rules defining the circumstances under which the application and/or middleware should enforce a different QoS contract 1108, out of the given set thereof.
Requirement 18: The E2ENP 908 SHALL include mechanisms and means for specifying APs at media stream 206 level.

---

By applying the AP at any level of the aforementioned hierarchical QoS specification, the adaptation process can further be improved by including both time-synchronization and QoS-correlation 804 specifications.

In this model, each alternative time-synchronization and QoS-correlation 804 specification is associated with a specific QoS contract 1108.

The use of alternative QoS contracts 1108 structured in a hierarchical format so as to capture various correlation 804 aspects, allows in fact peers agreeing a priori (at pre-negotiation 802 time) on a common, structured "QoS vocabulary", without requiring the intervention of the network provider during the pre-negotiation 802 process.

To this extent, peers may advantageously use profile information pre-negotiated with network providers at subscription time, whenever participating to the end-to-end pre-negotiation 802 process. In case of roaming, network providers could make provisions (via Service Level Agreements) that the users' profile information still holds (entirely or partly) when the users visit a new network domain.

The enforcing of QoS correlation 804 and/or time synchronization 805 constraints implies the logical grouping of media streams 206, based on various criteria. For instance:

grouping all audio media streams 206 for enforcing synchronized translation;

grouping all media streams 206 opened by a given user on a multi-user terminal in order to enforce quotas.

A group of media stream 206 could eventually contain just one media stream 206: in such a case, the basic media stream 206 QoS contract 1108 would simply be augmented with higher-level (e.g. application specific) QoS constraints.

Groups are mainly useful for representing bundles of media streams 206, which QoS-aware applications can handle as a whole when trading off quality to resource availability, among a multiplicity of equivalent bundles in a given set of environmental conditions.

To this extent, peers can proactively agree not only on the AP of each individual media stream 206, but also on alternative compositions of the given whole bundle, along with specific QoS correlation 804 and/or time synchronization 805 constraints for each of the resulting configurations. Consequently, the applications (and/or middleware) will be able to adapt to given QoS changes and/or violations, based on predefined rules, dictating which media streams 206 should be adapted (including actions like stopping or restarting a stream), and which new QoS correlation 804 and/or time synchronization 805 constraints should be enforced in the new situation.

---

Requirement 19: The E2ENP 908 SHALL include mechanisms and means for specifying adaptation paths for groups of media streams 206, along with any corresponding QoS correlation 804 and time synchronization 805 constraints.

---

It is also reasonable to define a NULL-stream QoS contract 1108 for taking into account, during the adaptation process, the possibility that in critical situations some of the media streams 206 of a group might be no longer supported. In this way, one can prevent the complete re-negotiation 808 of the QoS-settings of the whole group of media streams 206, thus leaving those media streams 206 within the group running, for which the boundary conditions are still valid. The idea behind the NULL-stream is to allow end peers implicitly triggering a "PAUSE-STREAM" command due to a detected QoS violation/change. By saving information about the negotiated QoS levels before the pause occurred, one could use such information for correctly and quickly re-negotiating QoS at a later time, should the QoS violation/change condition do not exist any more. For instance, let us assume that Mary is watching video clips on her mobile device **106*a*1, and that she has indicated in her user profile that, should the connection quality decrease, she would prefer to pause the video streaming so as to save resources for listening to the musical score. During a handover, a QoS violation occurs and the device consequently signals the VoD server to pause the video stream. The VoD server pauses the video streaming and saves pre-negotiated QoS information in order to be able to resume the stream as soon as the handover is completed, according to the pre-negotiated QoS (including time synchronization issues with respect to the audio stream). Mary's device 106*a*1** also has to remember the existence of the video stream in order not to full-re-negotiate QoS for it anew, when resuming it.

The definition of the boundary conditions is application specific and depends on the context of the session 102. In general the application of the NULL-stream within a group should not affect the context of the session 102. This means that the still running media streams 206 of a stream-group within a session 102 should be meaningful enough for the end-parties to keep the stream group upright and not cancel it and renegotiate it anew. Thus, the application of the NULL-stream is just a tool for avoidance of full re-negotiations 808 and serves the meaningful adaptation of a stream group.

For example, let us consider the case of a group of media stream 206 containing an audio and a video media stream 206. The corresponding Group AP may then include an option, in which the video-media stream 206 is associated with a NULL-stream QoS contract 1108 in order to account for the occurrences of marginal conditions like dropping of the bandwidth under a given threshold. In such a case the video media stream 206 would be stopped but the audio would continue being media streamed.

---

Requirement 20: The E2ENP 908 SHALL include mechanisms and means for specifying NULL-stream QoS contracts 1108 in Group adaptation paths.
Requirement 21: The application of the NULL-stream SHOULD not affect the context of the running session 102.

---

The association is a particular type of media stream 206 grouping, associating all of the media streams 206 between the given user and a given peer. This type of grouping is the most intuitive one, and it is expected to be used quite often.

---

Requirement 22: The E2ENP 908 SHALL include mechanisms and means for specifying APs for associations of media streams 206, along with any corresponding QoS correlation 804 and time synchronization 805 constraints.

---

A QoS context identifies an arrangement of QoS parameters that shall be enforced throughout a given group of media streams 206. A QoS context is a logical entity modeled as a specialization of the QoS contract concept.

This means that whatever the QoS specification of individual media streams 206 might be, the QoS context forces a set of QoS constraints to be applied to all of the media streams 206 belonging to the given group.

QoS contexts can also capture those QoS parameters derived from the QoS contracts 1108 of the individual media streams 206 belonging to the groups associated with the given QoS contexts [ISOX641]. Examples are the total amount of memory or the average bandwidth used by the given set of media streams 206.

To sum up, QoS contexts deal media stream 206 grouping, QoS-correlation 804, and time-synchronization issues, focusing more precisely on the specification of:

common QoS level for a group of media streams 206;

derived QoS parameters;

QoS parameters indirectly affecting QoS specifications of bundled media streams 206.

Of course, the decision about what level of QoS correlation 804 and/or time synchronization 805 should be enforced among a group of media streams 206, may be taken not only by the developer but also by the user.

---

Requirement 23: The E2ENP 908 SHALL include mechanisms and means for specifying and pre-negotiating QoS contexts associated with given groups of media streams 206.
Requirement 24: Each QoS context SHALL be associated with a unique identifier.
Requirement 25: The E2ENP 908 SHALL enforce specifying and pre-negotiating a chosen QoS context out of any given Group adaptation path, as the default QoS context that application(s) shall use when starting media streaming.

---

According to the aforementioned hierarchical model, tree-based hierarchies of QoS contexts may be defined. The leaves of any such tree data structure would then be represented by the QoS con-tracts 1108 associated with the individual media streams 206 belonging to a given group of media streams 206.

Any internal node of any such tree data structure would instead be represented by a QoS context, which would then indirectly affect the QoS specification of all the media streams 206, whose QoS contracts 1108 are contained in the sub-tree rooting from the given internal node. This means that QoS contexts can thus address specific QoS parameters that indirectly affect all of the underlying media streams 206 (e.g. system-level reliability issues).

Furthermore, at higher level in any such tree data structure, QoS contexts can be recursively defined out of other lower-level ones.

In this way, any such tree data structure may be used for aggregating not only individual media streams 206, but also'a multiplicity of already defined group of media streams 206, based on QoS-correlation 804, and time-synchronization criteria.

---

Requirement 26: The E2ENP 908 SHALL include mechanisms and means for specifying and pre-negotiating tree-based hierarchies of QoS contexts associated with aggregations of given groups of media streams 206.

---

Each QoS context can be assigned a priority, which QoS-aware applications can use to determine the relative importance of sibling QoS contexts.

---

Requirement 27: The E2ENP 908 SHALL include mechanisms and means for specifying and pre-negotiating relative priorities among QoS contexts, which happen to be siblings in a given tree-based hierarchies of QoS contexts.

---

By leveraging the concepts of QoS context and hierarchical QoS specification, peers may enforce the aforementioned concept of Group AP (GAP).

Of course the enforcing of QoS correlation 804 and time-synchronization constraints is possible only when the peers involved in the negotiation 806 process agree a priori on a given business (which application to use, whom to contact, which other sessions 102 are to be opened etc.).

Practically, in most of the cases users enforce these constraints locally and do not disclose this information to their peers. The only case where these constraints may be enforced throughout a given set of peers is only when third party control units, like a Conference Control Unit, are provided (typically in the case of online conference scenarios).

---

Requirement 28: The E2ENP 908 SHALL include mechanisms and means for specifying and pre-negotiating Group adaptation paths (GAP) expressed in terms of QoS contexts as alternative options.
Requirement 29: Each QoS context within a given GAP SHALL represent a group of media streams 206 associated with QoS correlation 804 and/or time synchronization 805 constraints.
Requirement 30: The E2ENP 908 SHALL allow wrapping any given GAP within a QoS context, thus allowing negotiating QoS correlation 804 and/or time synchronization 805 constraints across all the constituent elements of said GAP.
Requirement 31: The E2ENP 908 SHALL allow the recursive application of requirements 28 and 29.

---

The re-negotiation process 808 typically involves an offerer 914 and one or multiple answerers **106*a*2**, and can be performed in one shot or on an iterative basis [Loyal].

The offerer 914 offers a bid to the answerers **106*a*2, who examine it and return a counteroffer to the offerer 914. The latter collects the counteroffers and determines the one (if any), which satisfies the requirements of all the involved parties. Once such optimal counteroffer has been sorted out, the offerer 914 sends it as a new bid to each answerer 911**.

In an iterative scheme, the process could at this point restart, should one of the answerer 911 still do not accept the new bid. The iterative approach must however be constrained with an upper limit of iteration, and it is in any case quite complex and not efficient.

The re-negotiation 808 by the multi-party connection scenarios should be made by possibility on a single basis like by the one-to-one re-negotiation 808, since the occurrence of changes by a single communication party might not influence the connections of the other parties involved, i.e. if a peer discovers problems by its connection this does not mean that other peers also have problems with their connections. Therefore, by multi-party connections it is better to re-negotiate the independent media streams 206 on a single basis, in order minimize the necessary signaling. The media streams 206 of a group (dependant media streams 206) may also be re-negotiated on a single basis in case this re-negotiation 808 does not influence the contexts of the group.

---

Requirement 32: The E2ENP 908 SHALL enforce basic, non-iterative pre-negotiation 802, negotiation 806, and re-negotiation 808 schemes.
Requirement 33: The E2ENP 908 MAY allow more complex negotiation 806 schemes only by employing third-party control units (e.g. Conference Control Units).
Requirement 34: In general the E2ENP 908 SHOULD be used for performing pre-negotiations 802, negotiations 806, and re-negotiations 808 only between the end peers involved in a session 103. Should this requirement be not applicable due to service specific reasons, requirement 31 would take precedence.
Requirement 35: By complex negotiation 806 scenarios (e.g. conference like) the end peers engaged in a E2ENP 908 process MAY publish the already pre-negotiated QoS contracts 1108 and user profile information in some registration services thus allowing a short negotiation 806 process for the later joining parties.
Requirement 36: It SHOULD be possible to re-negotiate a single media stream 206 of a group, if this is not contradictory with the context of the group in order to minimize the signaling for the re-negotiation 808.
Requirement 37: In case a media stream 206 is being correlated with other media streams 206, it SHOULD be the responsibility of the correlating party to perform re-negotiation 808 with all affected parties.

---

The negotiation 806 rationale hereby proposed is to allow the receivers specifying what QoS level they want to receive. The difference between this proposal and current trends (e.g. SDP/SDPng 912) consists in that the latter do not focus primarily on QoS-negotiation 806, rather on capability negotiation 806. For instance, both SDP and SDPng 912 allow a sender giving information to the receiver(s) about format and transport information that the sender intends to use for sending. Trying to match E2ENP 908 with this well-known approach, the aforementioned rationale can be relaxed as follows: both senders and receivers can specify what QoS level they want to send/receive at media stream 206 level, but only receivers are allowed to specify what APs/high-level QoS level they want to enforce for receiving. This because is more likely that the receivers do care of QoS correlation 804 and time synchronization 805 constraints among multiple received media streams 206, whereas this is not generally of relevance for senders.

---

Requirement 38: The E2ENP 908 SHALL allow both senders, receivers, and sender/receivers specifying what QoS level they want to send/receive at media stream 206 level.
Requirement 39: The E2ENP 908 SHALL allow only receivers and sender/receivers specifying what APs/high-level QoS level (i.e. QoS correlation 804 and time synchronization 805 constraints) they want to receive.

---

However, the extension of this proposal to allow senders specifying QoS correlation 804 and time synchronization 805 constraints among the media streams 206 they send is left for further study.

Peers can follow a specific procedure for effectively enforcing the negotiated QoS specification, not only at connection establishment time, but also whenever QoS violations take place.

To this extent, [BRAIN] suggests to coordinate the actual reservation of local resources as well as network resources in order to avoid waiting for network resource reservation until the resources at all the end-points are reserved. More precisely, the term economy principle is used in the present document to describe the order of reservation described in "The QoS Broker" (IEEE Multimedia Magazine, Spring 1995 (2)1, pp. 53-67) by K. Nahrstedt and J. M. Smith, in the following referred to as [Nahr95].

Therefore, an integration of the aforementioned QoS pre-negotiation 802, QoS negotiation 806, and QoS re-negotiation 808 processes is proposed, with the economy principle to reserve the more expensive resources at the last step. As network resources are shared among several clients and typically one has to pay for them, it is better to first reserve resources on all end systems and then resource network resources as the last step.

The sequence of actions looks then like the following:

1. First, local resources are reserved.
2. Then negotiation 806 with the peer entity leads to a configuration that can be mapped to resource requirements at the peer, which are then reserved.
3. Finally, reservation of network resources is done in the last step, because network resources are expensive and shared among multiple users.

---

Requirement 40: The E2ENP 908 SHALL provide mechanisms and means for enforcing the co-ordination of distributed resource management.
Requirement 41: According to the "economy principle", remote resources at the peer SHALL be reserved only after local resources have been successfully reserved.
Requirement 42: According to the "economy principle", network resources SHALL be reserved only after local resources have been successfully reserved at all peers.

---

In order to properly coordinate local, peer, and network resource reservation according to the aforementioned "economy, principle" between more than two peers, special care must be taken while specifying the corresponding protocol in order to provide consistency (which also leads to better resource utilization) and avoid deadlocks. Consistency will lead also to better resource utilization.

The rest of this section presents two example scenarios, motivating these requirements. A description of the general prerequisites applying to the example scenarios is given first. These prerequisites illustrate the problem domain. However, they do not limit the applicability of the scenario.

In the following, three equivalent terminal devices shall be assumed, each equipped with the same video codec. The processing power of the terminal devices is such that each of them is able to manage 25 frames per second for either sending or receiving.

That is, the CPU power allows to either process 25 Fr/s in the transmitting mode (capture, compress, packetise and send) or in the receiving mode (receive the packets, re-assemble, decompress and render). However, the terminal has not enough resources to simultaneously send and receive 25 Fr/s. Moreover, it shall be assumed that the resource consumption scales linearly with the number of frames per second. As an example, the terminal devices may simultaneously send a media stream 206 at 10 Fr/s and receive a different media stream 206 at 15 Fr/s so as to process 25 Fr/s in total.

The interaction diagram for a negotiation 806 scenario with three peers 602_a-c_ (A, B and C) as depicted in FIG. 6 shows why it is necessary to provide consistency. Thereby, it shall be assumed that at time to peer A initiates a negotiation 806 with peer B for managing peer A sending a media stream 206 to peer B at a frame rate of 15 Fr/s.

Peer A successfully reserves local resources for processing 15 Fr/s, sends the negotiation 806 request to peer B, which already has a ongoing similar session 102 that consumes 20 Fr/s with a different peer. Thus, peer B reserves resources for 5 Fr/s for processing the incoming media stream 206 because that is all it can support. This information is propagated back to peer A, which releases previously reserved resources for sustaining the negotiated frame rate value of 5 Fr/s, and then starts reserving network resources equivalent to 5 Fr/s at time $t_1$.

Let us assume that the network 604 is not the limiting factor and finally peer A, peer B, and the network 604 are able to sustain 5 Fr/s for the given session 102. If it is assumed that at any point between $t_0$ and $t_1$ peer C wants to create a session 102 with peer A, peer A would only be able to allow peer C to admit 10 Fr/s (=25 Fr/s−15 Fr/s) locally.

However, if peer A receives the request from peer C at any point in time after $t_1$, peer A would be able to admit at least 20 Fr/s (=25 Fr/s−5 Fr/s) for the new session 102 with peer C, because the resource requirements for the first session 102 have dropped due to constraints imposed on peer B, which are outside the control of peer C.

From this scenario, the requirement can be derived that any such protocol that manages local, remote, and network resources between two peers shall not serve requests for resource requirements from another peer, until the protocol has succeeded in establishing an on-going telecommunication session 102. This requirement shall be called consistency.

---

Requirement 43: The E2ENP 908 SHALL enforce a consistent application of the "economy principle" among multiple peers.

---

The interaction diagram for a negotiation 806 scenario with two peers 602_a+b_ (A and B) as depicted in FIG. 7 shows why it is necessary to avoid deadlocks, i.e. why the E2ENP 908 must assure that there is no hold-and-wait condition or that such a condition may be present only for a limited amount of time. Let us assume that peer A wants to send a video media stream 206 at 25 Fr/s to peer B and vice versa.

At time to, peer A reserves the local resources, and sends the negotiation 806 request to peer B, which receives this request at time $t_2$. Meanwhile, peer B reserves the resources at time $t_1$ for sending a media stream 206 to peer A. Peer A receives this request at time $t_3$.

Therefore, peer A waits for the response from peer B starting from time to, whereas peer B waits for the response from peer A starting from time $t_1$. As a consequence, when both peers try to reserve their local resources at time $t_2$ (peer B) and time $t_3$ (peer A) for serving the remote requests, they will both fail.

From this scenario, the requirement can be derived that any protocol that manages local, remote and network resources between two peers shall avoid deadlock situations or at least allow them to occur only for a limited amount of time, after which the protocol shall be able to recover in any case.

---

Requirement 44: The E2ENP 908 SHALL ensure that at any given time the application of the "economy principle" does not lead to deadlock conditions.
Requirement 45: The E2ENP 908 SHALL ensure that recovery mechanisms are put in place in order to cope with possible colliding applications of the "economy principle".

---

The end peers are in general connected over one or a multiplicity of interconnected networks 604, including also intermediate components.

---

Requirement 46: The E2ENP 908 SHOULD operate based on an abstraction of the underlying network 604.

---

Intermediate components offer services that not only may influence the information that peers eventually negotiate via E2ENP 908 at later time, but also may enforce the results of the E2ENP 908 process.

Intermediate components SHOULD be informed about the decision taken by the end peers. The way of informing intermediate components MAY be by supporting them with some standard-profile information before the start of E2ENP 908 and/or by publishing the agreed QoS-contracts 1108 on some registration service.

---

Requirement 47: The E2ENP 908 SHOULD be able to be used in combination with (but independently from) intermediate components, which may result effective in preparing and/or guaranteeing the QoS contracts 1108 agreed by the end peers.
Requirement 48: The exchange of information (e.g. profiles, security, authentication, provider policies, etc.) not directly affecting the E2ENP-process, rather influencing the information that is going to be negotiated, SHOULD be carried out ahead of the E2ENP 908 start.
Requirement 49: Any negotiation 806 carried out before of the E2ENP 908 start SHOULD be performed in a modular and controlled way, so as to assure consistency and avoid dead locks.

---

In general, the flows carrying E2ENP 908 messaging (the signaling-path) and the flows carrying the actual media streams 206 (the data-path) could be routed differently, depending not only on network-related issues, but also on application/service specific reasons.

---

Requirement 50: The E2ENP signaling paths and the corresponding data paths between any two given end peers SHOULD be in general considered different.

---

Every time a signaling-path and/or data-path is built, there may be some intermediate components (router, proxies, etc.) located along the path, whose usage is application-specific, and which might "understand" partly the protocols used by the end peers. These entities would be in a position to "interfere" also with the E2ENP 908 (for example, SIP 910 may allow this), thus disrupting the very "end-to-end" nature of the E2ENP 908.

In order to avoid this threat, the following requirement forces intermediate components to be always passive with respect to E2ENP 908:

---

Requirement 51: With respect to the E2ENP 908, intermediate components SHALL operate based only on information provided - directly or indirectly - by the peers in order to carry out application specific tasks.

---

For instance, this can be achieved by putting an explicit remark in E2ENP 908 messages indicating that intermediate components should never alter E2ENP 908 content during the E2ENP 908 process. Or by publishing some of the E2ENP-related information ahead in a registry service, which intermediate components may then question for planning actions.

When user-defined audio quality should be applied to a codec according to the standard payload-type definitions of the codecs as described in "RTP Profile for Audio and Video Conferences with Minimal Control" (Columbia University, work in progress, <draft-ietf-avt-profile-new-09.txt>) by H. Schulzrinne et al., in the following referred to as [RTP-Profile], one specific quality can be mapped to just one payload type expressing this quality.

There is a unique one-to-one mapping between an audio quality and a capability (payload type).

On the other hand a single video codec can produce multiple qualities. The quality of a compressed video denotes the quality as passed to the encoder (codec). It represents the overall visual quality of the single frames. This means that by applying some user-defined quality to a video it is possible to define this quality as a compression percentage for the performance of the video codec. Additionally it is possible for some codecs (e.g. WaveVideo, format name—"WAVI") as described in "WaveVideo—An Integrated Approach to Adaptive Wireless Video" (in: ACM Monet, Special Issue on Adaptive Mobile Networking and Computing, 1998) by G. Fankhauser, M. Dasen, N. Weiler, B. Plattner and B. Stiller, in the following referred to as [WAVI], to specify the overall visual quality of the chrominance planes of the single frames thus separating between the overall luminance quality and the color quality. The color quality can also be expressed as a percentage. The different video codecs have different number of compression levels. When a user specifies visually perceivable quality this quality should be uniquely mapped to a number expressing the compression level of the video codec. If the user specifies his perceivable quality as a number or a range of numbers, this setting should have enough resolution to map uniquely to a certain compression level of a codec. Thus, two requirements can be defined concerning the video quality setting:

---

Requirement 52: The numbering range for the user perceivable quality specification (overall visual quality and color quality, if the color quality is applicable) SHOULD be uniquely understandable for the application and the E2ENP 908 in order to be able to uniquely map video quality to a given codec.
Requirement 53: The numbering range for the user perceivable quality specification (overall visual quality and color quality, if the color quality is applicable) SHOULD have enough resolution to uniquely map to the compression levels of a given codec.

---

Peers should pre-negotiate a resource management policy in order to avoid instabilities at runtime whenever handling QoS re-negotiations 808.

Otherwise, should two or multiple peers, joined to—say—a videoconference 1204*a/b*, detect a usage of resources violating some proprietary resource management policy, the decisions that each peer would independently take could influence the remaining ones, in way that might contradict the decisions that those other peers may concurrently try to take. This would lead to "oscillations" in the resource configuration space, which would impact on overall system performance and user-perceived QoS.

For the same reason, only the sender should take the decision to trigger the re-negotiation 808 process. Should however a receiver detect concurrently a degradation of resource availability, it could trigger a re-negotiation 808, and any eventual collision with other peers (including the sender) would be resolved by grating the right to continue this process to the sender only.

To this extent, the definition of a set of well-defined resource management policies is proposed, which the peers can agree upon by negotiation 806. In this way, the peers can still independently manage at runtime their own resources, but in a coordinated manner.

Such policies should cover any logical combination of, at least, the following aspects:

optimization of memory resources,
optimization of processing power,
optimization of network resource performance, and
optimization of power consumption.

More specifically, the optimization of power consumption is correlated with all other types of resource management: e.g. a memory swap drains power.

Should a policy not specify explicitly the optimization of power consumption, the policy would thus optimize the usage of other types of resource, without caring much of power (this may make sense e.g. for a desktop PC permanently plugged to the mains, which would have plenty of power to optimize any type of resources except power).

Should a policy do specify explicitly the optimization of power consumption, this policy criterion would affect all other optimization criteria.

The use of policies allows applications and/or middleware to flexibly take their own adaptation decisions, as long as; the conditions imposed by the negotiated QoS contracts 1108 and resource management policies are met. Therefore, the definition and negotiation 806 of priorities for QoS contracts 1108 are not required. Furthermore, also the definition and negotiation 806 of priorities for codecs/capabilities are not required. The reason for such a prioritisation would be in fact due to the fact that capabilities like codecs consume resources differently from one another. Besides, codecs that typically perform less well than other, may still more conveniently optimise resource usage when used in specific configurations.

Requirement 54: The E2ENP 908 SHALL provide mechanisms and means for specifying and pre-negotiating resource management policies.
Requirement 55: Resource management policies shall include, but be not limited to, any logical combination of the following criteria: Optimization of memory resources, Optimization of processing power, Optimization of network resource performance, Optimization of power consumption.
Requirement 56: The applications and/or middleware using the E2ENP 908 may autonomously prioritize list of codecs/capabilities, based on pre-negotiated resource management policies and current resource availability.

The dynamical communication environment requires not only adaptability by the establishment and the management of the data connections, but also by performing negotiations 808 and 809. FIG. 1 shows a special case for a negotiation 808 and 809 of the one-to-one communication scenario 100, wherein the peer-to-peer data connection is being "third-party-assisted" negotiated. Such kind of negotiation 806 may take advantage of using registration, allocation, presence, etc. services, thus allowing the more thorough satisfaction of the users requirements for QoS and the possibility to discover and utilize multiple devices within the vicinity of a user.

By starting a negotiation 806 the called device may discover that it has no possibility to handle the call. Since the device cannot adapt, the call may simply not happen. One kind of adaptation which can be applied in this case without changing the capabilities of the peer would be to delegate the call to another peer according to a profile definition of the user. Such functionality is named here mediator **106*a*1 and describes the ability of a peer to negotiate on behalf of some other peer and according to a preset user profile definition. This type of negotiation 809 is called "third-party-assisted negotiation". The mediator 106*a*1 actively participates in the negotiation 809 between two peers but does not take part into the data connection. If the mediator 106*a*1 should actively participate into a data connection, it would additionally need bridging-functionality which, in some cases, may result in necessary transcoding, thus running into multi-party connection and requiring the negotiation 809 thereof. An additional problem of a mediator 106*a*1 situated on the data path may be that the device causes a bottleneck, thus negatively influencing the possibility to support the required QoS. Considering these problems, such kind of adaptability may only be preformed, if all the peers (mediator 106*a*1 inclusive) exchange information on their capability profiles (e.g. device bitrate throughput), this means that multi-party connection should be negotiated, which shall be discussed later. Thus, for the case of negotiation 809, mediation is considered in such a way that the mediator 106*a*1** does not participate in the data media streaming.

The facilitating functionality of a mediator **106*a*1 is triggered when an offerer 106*b* issues a call, which the device cannot handle. In this case, the mediator 106*a*1 searches for an appropriate answerer 106*a*2 and delegates the call by also informing the user and asking for acceptance of the delegation state. Consequently the offerer 106*b* and the answerer 106*a*2 receive profile information about each other over the mediator 106*a*1, thus speeding up the discovery and the direct negotiation 806 process between the offerer 106*b* and the answerer 106*a*2** at later time.

The mediator **106*a*1 functionality needs to be able to use additional services supporting its facilitating capability. The specific application of such services is out of scope of this document, here it is recognized only the advantage of their usage and how the E2ENP 908** is being there from affected.

The mediator **106*a*1 should take care not to refer session information 112 unknown to the one (offerer 106*b*) or the other (future answerer 106*a*2) party for which the mediation is being done. The mediator 106*a*1 should be allowed to perform the facilitation by eventually restructuring the session information 112 coming from a peer, when information about multiple sessions 103 is only referred by calling the mediator 106*a*1, but not explicitly contained in the message. Thus, the mediator 106*a*1 cares for completing the information set 112 about a session 102 by the parties for which the facilitation is being done. The mediator 106*a*1 does not change the contents of the session information 112 but eventually adds complete description parts to its calls in order to round up the information set by the other negotiation parties 106*b* and 106*a*2**.

Requirement 57: By third-party-assisted negotiation 806 a pure mediator 106a1 SHOULD only facilitate the delegation of a connection without actively taking part in it.
Requirement 58: A mediator 106a1 MAY take advantage of using registration, allocation, presence, etc. services, the information of which MAY be used only for formation of E2ENP-conform messages, but does not influence the structure and the performance of the E2ENP 908.
Requirement 59: The mediator 106a1 SHOULD be able to generate new session descriptions 112 out of old, referred ones, without changing the content of the information but just restructuring it for the needs of the facilitation. The mediator 106a1 SHOULD take care of sending complete session descriptions 112 without unknown references.

DISADVANTAGES AND SHORTCOMINGS OF THE STATE OF THE ART

In the European patent application EP 01 122 366.6, the overall E2ENP concept, its requirements, and a possible implementation thereof is disclosed, however, without detailing any implementation with respect to the current technologies. Any pre-negotiated information is not accomplished in time.

Although the current form of SDPng [SDPNG03] is structured in a modular way, it does not consider E2ENP aspects and can not be used in a modular way across different SIP (or other protocol) messages. SDPng is based on the SDP offer/answer model, in which complex multi-phase negotiation processes such as the one proposed in the scope of E2ENP are not explicitly taken into account.

A process capable of taking into account user profile information as input for the overall QoS negotiation process is neither addressed in the European patent application EP 01 122 366.6 nor in SDPng.

OBJECT OF THE UNDERLYING INVENTION

In view of the explanations mentioned above, it is the object of the underlying invention to propose a method supporting QoS management and resource reservation mechanisms for adaptive real-time services and multimedia applications running on mobile terminals being connected to a wireless network to dynamically adapt to time-varying link characteristics of the underlying mobile radio channel. Thereby, concepts based on an integration and coordination of local, peer and network resource management shall be realized that allow peers to pre-negotiate a common set of capabilities, qualities and adaptation mechanisms before the actual communication takes place in order to provide a guaranteed end-to-end quality for said terminals.

This object is achieved by means of the features of the independent claims. Advantageous features are defined in the dependent claims. Further objects and advantages of the invention are apparent in the following detailed description.

SUMMARY OF THE INVENTION

The underlying invention is basically dedicated to a model for defining user profile and terminal capability information in such a way that hierarchical QoS contract specifications (e.g. compelling correlations across different sets of QoS contracts for related media streams) can be enforced and used for deriving negotiable information. As a reference implementation of this concept, this invention describes a novel usage of the Session Initiation Protocol (SIP) standardized by the Internet Engineering Task Force (IETF) in conjunction with extensions of the Session Description Protocol. Next Generation (SDPng) specification based on the Extensible Markup Language (XML) in order to implement End-to-End QoS Negotiation Protocol (E2ENP) concepts.

More specifically, the hereby proposed model extends the SDPng negotiation mechanisms by allowing

- sections of SDPng carrying different pieces of complementary information being transmitted at different phases of the E2ENP allowing the formation of a full negotiation picture by complementing the negotiation phases, in which each phase is explicitly mentioned in the SDPng description;
- the enforcement of time frames for some of said sections used for the pre-negotiation phase, thus avoiding obsolete information being wrongly enforced later.

BRIEF DESCRIPTION OF THE CLAIMS

One aspect of the invention refers to an extension of the Session Description Protocol Next Generation for implementing concepts needed in the scope of the End-to-End Negotiation Protocol (E2ENP) that provides a guaranteed end-to-end quality for a telecommunication session wherein multimedia applications running on mobile terminals being connected to a wireless network are involved to dynamically adapt to time-varying link characteristics of the underlying mobile radio channel. In this context, said concepts are based on an integration and coordination of local, peer and network resource management that allows peers to pre-negotiate a common set of capabilities, qualities and adaptation mechanisms before the actual communication takes place. Thereby, said Session Description Protocol Next Generation (SDPng) is used for defining an application-level protocol.

Another aspect of the invention is directed to a method for implementing concepts needed in the scope of the End-to-End Negotiation Protocol (E2ENP) that provide a guaranteed end-to-end quality for a telecommunication session. Thereby, said SDPng can be applied to define user profile information which is used for deriving input for the E2ENP.

A further aspect of the invention pertains to an End-to-End Negotiation Protocol (E2ENP), in which a QoS-enabled telecommunication session is established by pre-negotiating alternative QoS aspects and capabilities on an end-to-end basis to beforehand establish a common level of alternative QoS and capabilities, the use of which all peers of the telecommunication session can agree upon.

Another aspect relates to a broker for an end-to-end negotiation providing a guaranteed end-to-end quality for a telecommunication session. Thereby, said broker is able to relieve peers of a network from carrying out the pre-negotiation phase and, optionally, the multi-stream time synchronization phase and the QoS correlation phase according to claim 35.

A further aspect refers to a software routine implementing a method when executed by a computing device.

Another aspect is directed to a peer, configured for implementing a method comprising a coordination unit coordinating the different phases of the negotiation process of the distributed resource management process.

A still further aspect pertains to a protocol providing a guaranteed end-to-end quality for a telecommunication session established by pre-negotiating alternative QoS aspects and capabilities on an end-to-end basis to beforehand establish a common level of alternative QoS and capabilities, the use of which all peers of the telecommunication session can agree upon. Moreover, the negotiation and re-negotiation of capabilities include signaling of the selected codecs and the configurations thereof.

BRIEF DESCRIPTION OF THE DRAWINGS

Further advantages and possible applications of the underlying invention result from the subordinate claims as well as from the following description of one embodiment of said invention which are depicted in the following drawings:

DETAILED DESCRIPTION OF THE UNDERLYING INVENTION

Figure 1:
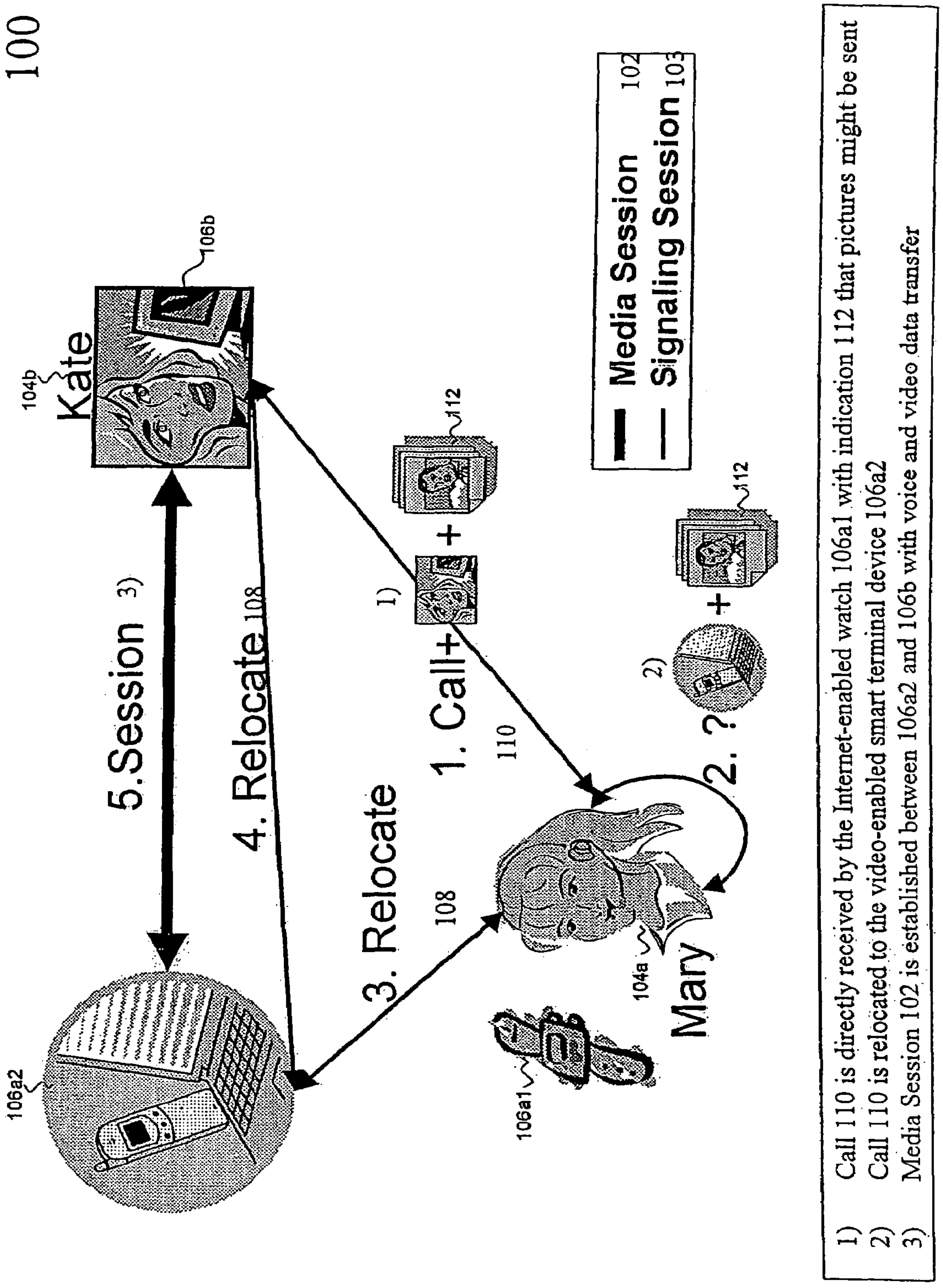
FIG. 1 depicts a one-to-one "third-party-assisted" communication scenario 100 showing the call relocation in a switch situation of a telecommunication session which presents the idea of how the future phone-like communication can be arranged, FIG. 2 exhibits a one-to-many communication scenario 200 showing a virtual lecturing, FIG. 3 outlines a many-to-many communication scenario showing a simple form of a videoconference, FIG. 4 outlines a many-to-many communication scenario showing a complex form of a videoconference.
Figure 2:
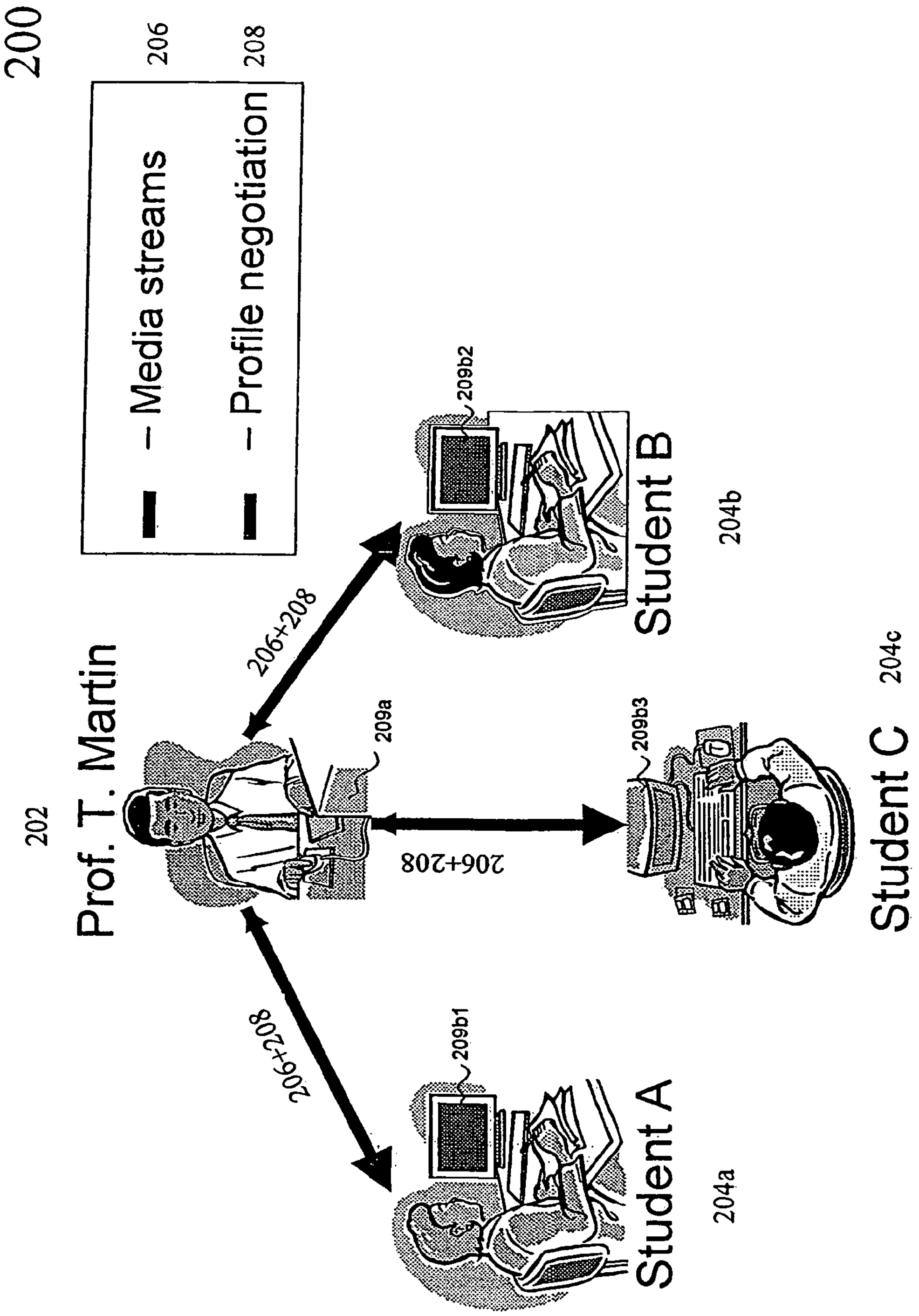
Figure 3:
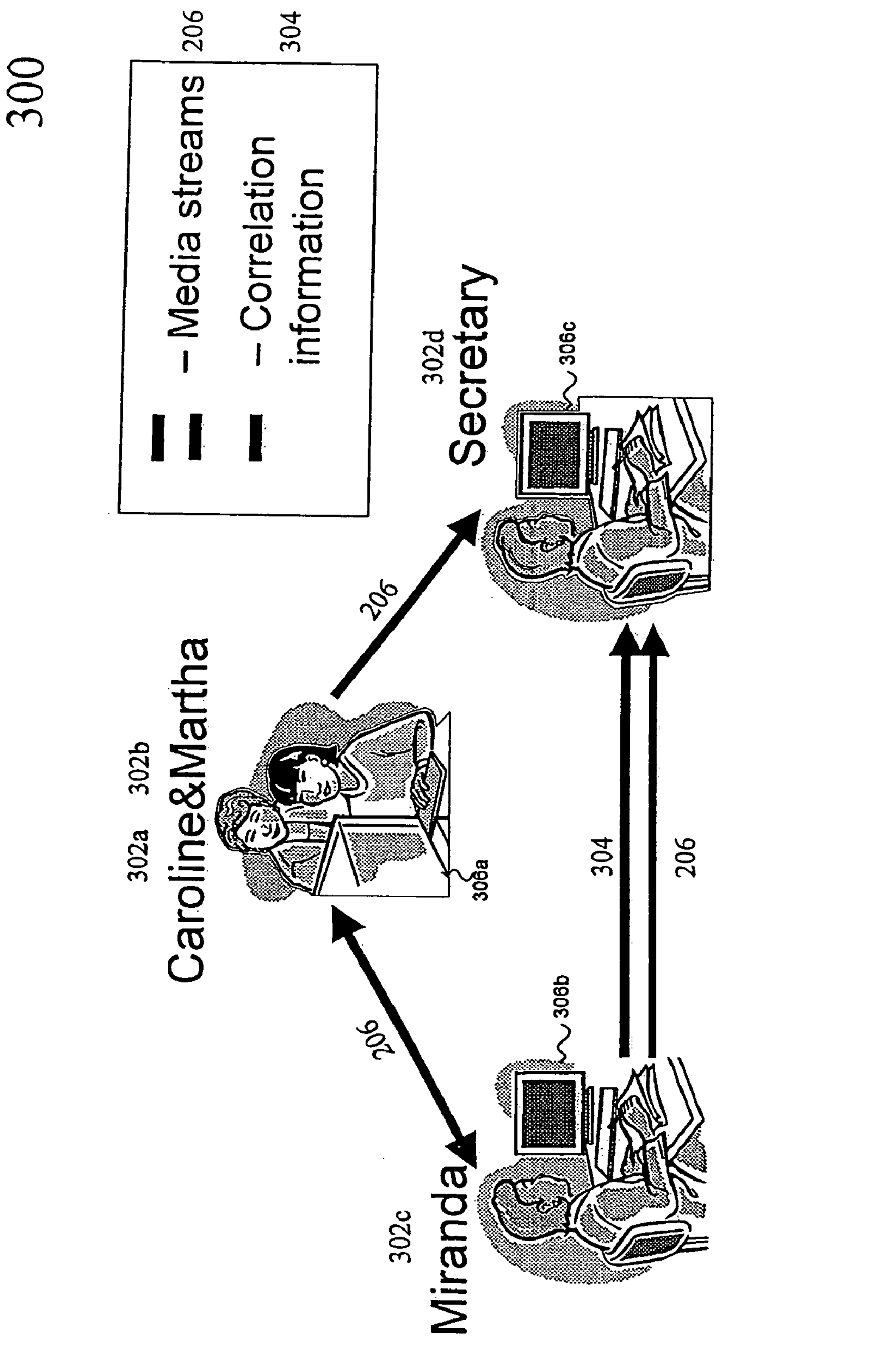
Figure 4:
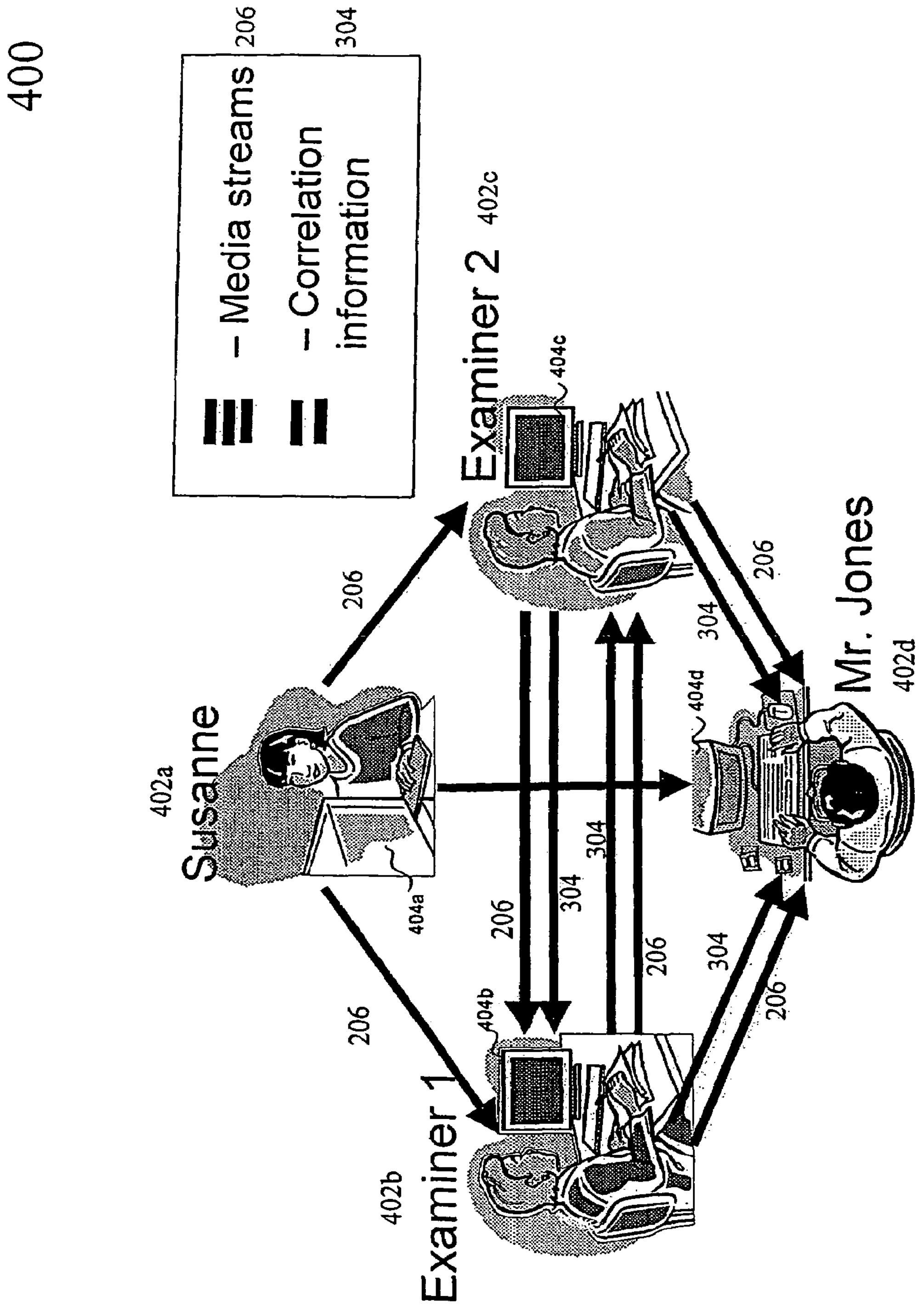
Figure 5:
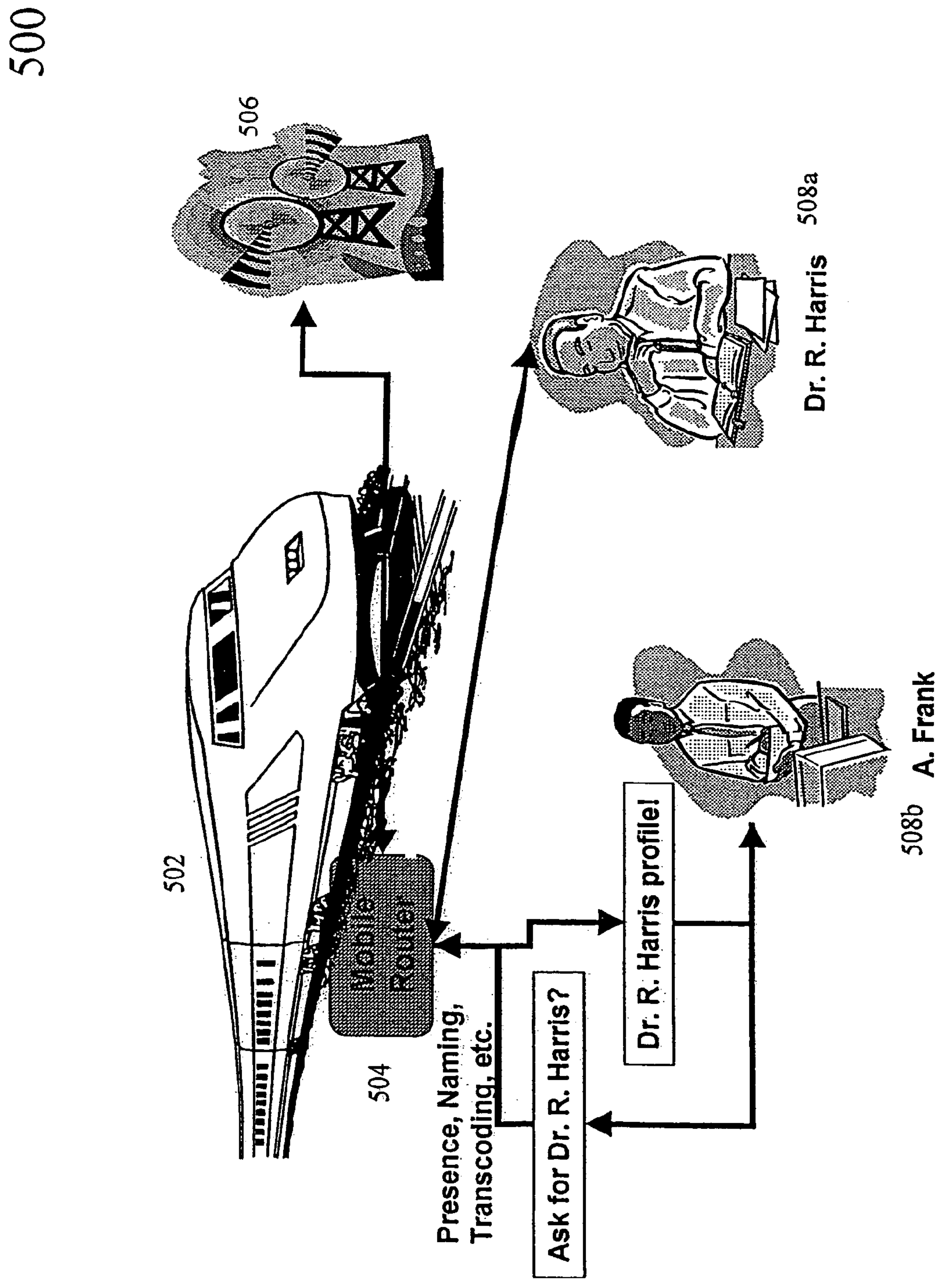
FIG. 5 presents an example showing several additional aspects of a multi-party communication considering the usage of some services that support the discovery of the communication parties and services, and the start of the negotiation, FIG. 6 outlines a scenario showing Why it is necessary to provide consistency, FIG. 7 outlines a scenario showing why it is necessary to avoid deadlocks, i.e. why the E2ENP must assure that there is no hold-and-wait condition or that such a condition may be present only for a limited amount of time.
Figure 6:
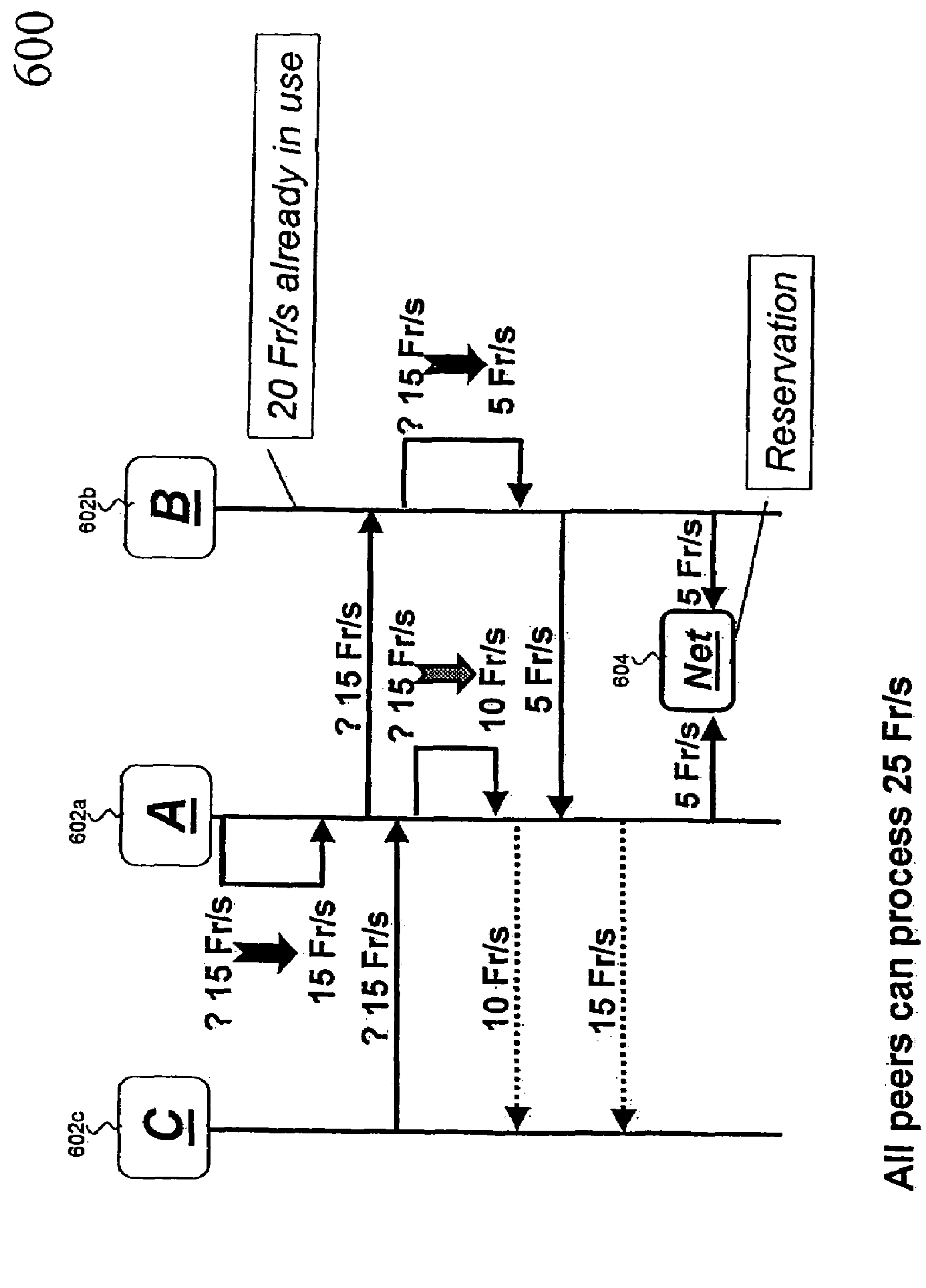
Figure 7:
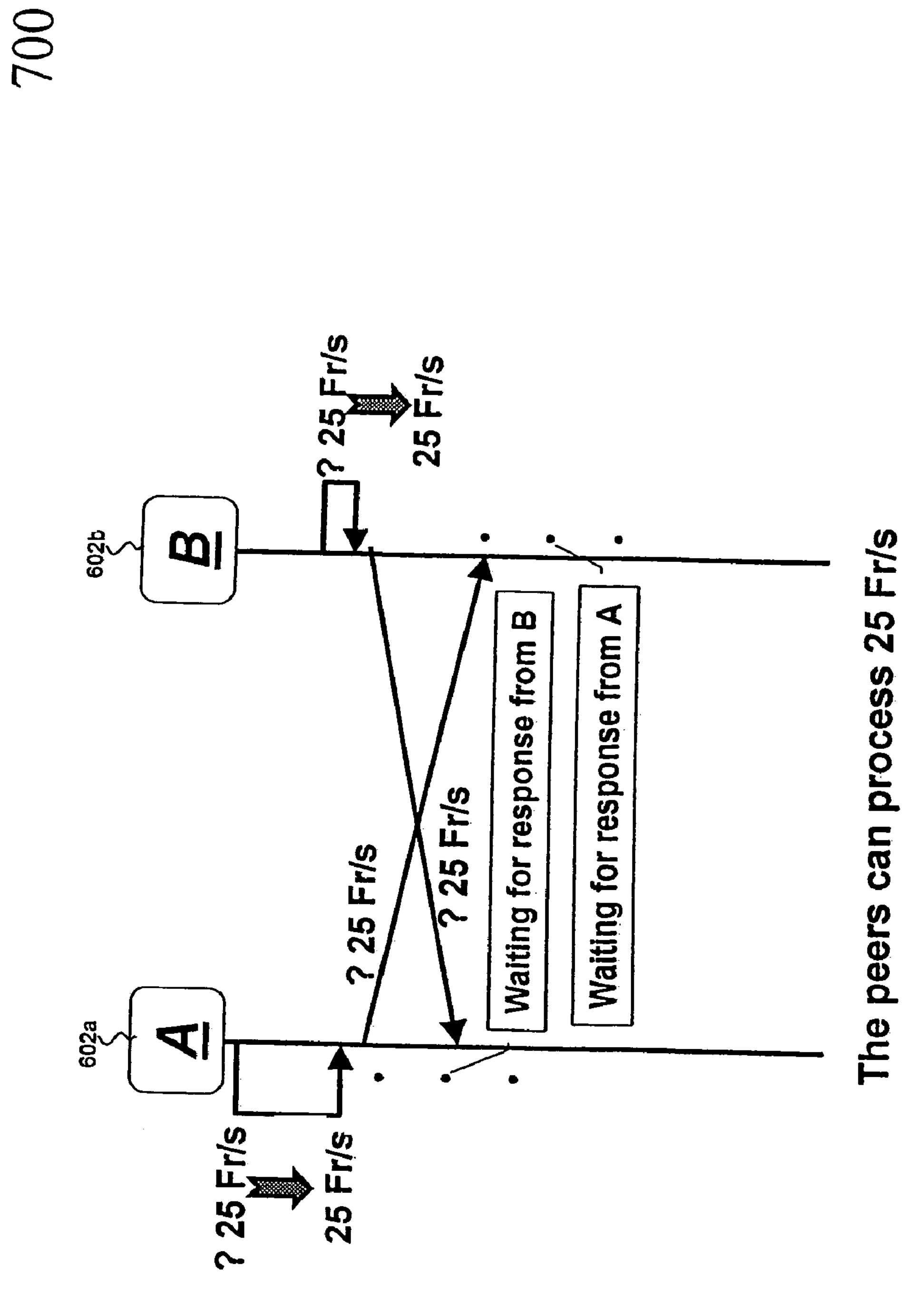
Figure 8:
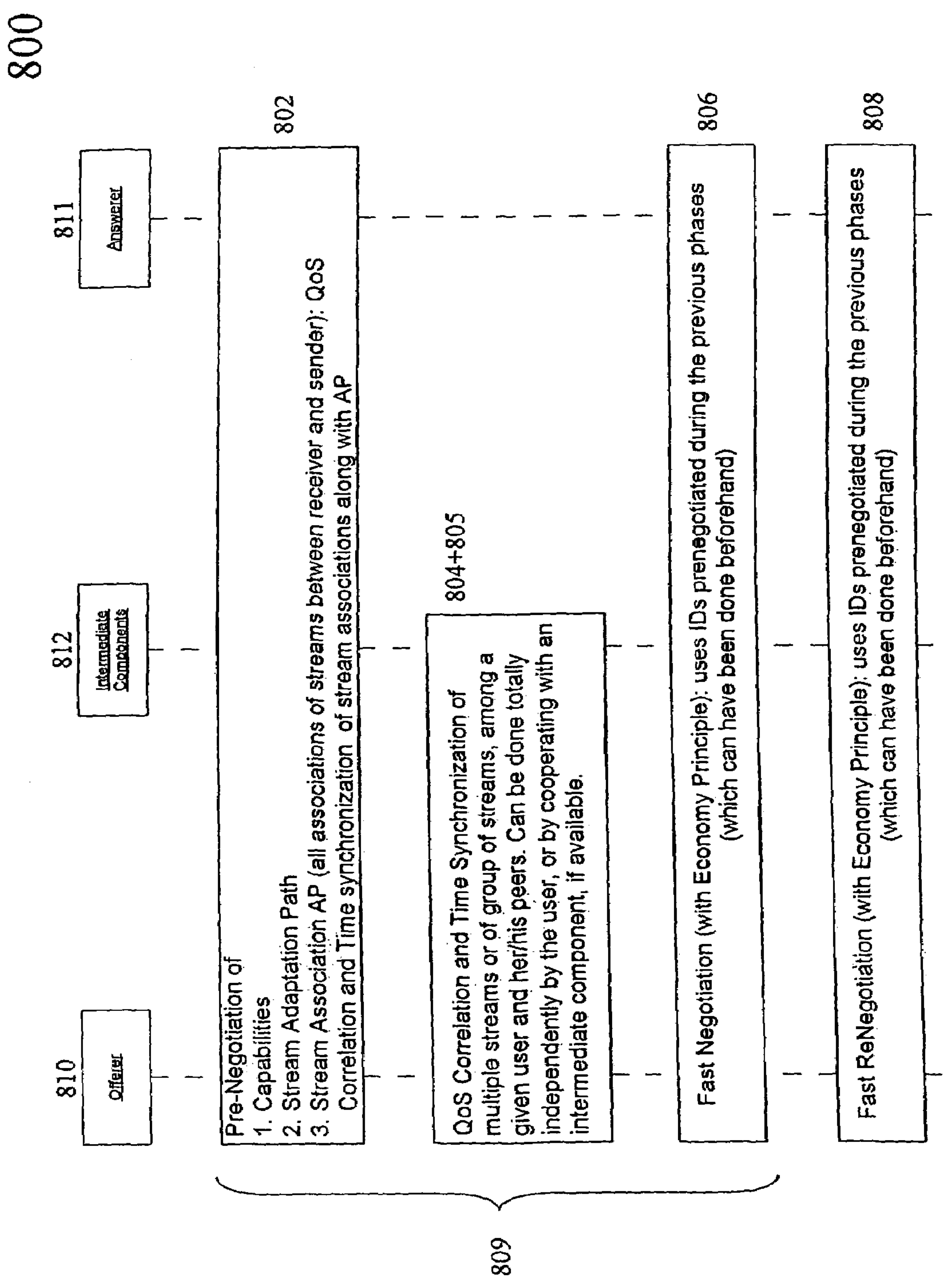
FIG. 8 depicts an interaction diagram showing the phases and actors of the E2ENP by a simple one-to-one negotiation scenario for establishing a simple one-to-one communication.

In the following, the preferred embodiment of the underlying invention as depicted in FIGS. 1 to 13 shall be explained in detail. The meaning of the symbols designated with reference signs in FIGS. 1 to 13 can be taken from Table 3.

1. Extension of the SDPng 912 for implementing concepts of the E2ENP 908 and the hereby-proposed extensions thereof, in particular:
   - SDPng (912) content can be derived from user profile information, which is then used as input for the E2ENP (908),
   - SDPng (912) content can be derived from terminal capability information, which is then used as input for the E2ENP (908),
   - introduction of two new SDPng sections detailing QoS aspects for a single media stream 206 or groups thereof,
   - modular use of sections: different SDPng (as proposed in the actual SDPng 912 draft and new) sections can be exchanged in the various phases of the E2ENP 908 protocol,
   - addition of a tag explicitly identifying each SDPng content in each phase of the E2ENP 908, in which the SDpng content actually becomes a Protocol Data Unit of the E2ENP 908, being piggybacked over SIP 910 or similar protocol (e.g. SCCP),
   - E2ENP 908 pre-negotiated SDPng information with a lease in order to timely limit the validity of this information, and
   - extension of SDPng 912 support for specifying different types of network 604 addresses, beyond the sheer support of IP v4.
2. Extension of the E2ENP 908:
   - use of SDPng 912 for defining user profile information to be used as input for the E2ENP 908,
   - use of SDPng 912 for defining terminal capability information to be used as input for the E2ENP 908,
   - detailed mapping of E2ENP 908 over the SIP 910 protocol via piggybacking, and In order to meet the requirements set forth in the previous chapter, a new protocol called End-to-End QoS Negotiation Protocol (E2ENP 908) is proposed.

Before proceeding with the description of the E2ENP 908 concept, some keys assumptions, completing the generic description of actors and scenarios described above, are hereby presented.

The Simple One-to-One Communication Scenario 800

The usage of the communication modes (push, pull and push-pull) may be situation and application dependant with respect to the senders and the receivers. Some standard usages of the modes are here described:

- If the offerer 810 has no notion how the profile of the answerer 811 looks like, the offerer 810 may use "pull" mode to first retrieve the settings of the answerer 811 and eventually adapt offerer 810's own settings.
- If the offerer 810 has no possibilities to adapt (or whatever other reason), the offerer 810 may "push" her/his settings to the answerer 811, thus eventually enforcing her/him to adapt and using "push" mode.
- If adaptation at the both sides may be necessary the "push-pull" mode might be used to enable three-way exchange of the offerer 810's proposal. This mode can be used for agreeing on two way communication.

By an assumption that the "receivers" should tune into given "senders", the "receivers" should be those who adapt. If the "senders" should match given "receivers", the adaptation takes place by the "senders".

There are three scenarios for the case of the simple one-to-one communication scenario 800 considering which party is the offerer 810 and which the answerer 811, which-party is sender or receiver, and if the both parties may send and receive:

Sender (Offerer 810)—Receiver (Answerer 811)

In general both "push" and "pull" modes can be used for this scenario according to the adaptation possibilities and rules of the sender and/or the receiver. If the offerer 810 is the one who should adapt, the offerer 810 should use a "pull"-mode, otherwise "push" mode should be used. The usage of "push-pull" mode may also be applied but by expected one-way data media stream 206 this would only complicate the signaling protocol and with be contradictory with the requirement for E2ENP-simplicity.

Receiver (offerer 810)—sender (answerer 811)

Also in this case both "push" and "pull" modes can be used according to the adaptation possibilities and rules of the sender and/or the receiver. If the offerer 810 is the one who should adapt, the offerer **106*b*** should use a "pull"mode, otherwise "push" mode should be used. The usage of "push-pull" here is also not recommendable for the same reasons as the scenario above.

Sender-Receiver (Offerer 810) or Sender-Receiver (Answerer 811)

When all peers plan to both send and receive media streams 206, the offerer 810 gathers information about the answerer 811's receiving capabilities and QoS desires, before the offerer 810 issues an invitation to the given answerer 811.

In this way, by invitation time the offerer 810 can send to the answerer 811 a proposal including:

information about the offerer 810's capabilities for sending and receiving media streams 206;

offerer 810's own desired QoS specification for receiving media streams 206, tailored on answerer 811's preferences; and QoS proposals for sending media streams 206, tailored on answerer 811's preferences.

The answerer 811 replies then to the offerer 810 with a subset of the offerer 810's bid.

This scenario most probably uses the "push-pull" mode since a bi-directional communication should be established.

One-to-Many Communication Scenario 200.

By one-to-many communication scenario 200 not all the combinations of connection modes and negotiation 806 modes are possible and reasonable. For instance, the "Single-Receiver and Many-Sender" scenario can cause overloading at receiver side, and this is why this case should be treated by forcing the receiver carrying out multiple negotiations 808 and 809 on a separate basis with every sender, like in the "Sender (Offerer 810)—Receiver (Answerer 811)" scenario.

Some well-known connection scenarios corresponding to the one-to-many scenario are:

Pure multicast: Receivers "tune" into given senders by selecting a given multicast group, based on pre-disseminated information (e.g. via SAP). In this case, the sender acts as a sort of offerer 810.

This scenario would work like the "Receiver (Offerer 810) Sender (Answerer 811)" scenario. This allows flexibility of joining and leaving the session 102. The answerer 811 can then adapt the session 102 on a single basis for every participant, but taking into account also the resources used by already existing sessions 102. Had instead the sender taken the role of offerer 810, some of the receivers might not have been able to cope with such requirements.

In both cases, the offerer 810 (either sender or receiver) could advantageously use offline pre-negotiated information for speeding up the communication setup at run time. Eventually this could be carried out through user agents as described in documents published by FIPA—the Foundation for Intelligent Physical Agents (http://www.fipa.org/), in the following referred to as [FIPA], or through a broker (but these cases are outside the scope of this document). All the scenarios where the single party is a receiver should be considered as one-to-one negotiation 806 since some separate resource management for every incoming media stream 206 may be necessary.

Many-to-Many Communication Scenario 300, 400 or 500

This case could be treated like the superposition of multiple negotiations 809 should the peers agree at the beginning on the choice of a conference leader, who orchestrated the negotiations 809 for joining/leaving the session 102 and managed the running of it. The peers could also make some a priori arrangements about how to configure the communication environment before they negotiate the real connections. The parallel and/or sequential negotiation 806 runs between the negotiating peers are application dependent and thereof out of the scope of the proposed solution according to the underlying invention.

The E2ENP 908 comprises four key phases, namely:

1. end-to-end QoS pre-negotiation phase 802;
2. multi-stream QoS correlation 804 and time synchronization 805 enforcement phase;
3. end-to-end QoS compact negotiation (with economy principle) phase, or, more shortly, "fast negotiation" 806, and
4. end-to-end QoS compact re-negotiation (with economy principle) phase, or, more shortly, "fast re-negotiation" 808.

All the four phases can be concatenated within the lifetime of a given media session 102. Alternatively, the first two phases may be executed independently of the latter two and at different times, but strictly following the given order. As a consequence, given that the results of the various E2ENP 908 phases are valid within a limited amount of time, the corresponding validity timescales may differ from phase to phase.

More specifically, the end-to-end QoS pre-negotiation phase 802 can be executed a priori, and the results can then be applied to the remaining phases of multiple successive telecommunication sessions 102 at later times. This phase is characterized by a process that end peers can perform before the actual start of a media session 102, and independently of the session 102 itself. The object of this phase is to enable the exchange—in a non-obliged manner—of information among peers, concerning configurations of capabilities and QoS contracts 1108, as deduced from their QoS-profiles.

These configurations include adaptation paths, so that the end peers can proactively agree on the way to react to possible QoS changes or QoS violations in an effective and efficient manner. Optionally, this phase allows each couple of peers negotiating Group adaptation paths at Association level, i.e. enforcing QoS correlation 804 and time synchronization 805 across all the media streams 206 established between the given couple of peers.

This information exchange has informational character for the involved peers, and is used not only for informing each other ahead about the capabilities and performance possibilities applicable to the given set of peers, but also for reaching agreements on redefining some of those configurations. In this way, the peers are thus able to establish a common vocabulary, a priori of any specific business.

The multi-stream QoS correlation 804 and time synchronization 805 enforcement phase is optional, insofar as it is required only if peers are planning to establish multiple media streams 206 needing to be correlated and synchronized. The individual peers solely apply such a phase. As an exception, a separate entity (e.g. an intermediate component like a conference call bridge) could also employ this phase, should the various peer delegate it to carry out complex negotiations 806 among them. The case of intermediate components is out of the scope of this writing, and it is only mentioned for the sake of completeness. The phases and actors of the E2ENP 908 can be taken from the interaction diagram depicted in FIG. 8.

The third phase is characterized by a process that end peers can perform either before or at the actual start of a media session 102 in order to agree on a given QoS level to be enforced for the given session 102 and media streams 206, based on results of a previously applied end-to-end QoS pre-negotiation 802 process. This process is considerably faster compared to the case of an end-to-end QoS full negotiation 806, since only references of pre-negotiated information are actually exchanged among peers. An end-to-end QoS full negotiation 806 is a process that end peers can perform either before or at the actual start of a session in order to agree on a given QoS level to enforce for the given session and streams, eventually by redefining some of the originally proposed configurations of QoS specifications. At completion of the end-to-end QoS compact negotiation process, the end peers have agreed on the QoS-profiles they are going to use for the communication. At completion of the end-to-end QoS compact negotiation 806 process, the end peers have agreed on the QoS-profiles they are going to use for the communication.

The fourth phase is characterized by process that end peers can trigger upon detection of either a QoS change or a QoS violation in order to agree on a given QoS level to be enforced for the given media session 102, based on results of a previously, applied end-to-end QoS pre-negotiation 802 process.

This process is considerably faster compared to the case of a end-to-end QoS full re-negotiation 808, since only references of pre-negotiated information are actually exchanged among peers. An end-to-end QoS pre-negotiation 802 is a process that end peers can trigger upon detection of either a QoS change or a QoS violation in order to agree on a given QoS level to be enforced for the given session and streams, eventually by redefining some of the originally proposed configurations of QoS specifications. At completion of the end-to-end QoS compact re-negotiation process, the end peers have agreed on new QoS-profiles they are going to use for the communication.

At completion of the end-to-end QoS compact re-negotiation 808 process, the end peers have agreed on new QoS-profiles they are going to use for the communication.

The end-to-end QoS compact re-negotiation phase 808 can be applied several times during the lifetime of any given media session 102.

Based on the requirements set forth above, peers can proactively pre-negotiate a common resource management policy in order to avoid instabilities whenever the conditions leading to re-negotiations 808 are met.

To this extent, peers can perform re-negotiations 808 at two different levels:

- a fast, in-band signaling process (by e.g. changing at runtime in the RTP packet header the RTP payload type, without affecting the currently enforced application-level QoS contracts 1108), and
- a more structured process, based on the end-to-end, QoS re-negotiation phase 808 (whenever the former process is not sufficient to cope with a given QoS violation/ Change).

More specifically, peers can dynamically choose to use any payload type applicable for a given user-level QoS contract 1108, as described below. This choice would reflect in an instance of the usual RTP in-band signaling as a form of very fast re-negotiation 808. Whereas, should QoS violations or QoS changes occur, requiring enforcing a new user-level QoS contract 1108, the end-to-end QoS re-negotiation phase 808 would take place.

The RTP Payload Type field contained in the RTP headers may be used by senders for signaling in-band to their receivers the decision to use another (negotiated) codec. This is a form of re-negotiation 808, which per se would be transparent to the E2ENP 908. However peers using this in-band signaling may still advantageously use E2ENP 908 for reacting effectively and efficiently to QoS violations/changes. Within this context, the use of in-band RTP signaling can easily be harmonized by forcing peers to validate the new proposed codec against any pre-negotiated information, not only in terms of capabilities but also of QoS contracts 1108).

This means that the sender would first of all validate (and pre-book resources accordingly) the new capability, as well a new QoS contract 1108 (optimizing the use of that capability), with respect to the pre-negotiated information. On the other hand, each receiver would validate the new capability signaled in-band by the sender, against the pre-negotiated information.

There may be cases, where the receiver detects that not enough resources are available for activating the given codec, whereas the sender has already switched codec and sent packets encoded with it. The receiver can therefore not decode those packets, or decode them at a lower QoS level (e.g. at lower speed/frame-rate). To work around this problem, it can be assumed that the receiver chooses the latter option (decoding at lower QoS level), but signals explicitly to the sender to select a lower QoS level (via E2ENP 908 compact re-negotiation 808), for example an intermediate one (assuming pre-negotiated information is available). To this extent, it is necessary to mention that losing or not interpreting a single video packet, for the time of the QoS switch between the sender and the receiver, is not so critical, since from the perspective of the human user the missing single video frame is not easily noticed. Thus, the user perceived video QoS should not be considered severely affected by such minor video disturbances. On the other hand losing or not interpreting a single audio packet results in audible cracks which should be considered a violation from the user perspective. A possible solution to this problem can be the sending of redundant audio data with the same or different quality in the same audio packet as described in "RTP Payload for Redundant Audio Data" (RFC 2198, Network 604 Working Group, September 1997) by C. Perkins et al., in the following referred to as [RFC2198]. The packets carry thus the audio data twice and if a single audio packet gets lost the following one redundantly supercedes the lost data. For supporting the user perceived audio QoS such duplicated information should be delivered with respect to the agreed capabilities and QoS contracts 1108 between the peers, thus enabling the sender to deliver in parallel differently coded audio data. The receiving of single audio'packets with lower quality should not be considered a violation from the user perspective, since a human would rare perceive such changes as e.g. singularity switches between mono and stereo, if the mono signal is played simultaneously on all the audio boxes of the device. In general terms the accumulation of audio and video singularity disturbances should be considered a violation and should be allowed only for the time of a running re-negotiations 808. The treatment of the occurring media singularities is a problem of the realization of the resource management; the tolerance and control mechanisms, etc. and may be application and heuristics dependant.

Key issues for realizing the mechanism described above are:

1. The in-band signaling does not suffice to allow peers agreeing on QoS contracts 1108 to enforce: the complete re-negotiation 808 mechanism is in fact achievable by using more structured approaches, like the E2ENP 908. However, as an alternative to using E2ENP 908, the receiver may monitor the current QoS level, eventually by leveraging RTCP monitors, and thus identify which of the pre-negotiated QoS contracts 1108 the sender is currently enforcing.

2. Network resource reservations should not be committed until both peers have agreed on what codec and what QoS contract 1108 to enforce. The E2ENP 908 guarantees this, thanks to the, "economy principle".

Based on requirements needed for coping with handover scenarios, all those QoS contracts 1108 not supported by the given users' preferred network provider could be advantageously considered as spare ones. These contracts 1108 would have to be negotiated, insofar as the offerer 810 and the answerer 811 could advantageously agree a priori on similar contracts 1108, so as to take into account agreements between the other peers and their currently used network providers.

When a vertical handover occurs, either peer can try to validate all of her/his contracts 1108, including the spare ones, which might eventually become applicable with respect to the new network provider and/or new type of access network 604. This means that the peer detecting a QoS violation or change can, upon finding that some spare contracts 1108 are now validated, initiate an end-to-end QoS compact renegotiation phase 808, not only for indicating the new QoS contract 1108 to enforce, but also to "unblock" said pre-negotiated spare contracts 1108.

Furthermore, one should note that after a vertical handover some of the previously valid contracts 1108 might be no longer applicable. This means that the "blocking" of such contracts 1108 should also be taken into account during the end-to-end QoS compact re-negotiation phase 808.

The E2ENP 908 interacts with the local resource management functions during all the four phases. More specifically, the E2ENP 908 interacts with the local and network resource management functions during both the end-to-end QoS compact negotiation phase 806 and the end-to-end QoS compact re-negotiation phase 808 according to the "economy principle", and based on the resource management policies pre-negotiated during the end-to-end QoS pre-negotiation phase 802.

Given the hierarchical structure of the QoS specification prescribed by the requirements, it can be envisioned that a model meeting nicely those requirements is the one based on the concept of hierarchical Finite State Machine (FSM) as described in "The Unified Modeling Language user Guide" (Addison Wesley Longman, 1999) by G. Booch, J. Rumbaugh and I. Jacobson, in the following referred to as [Booch99]. In such a model, each QoS contract 1108 corresponds to a state of a hierarchical FSM. At the lowest level of this hierarchical structure, states map to QoS contracts 1108 of individual media streams 206. The nominal QoS contract 1108 (i.e. the one, which the user wishes to enable by defaults) corresponds to the Initial state of the FSM associated With the given adaptation path. Each adaptation path corresponds to an elemental FSM, in which states are mutually exclusive. States and/or complete elemental FSMs can be nested within higher-level states, which in turn are associated with QoS contracts 1108, as indicated above: this represents the concept of QoS context. Within a given higher-level state, concurrent nested FSMs can co-exist: this represents a group of adaptation paths being correlated by given QoS context.

Each transition of such hierarchical FSM describes a peculiar change of QoS contract 1108 in reaction to a given event, e.g. a QoS violation. The transitions are triggered whenever specific predicates evaluate to true: this translates in our model to comparing the values of specific monitored QoS parameters against the corresponding values stated in the given QoS contracts 1108.

Transitions are associated eventually with high-level actions (e.g. drop an existing media stream 206 or start a new media stream 206). These actions can eventually cause the generation of events to the users indicating a temporary out of service condition, e.g. due to a hand-over occurrence.

Differently from QoS Description Language (QDL) as described in [Loyal], the specifications of QoS contracts 1108 (and, to a limited extent, of QoS contexts) and of the hierarchical FSM are de-coupled from each other. This introduces modularity and thus flexibility to the design: one can combine a given QoS contract 1108 with different adaptation policies, and adaptation policies can be configured with different hierarchical FSMs.

The negotiation 806 process employed by the E2ENP 908 basically consists of running a non-iterative negotiation 806 process at connection establishment time, in which peers simply exchange among themselves a set of state identifiers, with respect to the hierarchical FSM representing a given pre-negotiated adaptation path.

The offerer 810 will propose a bid, and each answerer 811 will validate the bid against its own adaptation policies, and accordingly respond with a counteroffer. This model limits the scope of the counteroffers to the definition of a subset of the original bid (in order to limit the complexity of the problem). This translates at answerer-level as follows:

- into a QoS contract conformance verification according to [Frolu98] applied to each item in the bid, with respect to the pre-negotiated QoS contract types and QoS contracts 1108; should the contracts 1108 be expressed in an XML document, conformance verification could be achieved e.g. by enforcing a pre-defined, specific XML Document Type Definition (DTD).
- into an optional set of pruning operations applied onto the structure of the original pre-negotiated hierarchical FSM.

One should note that whenever a new peer joins a group of already communicating peers, the new peer might act as the offerer 810 of a new E2ENP process (eventually starting from the end-to-end QoS compact negotiation phase, should the new peer already have pre-negotiated information with the communicating peers), following the same mechanisms described above. Furthermore, any ad hoc creation, modification, or removal of QoS contexts and/or media streams 206 after that the negotiation 809 process has been successfully completed (and not taken already into account as a QoS change within the negotiated adaptation path), would trigger a new instance of the negotiation process 808 and 809. More specifically, one should note that the user might deliberately cause a QoS change on an already running multimedia application, for example in order to increase or decrease the overall level of QoS, or some part of it only. This negotiation 808 and 809 would reflect in a change in the QoS contracts 1108 associated with the adaptation path, but could also reflect on the structure of adaptation path itself. Since the negotiation process 808 and 809 is quite expensive, any successive incremental reapplication of the E2ENP 908 or parts thereof can cause inefficiencies. To this extent, it should be noted:

- In a video-on-demand scenario, both parties simply agree a priori on an adaptation path for a predetermined set of media streams 206 in order to cope with QoS violations or QoS changes. The variability of the aforementioned ad hoc changes therefore does not apply to this case.
- The offerer 810 can eventually already take into account events like the creation, modification, or removal of QoS contexts and/or media stream 206 within the adaptation path it bids.
- After the initial negotiation 809, all peers can more quickly converge to negotiation 806 agreements compared to the case of the initial negotiation 809, since the majority of them are using an already negotiated hierarchical FSM.

The rules for handling these situations are however heavily dependent on the type of management applied to the given telecommunication sessions 102. For instance, in the case of conference-services, this translates into choosing, specific conference control policies and protocols. Therefore, the sheer E2ENP 908 functionality is devised in such a way that it delegates these high level session 102 management tasks to external mechanisms and protocols, which are thus outside of the scope of the underlying invention.

By extending the E2ENP 908 phased-approach, refinements are envisioned, as the introduction of micro-phases. This means that peers can incrementally update pre-negotiated information, e.g. for adjusting pre-negotiated information in case of vertical handovers, in which the new access network 604 technology/capacity and/or new network provider can offer different QoS levels, compared to the pre-negotiated ones. To this extent, is necessary a modular description of negotiable items, so that those, which are not affected by the changes, are kept valid. This means that for such items no full re-negotiation 808 would be then necessary, with evident benefits in terms of performance with respect to the QoS changes/Violations treatment.

This concept is left for further study. More specifically, aspects like impact on pre-existing state machines describing pre-negotiated APs must be considered in detail.

In the following sections, possible ways of implementing the proposed solution by leveraging existing protocols like SIP 910 and SDPng 912 shall be presented.

Figure 9:
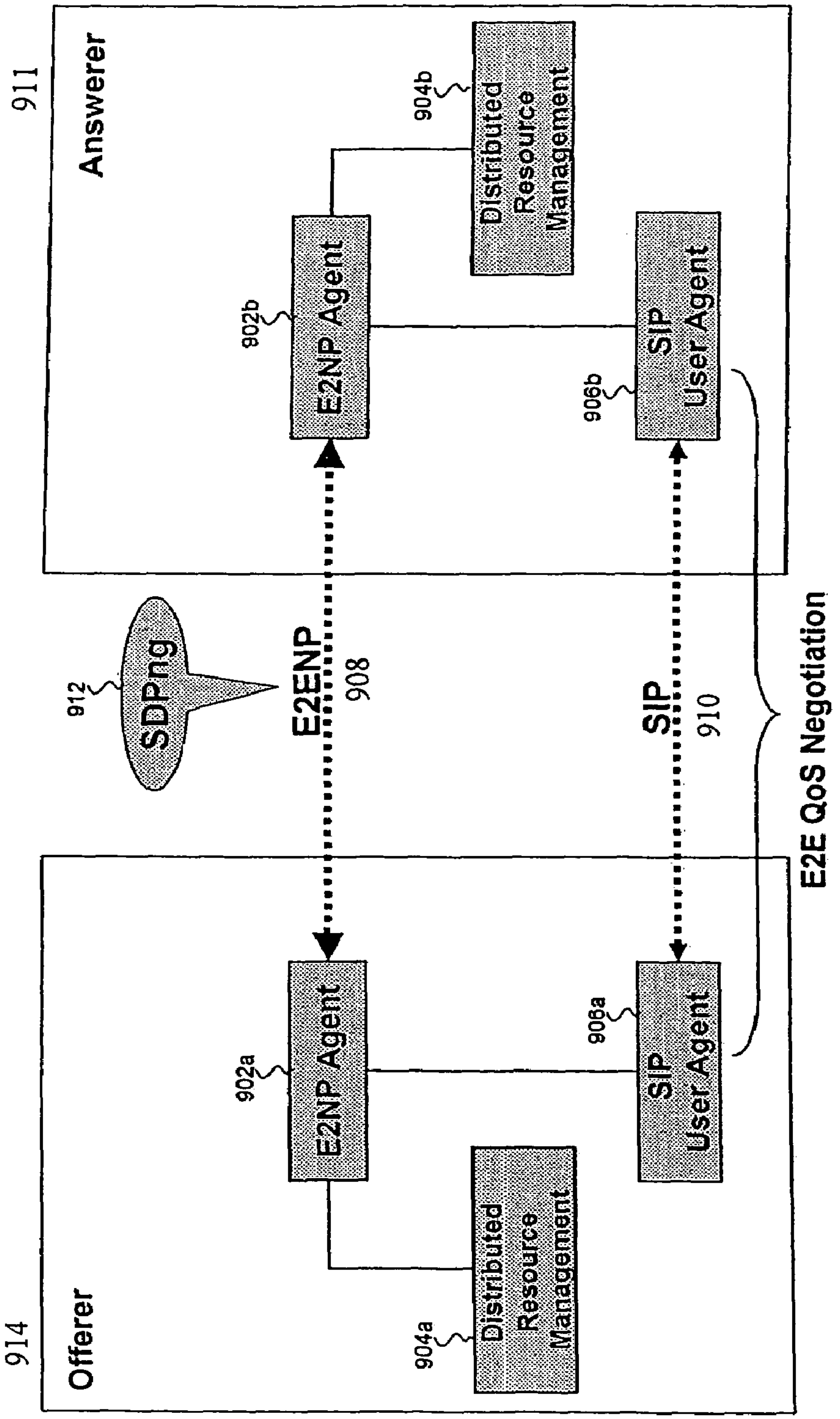
FIG. 9 shows the functionality of the E2ENP using the SDPng and the SIP.

To this extent, the SIP 910 will be used in novel modes but will remain substantially unchanged; whereas extensions and some changes of the SDPng specification are hereby proposed so as to meet the requirements set forth above. The functionality of the E2ENP 908 using the SDPng 912 and the SIP 910 is depicted in FIG. 9.

The idea is to extend the usage of SIP 910 and to enhance the SDPnq specification (which is currently being studied within the IETF MMUSIC Working Group) to include E2ENP requirements, with minimal and modular changes. This is not yet a full-fledged specification, rather a detailed explanation of the hereby-proposed idea, aiming to raise interest and stir discussion within the technical community.

Before proceeding any further, the issue of application-level QoS specification shall be addressed.

Users are typically interested in defining what information they want to exchange with peers and with which quality (especially if they will have to pay not only for the content but also for QoS), independently of how their requests will be actually carried out by their terminal devices and the network 604. Therefore, it can be expected that users will express their wishes by detailing content description and QoS contracts 1108. This type of QoS specification is called user-level QoS specification.

Furthermore, it shall be assumed that users may want to define a set of QoS contracts 1108 as associated with a set of multiple different contents and/or services. To this extent, it can be expected that users will be willing to either specify these QoS contracts 1108 on the fly or, more advantageously, predefine and store them in so-called user profile information databases.

Applications or middleware will translate the user-level QoS specification into Application-Level QoS Specification, which is hereby considered as input for the E2ENP 908.

In the scope of the underlying invention, we are in fact interested in specifying QoS as the user perceives it as described in "A Framework for End-to-End User-Perceived Quality of Service negotiation 806" (IETF Internet Draft, work in progress, <draft-bos-mmusic-sdpqos-framework-00.txt>) by L. Bos, et al., in the following referred to as [Bos01]. However, we do not care, how the user expresses this.

Clearly, there needs to be a mapping from the users wishes and preferences to a set of QoS parameters, which define the quality of the end-to-end transmission process. This set of parameters is called the application-level QoS. This mapping is application-specific and out of scope.

The following XML document is an example of how application-level QoS contracts 1108 can be specified in this example, only QoS contracts 1108 for audio and video media streams 206 are indicated, but the extension to include other types of media streams 206 (like data or control media streams 206) is straightforward. For each type-of-media stream 206, a set of application-level QoS parameters are specified in terms of nominal values, nominal sets, or operative ranges.

The parameters indicated in the QoS contracts 1108 for audio media streams 206 reflect the audio codec parameters indicated in [RTP-Profile], with the difference that user profile information will describe ranges rather than fixed configurations of those parameters. On the other hand, the parameters indicated in the QoS contracts 1108 for audio media streams 206 do not reflect the [RTP-Profile]prescriptions; rather, QoS parameters suggested in [BRAIN] are used.

```
<profile name="my-preferred-stream-level-QoS-contracts">
    <contract name="my-audio-contract-1" type="audio"
    sampling-rate-set="4000, 8000" channel-set="1"/>
    <contract name="my-audio-contract-2" type="audio"
    sampling-rate-range="8000, 12000" channel-set="1,2"/>
    <contract name="my-audio-contract-3" type="audio"
    sampling-rate-range="12000, 16000" channel-set="1"/>
    <contract name="my-audio-contract-4" type="audio"
    sampling-rate-range="16000, 44100" channel-set="1"/>
    <contract name="my-video-contract-1" type="video"
    frame-rate-range="10,15" frame-size-set="CIF"
    color-quality-range="9100, 9700"
    overall-quality-range="9500, 9800" />
    <contract name="my-video-contract-2" type="video"
    frame-rate-range="15,20" frame-size-set="QCIF, CIF"
    color-quality-range="9700, 9850"
    overall-quality-range="9800, 9900"/>
    <contract name="my-video-contract-3" type="video"
    frame-rate-range="20,25" frame-size-set="QCIF"
    color-quality-range="9850, 9900"
    overall-quality-range="9900, 9960"/>
    <contract name="my-video-contract-4" type="video"
    frame-rate-range="25,30" frame-size-set="CIF"
    color-quality-range="9900, 9970"
    overall-quality-range="9960, 9990"/>
</profile>
```

XML EXAMPLE 1

In user profiles, users may specify QoS with different levels of granularities: specific target values or operative ranges, either as discrete sets or as continuous intervals. The frame-size-set indicates the size of the represented frames. It can be both specified as a standard frame-size (CIF, QCIF, SIF, etc.) or a width-height resolution in pixel (e.g. 352×288).

The frame-rate-set denotes an interval for specifying target frame rate of the peers. For example, if the frame rate is set to 20 Fr/s, the sender should be able to compress, packetise and send 20 frames per second. The receiver should be able to decode and render 20 Fr/s. Additional information the video codecs mapping with respect to the frame size can be found in "IP/TV CODECs, File Transfer and Storage Requirement Considerations" (White Paper, Jul. 2000, http://www. cisco- .com/warp/public/cc/pd/mxsv/iptv3400/tech/ipcod_w-p.htm), in the following referred to as [WP-CISCO].

The color-quality-range and the overall-quality-range indicate a range of possible levels of compression for a single frame which may be available for a given codec. The higher the produced compression of the video data, the lower is the quality. In [Handl98], it is suggested to express the quality with numbers between 0 (lowest quality) and 10 (highest quality), indicating that this should be the quality of a single frame. However, this resolution is quite small considering that the existing codecs and the codecs to be developed in the future may have more than 10 compression levels. The so-defined range as described in [Handl98] does not fulfill the requirements defined above, therefore the proposal for a broader quality range between 0 and 10000, where 0 is the lowest quality and 10000 the highest. This range should be applied to both the color-quality-range and the overall-quality-range. Since the quality of the chrominance planes of a single frame are not relevant for every codec the color-quality-range should be considered optional.

The following section describes an SDPng extension proposal taking into account the requirements set forth above (For the sake of simplicity and readability in this document we follow the convention of indicating characters like "&" as is, instead of the escaped version (i.e. "&" for "&") mandated by the XML standard). In this context, the object is to define modular extensions to SDPng 912. This can be achieved by introducing a set of new sections within the new namespace "e2enp". The new sections can be defined either as part of a new version of SDPng 912, or in a separate SDPng 912 profile named E2ENP 908, containing the corresponding XML schema as described in "XML Schema: Primer", "XML Schema: Structures", and "XML Schema: Datatypes" (W3C, 2001), in the following referred to as [XMLSC]. Such a new E2ENP 908 profile would thus feature a header like the following:

```
<xml:schema targetNamespace="http://www.iana.org/sdpng/e2enp"
    xmlns:e2enp="http://www.iana.org/sdpng/e2enp"
    xmlns:sdpng:"http://www.iana.org/sdpng"
    xmlns:xsd="http://www.w3.org/2001/XMLSchema"
    elementFormDefault="qualified"
    attributeFormDefault="unqualified">
<xsd:import namespace="http:www.iana.org/sdpng"
    schema-location="sdpng.sd"/>
```

XML EXAMPLE 2

In any case, some changes to the current SDPng proposal—including the Audio Codec and RTP profiles—defined in "Session Description and Capability Negotiation" (IETF Internet Draft, work in progress, <draft-ietf-mmusic-sdpng-03.txt>) by D. Kutscher et al., in the following referred to as [SDPNG03], are hereby proposed. If accepted, these changes would therefore affect the original SDPng 912 (and Audio Codec and RTP profiles) XML schema.

The decision whether to move to a new version of SDPng 912 or to define an extension thereof is left for discussion.

The new namespace "e2enp" shall be indicated in the root element of the SDPng document (i.e. the <desc> element).

First of all, this proposal introduces the use of a new SDPng section <e2enp:purpose>, in order uniquely identify. SDPng content as associated with specific E2ENP 908 phases, according to the requirements set forth above. Since the SDPng information is meant to be piggybacked via SIP 910 standard methods, this approach allows extending the usage possibilities of SIP 910, by defining an E2ENP 908 SDPng-based meta protocol, without changing SIP 910 semantics and grammar.

Furthermore in order to enforce the E2ENP 908 features, this proposal (i) defines other two new SDPng sections, <e2enp:qosdef> and <e2enp:qoscfg>, and (ii) allows the various resulting sections of the SDPng 912 being independently delivered by SIP 910 (or other signaling session 103 protocols) via piggybacking, at different times and via different methods, according to the various E2ENP 908 phases.

This proposal introduces small changes to the SDPng 912 <cfg> section, and provides detailed guidelines how the information contained in that section should be linked to the other new sections.

This proposal revises also the SDPng 912 <constraints> section semantics, since the <e2enp:qoscfg> section, which allows specifying QoS correlation 804 and time synchronization 805 constraints and already covers most of the corresponding features.

This proposal thus attempts to define as much as possible modular extensions of SDPng 912, so as to allow easy interoperability with applications not supporting said extensions.

SIP 910 is defined as a signaling session 103 protocol for establishing communication between peers. It considers in general only the initiation of the connection, leaving aside the usage and/or application-specific features. These features are described with the means of SDP or SDPng 912.

In some cases, it is necessary for the application to have some additional information about how to treat the SDP/SDPng information-delivered over SIP 910, especially considering that from application perspective, the protocol runs as in a modular way. The "modular way" does not always fulfil the ACID (atomicity, consistency, isolation, durability)—characteristics of transactions, which is why this SIP procedure should NOT be in general considered a transaction.

Since the E2ENP 908 requires three different information exchanges among peers (namely, the end-to-end QoS pre-negotiation 802, end-to-end QoS negotiation 806, and end-to-end QoS re-negotiation 808 phases), it is necessary to differentiate inside the protocol the corresponding procedures.

SDPng 912 can explicitly carry the signaling about the type of phase, the start/stop of the given phase, and/or the resource reservation status, independently of SIP 910 (or whatever signaling session 103 protocol is used for piggybacking SDPng information). To this extent, a Spng-based meta protocol shall be defined, by introducing a new SDPng section, to be present in all the E2ENP-related SDPng information, at the very beginning of the SDPng content, as form of PDU header.

The following example shows a possible instantiation of the <e2enp:purpose> sections:

```
<e2enp:purpose>
  <session user="Mary" session-id="2890844526"
      version="2890842807" nettype="IN" addrtype="IP4"
      addr="43.196.180.1">
    <expires time="36000"/>
  </session>
  <use>
    <session user="Mary" session-id="2890843112"
    version="2890841393" nettype="IN" addrtype="IP4"
    addr="43.196.180.1"/>
    <session user="Mary" session-id="2890843112"
    version="2890841001" nettype="IN" addrtype="IP4"
```

-continued

```
        addr="43.196.180.1"/>
      </use>
      <description
        type="request"
        name="pre-negotiation"
        mode="push"/>
    </e2enp:purpose>
```

XML EXAMPLE 3

The <session> element uniquely identifies the given E2ENP 908 phase described in the remaining portion of SDPng content. The definition of the <session> element is based on the <owner> element proposed in [SDPNG03]. The negotiation and use of compact session identifiers is derived (e.g. via hash) from the <session> in order to limit, the size of E2ENP PDUs. The <session> (with a calculated hash) can be used in the first PDU of any given E2ENP phase or concatenation thereof.

The <expires> child element indicates for how long the SDPng information corresponding to the given <session> element is to be considered as valid. Upon response to the offerer 810, each answerer 811 shall start a timer, set to the value specified in the <expires> element. Should this timer expire, the answerer 811 should move the corresponding. SDPng information in a "zombie" state. In turn, the offerer 810 shall refresh the given SDPng information before said timer expires.

Only when no-media or signaling sessions 102/103 referring to that SDPng information exists anymore, can the offerer 810 and/or answerer 811 silently discard the "zombie" information. This rationale applies also to the case of other SDPng information referring to the given obsolete SDPng information (see next paragraph): as long as any valid (i.e. not in a "zombie" state) SDPng information referring to the given "Zombie" one exists, the offerer 810 and/or answerer 811 can not silently discard said "zombie" SDPng information.

The SDPng information, which the <session> element refers to, can be used in other instances of SDPng content in order to refer to items defined in the referenced SDPng content. This mechanism is provided via the <use> element, which allows creating a list of references to known pre-existing instances of the <session> element.

For instance, the SDPng content describing an instance of the end-to-end QoS negotiation phase 806 for a given couple of peers shall reference information pre-negotiated ahead, by indicating in the <use> construct of the <e2enp:purpose> section, the unique <session> element of that pre-negotiated information. This referencing would be of course not necessary (and thus the <use> element would be not present), should the SDPng content relative to the two phases be jointly piggybacked in one SIP message (i.e. case of phases carried out consecutively in time).

The presence of the <expires> child element in the listed <session> elements within the <use> section is not mandatory. If present, though, the meaning would slightly differ from the normal use of the <expires> child element its presence would in fact signify for how long the given referenced <session> element should be considered as valid (i.e. rest time of validity of the E2ENP-session), from the perspective of the <session> element referencing it. Of course, a given <session> element may reference others for a time window no longer than the original value of the time specific in of the <expires> child element of the referenced sessions 103.

The <description> element indicates the nature of the SDPng information, the given <e2enp:purpose>section refers to. The "type", "name", and "mode" attributes of the <description> element are defined as follows:

```
type:="request" | "response"
```

The "type" attribute identifies who is the offerer 810 and who is the answerer 811 of a given E2ENP 908 phase.

```
name:="standard" | "pre-negotiation"| "negotiation" |
    "re-negotiation"| "start-reservation" | "ready-
    reservation"| "cancel-reservation" | "canceled-
    reservation" | "expire" | "taken-over"
```

The "name" attribute defines the type of E2ENP 908 phase, whose description is contained in the remaining part of the SDPng content:

- "Standard": Standard use of the SIP message piggybacking this E2ENP 908 content according to "SIP 910: Session Initiation Protocol", IETF SIP 910 Working group, ACIRI, March 1999, work in progress, <draft-ietf-sip-rfc2543bis-04.txt> by M. Handley et al., in the following referred to as [SIPBIS04].
- "Pre-negotiation" 802: The SIP message piggybacking this E2ENP 908 content is used for carrying out the end-to-end QoS pre-negotiation phase 802.
- "Negotiation" 806: The SIP message piggybacking this E2ENP 908 content is used for carrying out the end-to-end QoS negotiation phase 806.
- "Re-negotiation" 808: The SIP message piggybacking this E2ENP 908 content is used for carrying out the end-to-end QoS re-negotiation phase 808.
- "Start-Reservation": The SIP message piggybacking this E2ENP 908 content is used for signaling the start of a reservation process (during either an end-to-end QoS negotiation 806 phase or an end-to-end QoS re-negotiation phase 808).
- "Ready-Reservation": The SIP message piggybacking this E2ENP 908 content is used for signaling the completion of a reservation process (during either an end-to-end QoS negotiation 806 phase or an end-to-end QoS re-negotiation phase 808).
- "Cancel-Reservation": The SIP message piggybacking this E2ENP 908 content is used for signaling the request to release previously reserved resources.
- "Canceled-Reservation": The SIP message piggybacking this E2ENP 908 content is used for confirming the release of previously reserved resources.
- "Expire": The SIP message piggybacking this SDPng 912 is used for forcing the expiration of the SDPng information identified by the given <session> element. Contextually, the attribute time of the <expires> child element of the given <session> element shall be set to zero. When this command is used, the E2ENP 908 contents referencing the given <session> element are forced to be released according to the rationale.
- "Taken-Over": This command is used by the mediator **106*a*1 in third-party-assisted negotiations 806 for notifying to the peer, whom the negotiation 806** is being redirect to, that such redirection is taking place.

Should some phase concatenated, the "name" attribute would indicate only the latest phase. Other definitions of the "name" element could be considered in the future.

```
mode:="push" | "pull" | "push-pull"
```

The "mode" attribute indicates the negotiation 809 mode. This attribute applies only the attribute "name" is set to "pre-negotiation" or "negotiation". The default values for the "type", "name", and "mode" elements are, respectively, "request", "standard", and "push".

The <mediation> parameter is optional and can take any of the following values:

```
mediation:="third-party-assisted"|"external negotiation"
```

If it is not applied, the type of the negotiation 806 is simply peer-to-peer. This parameter is used to indicate that a peer is negotiating on behalf of somebody else. This would be also implicitly indicated over the header "From" of the SIP message and the element <session> of the <purpose> section. The peers negotiating on behalf of somebody else should be generally considered services like mediating parts of a broker, conferencing services, etc. The mediator **106*a*1 uses the parameter mediation in order to inform the negotiating parties that it is not the party which is going to send and/or receive but just a party mediating the negotiation 806. In this case, the mediator 106*a*1** should use as indication of its functionality "third-party-assisted".

Whenever logging into a network operator (at switch-on time and whenever a vertical handover occurs), the network operator will validate the user's QoS preferences (already matched against terminal capabilities) against the network capabilities.

However, at this time it is not yet possible to foresee if and when cases occur in which two end peers do not have a chance to agree on a common set of QoS contracts whatsoever.

In such cases, a solution typically adopted is to insert transcoding units along the data path.

The possibility to couple such units with SIP proxies and directory services is envisioned, so as to force the offerer to use a specific transcoder, or a chain thereof.

Whenever the E2ENP session between the two end peers fails, the offerer could try to ask support from the network operator or any other service provider, to provide transcoding services.

This means to discover any available transcoder unit(s) via a directory service, meeting the offerer's given requirements and answerer's capabilities, and manage third-party negotiation among the offerer, the various transcoders in the middle and the answerer. The transcoding service would therefore use the E2ENP analogously to what MEGACO ("Media Gateway Control (MEGACO)", http://www.ietf.org/html-.charters/megaco-charter.html, in the following referred to as [MEGACO]) today does. The Transcoding Service would orchestrate the pairing of nodes in the chain of peers, and take care that resources are properly reserved via the E2ENP economy principle (similar consideration for resource release).

Should the connection between the two end users span multiple administrative domains and/or technologies, it may also be possible that transcoding services offered by different providers cooperate, again by using E2ENP for performing third-party-negotiation.

To this extent, "external-negotiation" describes the case in which the mediator **106*a*1** acts as an external third-party, on behalf of an entity trying to force two; peers carry out the E2ENP between themselves. The transcoding service indicated above would control one or multiple such "external mediators-" in tandem.

The idea of an external functionality controlling the establishment of a path among several processing units is well-known in the literature (e.g. Z. M. Mao, R. Katz, "Achieving Service Protability in ICEBERG", in Proc. Of IEEE '00 Clobecomm Workshop "2000 IEEE Service Portability and Virtual Customer Environments", IEEE, December 2000). The object of the hereby proposed solution is thus to allow extending the scope of E2ENP protocol to complex cases, thereby requiring intermediate components like transoders. To this extent, the concept of a multiplicity of E2ENP external mediators controlled by the transcoding service core is considered as a novelty proposed by this invention.

The <mediation> element might undergo future development with respect to additional values with different from those described above. If active participation of the mediator **106*a*1 in the data media streaming should be considered or if more than one mediation components should take place in the negotiation 806**, e.g. involvement of Conference Control Units, QoS-Broker, etc., this would be indicated via the <mediation> element.

The following example corresponds to the starting message of a SIP session within the E2ENP session between the mediator **106*a*1 and the future answerer 106*a*2**:

INVITE sip:mary_fix@195.37.78.173

From: sip:mary_moby@3ffe:1200:3012:c006:290:27ff:fe7d:d024

To: sip:mary_fix@195.37.78.173

```
Content-Type: application/sdpng/e2enp
.....
<e2enp:purpose>
    <session user="Kate" session-id="2890844526"
    version="2890842807" nettype="IN" addrtype="IP4"
    addr="43.196.180.1"/>
    <description
        type="request"
        name="negotiation"/>
    <mediation mode="third-party-assisted"/>
</e2enp:purpose>
```

XML EXAMPLE 4

According to this example, the peer "mary_flx@195.37.78.173" would recognize that the peer "mary_moby@3ffe:1200:3012:c006:290:27ff:fe7d:d024"is just a mediator **106*a*1** for the peer "43.196.180.1"

whose owner is "Kate".

The SIP response "380 Alternative Service" as described in [SIPBIS04] might be used not only to indicate a redundant service to a service which cannot-currently take the call, but also for redirecting a connection to another device if the called peer has no capabilities to handle the call, but may take advantage of using some allocation and presence services to detect another peer within its vicinity which can handle the call. The process of allocation of devices and services is out of scope of the underlying invention, but in general existing technologies like Bluetooth as described in the Specification of the Bluetooth System Version 1.1 (http://www.bluetooth.com/files/Bluetooth__11_Specific-ations_Book.pdf), in the following referred to as [BLUE], and the SIP 910 support for presence as described in "SIP 910 Extensions for Presence" (SIMPLE Working Group, work in progress, <draft-rosenberg-impp-presence-01.txt>) by J. Rosenberg et al., in the following referred to as [SIPPRE01], might be taken into consideration.

According to [SIPBIS04], the alternative services are described "in the message body of the response". A possible SDPng 912 structure describing the address and the reference to the profile settings of an alternative service is shown below:

```
<e2enp:alternative-service type=[TYPE]>
    <service>
        <service-id id="my-funny-service"
                protocol="SIP"
                version=[SIP VERSION]
                address=[SIP ADDRESS]/>
        <session user="Mary" session-id="2890843112"
            version="2890841393" nettype="IN" addr
            type="IP4" addr="195.37.78.173"/>
    </service>
</e2enp:alternative-service>
```

XML EXAMPLE 5 wherein

| | |
|---|---|
| TYPE | TYPE = "standard" \| "mediation", with "standard" - standard usage as defined in [SIPBIS04], and "mediation" - for mediation purposes. |
| SIP__ADDRESS | corresponds the formation of SIP-conform addresses as defined in [SIPBIS04], and |
| SIP__VERSION | corresponds the SIP-conform version syntax of SIP 910 as defined in [SIPBIS04]. |

The section <service> is used to describe the alternative service, refers to already known E2ENP-message session descriptions 112 or is carried within them. Many of these carried descriptions start with a <purpose> section. Thereby, the section <service> can be repeated.

In case of mediation, the multiple <service> sections can have the same <service-id> but address different session descriptions since the mediator **106*a*1 should both inform the offerer 106*b* and the future answerer 106*a*2 about the corresponding negotiations which the mediator 106*a*1 performs on one hand with the offerer 106*b* and on the other hand with the future answerer 106*a*2** without addressing unknown information as described in the requirements for the mediator.

If the usage is standard according to [SIPBIS04], the multiple <service> sections describes multiple alternative services.

The current description of the section <alternative-service> is only in sense of E2ENP and mediated negotiation. Additional description of the usage of <alternative-service> in the sense as defined by [SIPBIS04] would be considered in future when SIP-enabled services are taken into account.

```
<e2enp:alternative-service type="mediation">
    <service>
        <service-id id="my-funny-service" protocol="SIP"
            version="SIP/2.0"
            address="sip:mary__fix@195.37.78.173"/>
        <session user="Mary" session-id="2890843112"
            version="2890841393" nettype="IN"
            addrtype="IP4" addr="195.37.78.173"/>
    </service>
</e2enp:alternative-service>
<e2enp:purpose>
    <session user="Mary" session-id="2890843112"
        version="2890841393" nettype="IN" addrtype="IP4"
        addr="195.37.78.173"/>
    <mediation mode="third-party-assisted"/>
</e2enp:purpose>
```

XML EXAMPLE 6

According to the requirements of the mediator **106*a*1**, it is disallowed to use references to unknown sessions. That is why by implementing a mediator the <use> element of a <purpose> section within a refered session from a <service> section should be omitted as in the example above. The mediator should then take care of collecting all the refered information and put it explicitely (no references) in the current description(s).

Figure 10:
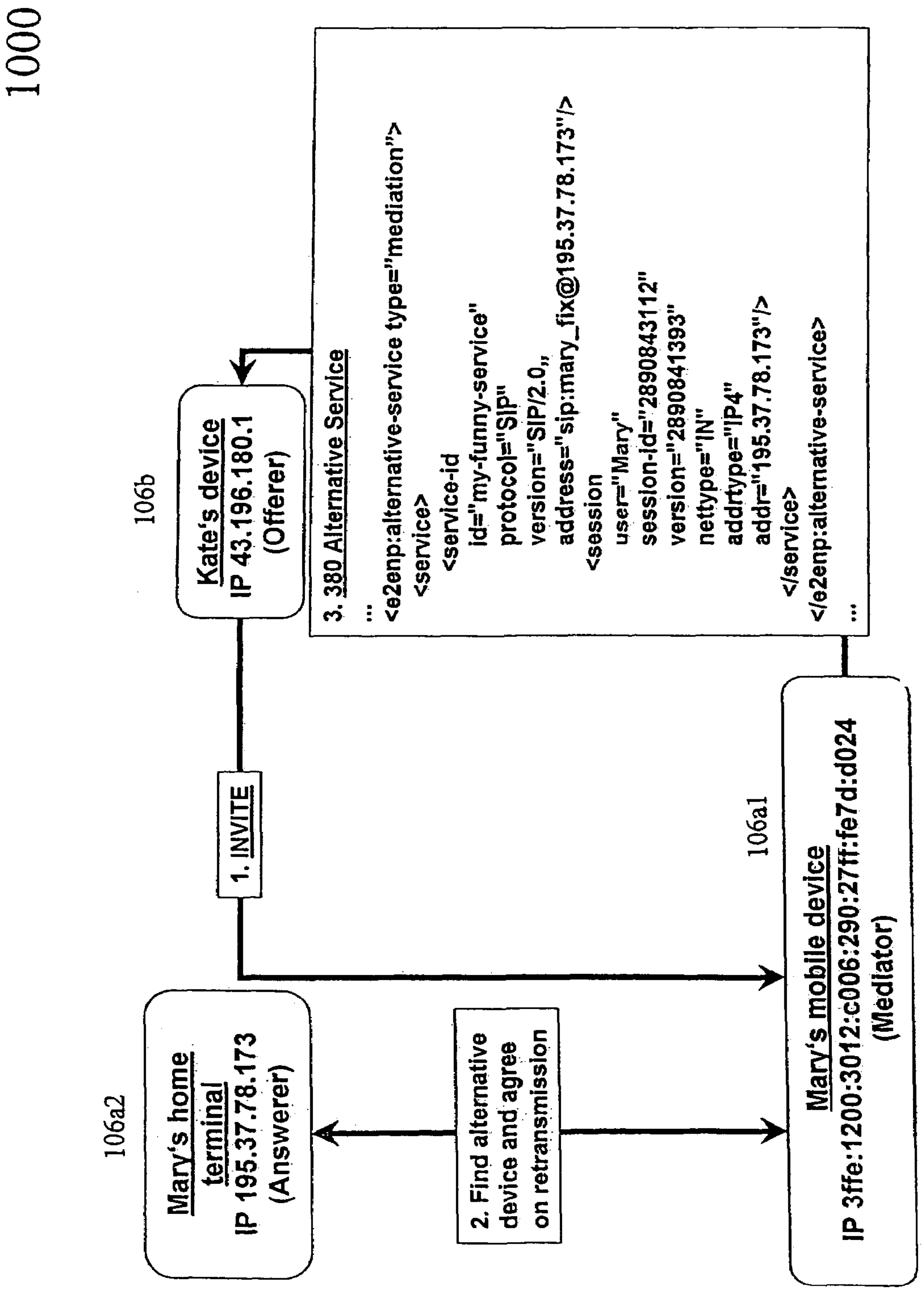
FIG. 10 depicts an example showing the usage of the so-called <E2ENP:alternative-service> section.

FIG. 10 exhibits an example showing the usage of the <e2enp:alternative-service> section.

The indication of the address and version in the third message within the <service-id> element can directly be used by the offerer **106*b* (Kate's device) to create the new SIP 910 call to the new answerer 106*a*2 (Mary's home terminal). This information is necessary especially in cases when the offerer 106*b*** does not know about the mobile device where the call is being redirected.

Compared to the existing SDPng proposal [SDPNG03], it is herewith proposed to distinguish codec definitions from RTP payload type definitions and codec parameterization. For codec parameterization we hereby intend the list of parameters accompanying the definition of a given codec, e.g. the sampling rate and the number of channels in the case of audio codecs. This results in the definition of a new SDPng section, and the redefinition of the Audio Codec and RTP profiles.

With this assumption, negotiating-parties can quickly converge on agreements by pruning first all the codecs that are not supported by all peers. Once the commonly agreed set of codecs has been identified, the negotiating parties can, as a further step, handle the negotiation 806 of payload types and codec parametrizations. The definition of payload types is described in [RTP-Profile], and the RTP Profile is defined in [SDPNG03].

With respect to audio codecs, static payload types are associated with fixed codec parameterizations, as defined in [RTP-Profile]: Therefore, only for dynamic payload types a detailed specification of codes parameterization is required. To this extent, we propose to use the inline format as described in [SDPNG03].

Concerning video codecs, the parametrization indicated in [RTP-Profile] is not sufficient to fully characterize the given codec from a QoS perspective. Two possible solutions are envisioned:

1. To pre-negotiate the names, payload types, and (partly) parameterizations of codecs, ahead of any user specific pre-negotiation 802: This means splitting the End-To-End QoS pre-negotiation 802 phase into two distinct sub-phases: in an early stage, only pre-negotiation 802 of terminal-related information would take place; this sub-phase would then be followed by one (or many) user-specific pre-negotiation 802 sub-phase leveraging user profile information at later times, in which each of these later sub-phases would map user profile information to the results of former sub-phase. The reason for pre-negotiating also codec parametrization in the terminal- related pre-negotiation 802 sub-phase stems from the fact that the negotiating parties may want to narrow down the range of possible configurations of video codecs, so as to meet feasibility requirements, with respect to the actual amount of hardware/software resources of the given peers.

2. Alternately, to determine which subset of the user profile match the given capabilities and the (potential) amount of local resources, and negotiate only those subsets with peers, along with codec names and the payload types.

Figure 11:
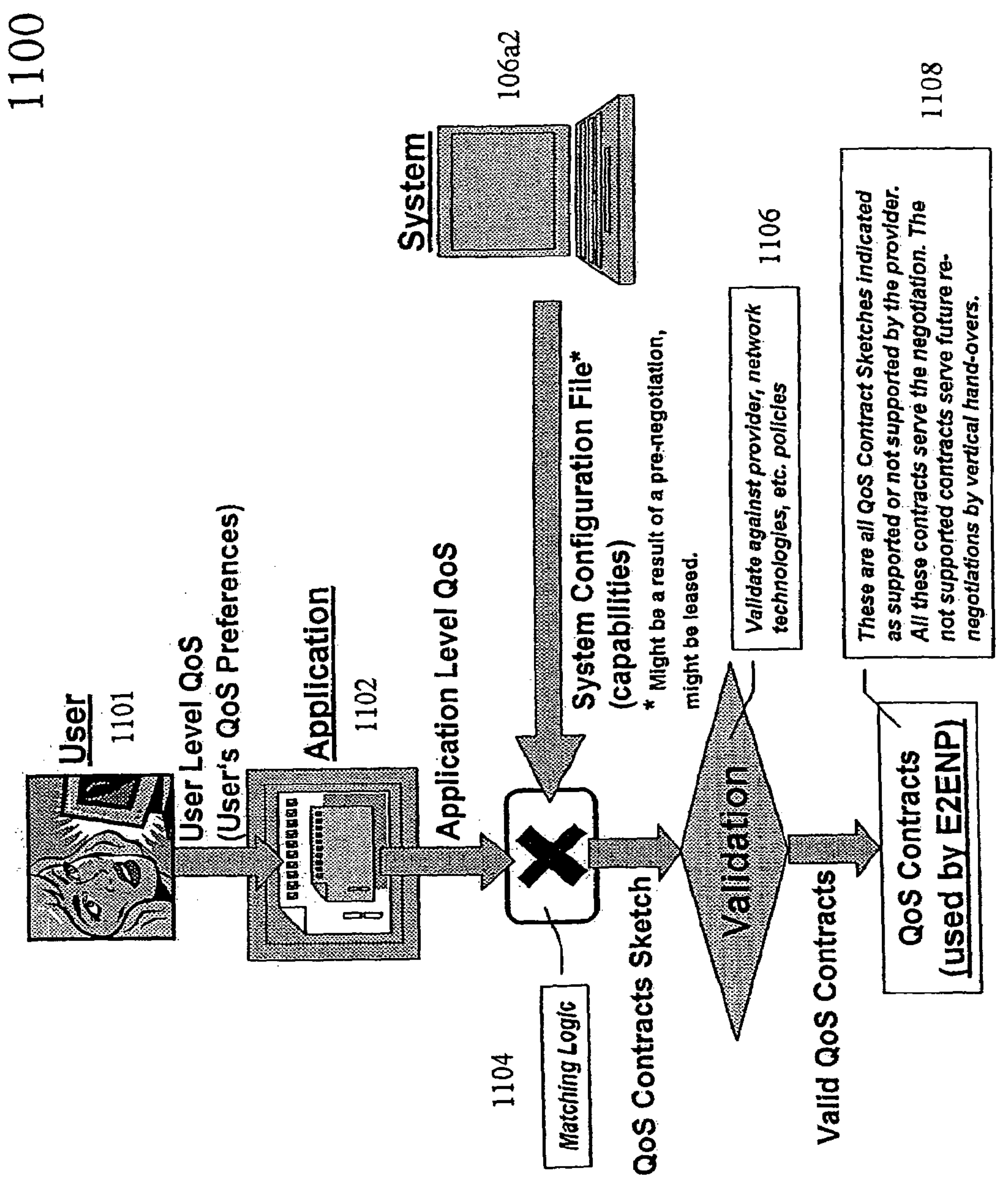
FIG. 11 shows a scenario in which contracts derived from user profile and system configuration information are validated.

The both alternatives are illustrated in the diagram depicted in FIG. 11. In case of negotiating only codecs, the "User Level QoS" is non-existent and the "QoS Contracts Sketch" is equal to the "System Configuration File". Respectively, only the system capabilities would be validated for such a case. By following this rationale, applications can be designed in a simpler way: either they handle, codec parametrization negotiations 806 in an early sub-phase, or they simply handle the negotiation 806 of user-specific QoS specification.

The codec descriptions can be assimilated to general-purpose capability descriptions that peers can pre-negotiate offline among themselves. Pre-negotiated information can also refer to and/or be incorporated into SDPng 912 profiles as described in [SDPNG03].

Furthermore, intervals in the original SDPng 912 codec parametrization shall be introduced in order to reduce the number of items to negotiate. This approach also allows a definition of adaptation paths in an intuitive manner as well as avoiding ambiguities, especially with respect to video media stream 206 characterization.

A new SDPng 912 <e2enp:qosdef> section provides means for expressing both capabilities and stream-level QoS contracts 1108 in a modular way:

- an instance of the <e2enp:qosdef> section qualified with the attribute "name" set to "capabilities" describes only the terminal-related information concerning capabilities, whereas
- an instance of <e2enp:qosdef> section qualified with the attribute "name" set to "contracts" describes the various parameterizations of those capabilities matching the given user profile information in terms of stream-level QoS contracts 1108.

The application and/or middleware will select the best codec out of the pre-negotiated <e2enp:qosdef name="capabilities">, and a subset of QoS contracts 1108 out of the given user profile information. The resulting information (a subset of the cross-product of the <e2enp:qosdef name="capabilities"> and of the user profile information) will then form the <e2enp:qosdef name="contracts"> section which deals with stream-level QoS contracts 1108 at the application level. This new section differs from the original information contained in the user profile information, insofar as specific encoding attributes are now specified. This <e2enp:qosdef name="contracts"> section will then be exchanged among peers during the pre-negotiation 802 phase. FIG. 11 shows a scenario 1100 in which QoS contracts 1108 are derived from user profile and system configuration information. After that, they are validated.

The pre-negotiation 802 of the two types of <e2enp:qosdef> sections can take place among peers at different times, irrespective of later actual use, and be scoped in time with different timescales, by using the <expires> element of the purpose section associated with the given <e2enp:qosdef> section. The limitation in time of E2ENP 908 information validity is necessary in order to avoid using obsolete information at a later time.

The <e2enp:qosdef name="capabilities"> section allows peers agreeing on a common subset of capabilities to be employed during later media sessions 102. This section acts as a container of two classes of elements, codec definitions and payload type definitions, applied to each type of media (audio, video, etc.). Definitions from the original Audio Codec, RTP, and Video Codec profiles specified in [SDPNG03] are envisioned to be used, but with some extensions, as indicated below.

```
<e2enp:qosdef name="capabilities">
    <audio:codec name="PCMU" scope="applicable"/>
    <audio:codec name="G729" scope="applicable"/>
    <audio:codec name="G722" scope="possible"/>
    <audio:codec name="L16" scope="possible"/>
    <rtp:pt name="rtp-avp-0" pt="0" format="PCMU"/>
    <rtp:pt name="rtp-avp-18" pt="18" format="G729"/>
    <rtp:pt name="rtp-avp-9" pt="9" format="G722"/>
    <rtp:pt name="rtp-avp-10" pt="10" format="L16"/>
    <rtp:pt name="rtp-avp-11" pt="11" format="L16"/>
    <video:codec name="H263" scope="applicable"/>
    <video:codec name="H261" scope="applicable"/>
    <video:codec name="MPV" scope="possible"/>
    <video:codec name="MP2T" scope="possible"/>
    <rtp:pt name="rtp-avp-34" pt="34" format="H263"/>
    <rtp:pt name="rtp-avp-31" pt="31" format="H261"/>
    <rtp:pt name="rtp-avp-32" pt="32" format="MPV">
        <video:codec frame-rate-range="30, 30"
            frame-size-set="SIF"
            color-quality-range="0, 10000"
            overall-quality-range="0, 10000"/>
    </rtp:pt>
    <rtp:pt name="rtp-avp-33" pt="33" format="MP2T">
        <video:codec frame-rate-range="30, 30"
            frame-size-set="720x576"
            color-quality-range="0, 10000"
            overall-quality-range="0, 10000"
        overall-quality-range="9500, 9800"/>
    </rtp:pt>
    <rtp:pt name="rtp-avp-100" pt="100" format="WAVI">
        <video:codec frame-rate-range="5, 30"
            frame-size-set="QCIF, CIF"
            color-quality-range="9100, 10000"
            overall-quality-range="9100, 10000"/>
    </rtp:pt>
</e2enp:qosdef>
```

XML EXAMPLE 7

For the sake of simplicity, this example shows the definition of video codecs both with and without codec parametrization. Otherwise, the <e2enp:qosdef name="capabilities"> section shall either contain codec parametrization, or contain none of them.

One can easily note that the information conveyed in this section is now equivalent to a sort of configuration file of the user's terminal device; this information is user-independent, and thus complementary to the content of the user profile information described in the user profile information, as well as to the content of the <e2enp:qosdef> section (derived from said user profile information) dealing with stream-level QoS contracts 1108.

The attribute "scope" indicates in a request (negotiation bid) whether the corresponding SDPng 912 element is to be considered as a required (applicable) or desired (possible) option; whereas in a response (negotiation counteroffer), that attribute indicates whether the corresponding SDPng 912 element has been validated (applicable) or rejected (not-applicable).

```
scope:="not-applicable" | "applicable" | "possible"
```

The answerer 811 may also indicate in the counteroffer what capabilities it can support, and to what extent.

If a given capability is supported "as is", only the corresponding identifier is indicated, along with the scope attribute set to "applicable". If a given capability is not supported, the corresponding identifier is simply omitted.

If the answerer 811 proposes in the counteroffer a modified version of the parameterization of a given capability in the <e2enp:qosdef name="capabilities"> section (as a subset of the original bid), the entire description with the updates is returned in both types of <e2enp:qosdef> sections. In any case, the <e2enp:qdsdef> section dealing with stream-level QoS contracts 1108 contains in a response only updated codec parameterizations.

Additionally, the answerer 811 can indicate a new option (unknown to the offerer 810 at pre-negotiation 802 time): this will be marked as "possible". The idea is that the offerer 810 can thus be informed of a potential option that could be eventually used later, should the offerer 810 be upgraded with a new capability matching that option.

For instance, the answerer 811 might indicate the support of a codec, which the offerer 810 currently does not support. Should the offerer 810 acquire somehow that given codec (e.g. by downloading a software component), the offerer 810 could then upgrade its policies to take into account this new capability.

The value "possible" could also indicate the answerer 811's state as being partially busy with respect to a codec proposed by the offerer 810. In this way, the answerer 811 may take into account its current working load. This could for instance translate in an answer to the offerer 810, indicating that generally the answerer 811 has high capacity but that only part thereof is available at the moment. The offerer 810 may then save this information for future re-negotiations 808 whenever trying to upgrade the connection to work with a different QoS level.

Should a capability be removed, or reconfigured at a later time, a new instance of the corresponding <e2enp:qosdef name="capabilities"> pre-negotiation 802 process would take place among peers in order to proactively and timely disseminate information about the given change, so that peers can employ proper adaptation strategies.

Should the answerer 811 add a capability as "possible", the corresponding parametrization would be returned directly in the <e2enp:qosdef name="capabilities"> section, in the element corresponding to that new capability. In this case, the parametrization simply indicates configuration information relative to that capability. Should the offerer 810 be upgraded with this extra capability at later time, the offerer 810 could draw some contracts 1108 from the configuration information for running a new round of the pre-negotiation 802 process.

Peers can also re-negotiate capabilities following the process described above at any time in order to inform each other about any change in capabilities availability.

Continuing the example above, the following code defragment presents an example of codec parameterization in the new <e2enp:qosdef name="contracts"> section, as derived from a mapping process described in the previous paragraph. This section deals with application-level QoS contracts 1108, which are generally applicable to any media stream 206 of the type of media identified.

This new section contains a number of complex XML elements:

- a mandatory <policy> element, used for negotiating the resource management policy to enforce;
- at most one instance of any of the following elements:
  - <audio>: describing all QoS contracts 1108 for audio mredia streams 206
  - <video>: describing all QoS contracts 1108 for video media streams 206
  - <data>: describing all QoS contracts 1108 for data media streams 206
  - <control>: describing all QoS contracts 1108 for controls media streams 206
- where such QoS contracts 1108 are derived from the mapping of user profile information to capabilities. At least one of these elements shall be presented.

```
<e2enp:qosdef name="contracts">
    <policy name="Let us optimize ((memory && network) || CPU)">
        <predicate id="predicate-1"
          first-term="optMemoryUsage"
            second-term="optNetworkPerformance"
          function="and"/>
        <predicate id="predicate-2"
          first-term="predicate-1"
            second-term="optCpuLoad"
          function="or"/>
        <criterion type="expression" idref="predicate-2"/>
    </policy>
    <audio>
        <contract name="audio-contract-1"
        sampling-rate-set="4000, 8000" channel-set="1"/>
        <contract name="audio-contract-2"
        sampling-rate-set="8000, 12000" channel-set="1,2"/>
        <contract name="audio-contract-3"
        sampling-rate-set="12000, 16000" channel-set="1"/>
        <contract name="audio-contract-4"
        sampling-rate-set="16000, 44100" channel-set="1"/>
        <contract name="audio-contract-5"
        sampling-rate-set="44100, 64000" channel-set="2">
            <spare/>
        </contract>
        <rtp:map contract="audio-contract-1"
        format="rtp-avp-0" role="receiver"/>
        <rtp:map contract="audio-contract-2"
        format="rtp-avp-18" role="receiver"/>
        <rtp:map contract="audio-contract-3"
        format="rtp-avp-9" role="receiver"/>
        <rtp:map contract="audio-contract-4"
        format="rtp-avp-10" role="receiver"/>
        <rtp:map contract="audio-contract-4"
        format="rtp-avp-11" role="receiver"/>
        <rtp:map contract="audio-contract-5"
        format="rtp-avp-125" role="receiver"/>
    </audio>
    <video>
        <contract name="video-contract-1"
        frame-rate-set="10,15" frame-size-set="CIF"
        color-quality-range="9100, 9700"
        overall-quality-range="9500, 9800"/>
        <contract name="video-contract-2"
        frame-rate-set="15,20" frame-size-set="QCIF"
        color-quality-range="9700, 9850"
        overall-quality-range="9800, 9900"/>
        <contract name="video-contract-3"
        frame-rate-set="20,25" frame-size-set="QCIF, CIF"
        color-quality-range="9850, 9900"
```

-continued

```
        overall-quality-range="9900, 9960"/>
        <contract name="video-contract-4"
        frame-rate-set="25,30" frame-size-set="CIF"
        color-quality-range="9900, 9970"
        overall-quality-range="9960, 9990"/>
        <contract name="video-contract-5"
        frame-rate-set="30" frame-size-set="720×576"
        color-quality-range="9000, 10000"
        overall-quality-range="9000, 10000"/>
        <rtp:map contract="video-contract-1"
        format="rtp-avp-31" role="receiver"/>
        <rtp:map contract="video-contract-1"
        format="rtp-avp-34" role="receiver"/>
        <rtp:map contract="video-contract-1"
        format="rtp-avp-100" role="receiver"/>
        <rtp:map contract="video-contract-2"
        format="rtp-avp-31" role="receiver"/>
        <rtp:map contract="video-contract-2"
        format="rtp-avp-34" role="receiver"/>
        <rtp:map contract="video-contract-2"
        format="rtp-avp-100" role="receiver"/>
        <rtp:map contract="video-contract-3"
        format="rtp-avp-31" role="receiver"/>
        <rtp:map contract="video-contract-3"
        format="rtp-avp-34" role="receiver"/>
        <rtp:map contract="video-contract-3"
        format="rtp-avp-100" role="receiver"/>
        <rtp:map contract="video-contract-4"
        format="rtp-avp-31" role="receiver"/>
        <rtp:map contract="video-contract-4"
        format="rtp-avp-34" role="receiver"/>
        <rtp:map contract="video-contract-4"
        format="rtp-avp-100" role="receiver"/>
        <rtp:map contract="video-contract-5"
        format="rtp-avp-33" role="receiver"/>
    </video>
</e2enp:qosdef>
```

XML EXAMPLE 8

The description of the color-quality-range and of the overall-quality-range is introduced above. In this case, the frame-rate-set="10, 15" means that the receiver should at most be able to decode 15 Fr/s and at least 10 Fr/s. Any decoding resulting in less than 10 Fr/s is considered as violation of the contract 1108. The sender does not need to provide more than 15 Fr/s unless a contract changes, because of, for example, the discovery more resources at the receiver side is made and a request for contract change is done.

The <policy> element conveys the type of policies to negotiate. The "name" attribute provides a human readable description of the policy. The optional <predicate> child element allows expressing a Boolean predicate involving two terms, each drawn from the following set:

"optMemoryUsage"—indicates the memory usage optimization policy.

"optNetworkPerformance"—indicates the network 604 performance optimization policy.

"optPowerConsumption"—indicates the power consumption optimization policy.

"optCpuLoad"—indicates the CPU load optimization policy.

Additional values corresponding to other policies can be added in the future.

Alternatively, the value of the predicate terms can be drawn from the set of other instances of the <predicate> element. The type of Boolean function is indicated via the "function" attribute, which can take any value out of the set: "and", "or". The "not" function is not used, since the absence of a policy indicates implicity that such a policy is not used. The <predicate> child element thus allows specifying combinations of the elemental policies listed above. These combinations' indicate specific correlations among the various policies.

The <criterion> child element identifies a given policy via the "type" attribute, which can take any value out of the set indicated above. Furthermore, an instance of this element can enforce an instance of the <predicate> element, by specifying the string "expression" as value of the attribute "type", and by using an additional attribute "idref" identifying a given instance of the <predicate> element. The <criterion> child element is mandatory and only one instance of it can appear within a given instance of the <policy> element.

The <contract> element represents the result of the cross-product process. Those user 1101's application-level QoS requirements matching with the available capabilities are hereby copied from the user 1101's user profile information, and negotiated among peers. It may therefore results that at the end of the negotiation 806 process, the original application-level QoS requirements of the user 1101 are narrowed down to a subset thereof.

With respect to the requirements-set forth above and to the concept of spare contract, the <spare> child element of the <contract> element is hereby introduced to indicate those spare contracts, which are not supported by the given users' preferred network provider.

The <spare> child element would be then an optional element, and its presence indicates that the given contract 1108 is not going to be supported by the preferred network 604 operator of the offerer 810. The answerer 811 similarly filters off those not indicated as not spare, based on her/his agreements with her/his preferred network 604 operator.

When a vertical handover occurs, either party can try to validate all of her/his contracts 1108, including the spare ones, which might eventually become applicable with respect to the new network provider.

The <rtp:map> element is proposed as an extension of the SDPng 912 RTP Profile [SDPNG03], to represent the association of a given application-level QoS contracts 1108 with a specific format. The payload type is specified by the "format" attribute, which references instances of the "name" attribute of the <rtp:pt> element.

The attribute "contract" identifies the associated application-level QoS, by referencing instances of the "name" attribute of the <contract> element.

The attribute "role" indicates whether the given association application-level QoS contract/stream format is proposed by a receiver, a sender, or a sender/receiver, according to the requirements set forth above. In this way, not only receivers, but also senders can pro-actively disseminate information that will be later used for deciding how to handle re-negotiations 808, based on APs.

The concepts of QoS context and media stream 206 grouping (and, more specifically, association) can be modeled by introducing a new section <e2enp:qoscfg> as an addition of the <cfg> section. More specifically, the <e2enp:qoscfg> section contains adaptation path (AP) description for a given media stream 206, as well as the definitions of Associations (or, more generally groupings) thereof. Higher level QoS contracts 1108 capturing QoS correlation 804 and time synchronization 805 constraints among various groups of media streams 206, as well as (higher-level) APs thereof, can also be specified with this new section.

The information contained in the <e2enp:qoscfg> section can be either pre-negotiated among peers, irrespective of later actual use, or negotiated at connection set-up time.

Within the context of the E2ENP 908 idea, the scope of the SPDng original <cfg> section needs to be clarified: the <cfg> section simply defines the mapping of formats (e.g RTP payload types) with transport-related information; whereas the full definition of APs (in terms of the capabilities and of the QoS contracts 1108 defined in the <e2enp:qosdef> sections) is totally supported by the new <E2enp:qoscfg> section.

The only difference between this proposal and [SDPNG03] is the introduction of additional attributes in the <rtp:session> element, for specifying which type of network 604 and version thereof is used (respectively, the "nettype" and "addrtype" attributes). This change affects the SDPng 912 RTP Profile [SDPNG03] as well. Furthermore, the addresses are expressed by using the syntax proposed for SDP in "Support for IPv6 in SDP" (IETF Internet Draft, work in progress, <draft-olson-sdp-ipv6-02.txt>) by S. Olson, G. Camarillo and A. Roach, in the following referred to as [Olson01]. The proposed SDPng 912 extensions for the <cfg> section are indicated in the example below in bold face.

```
<cfg>
    <component name="audio-stream-1"
    media="audio">
        <alt name="AVP-audio-0">
            <rtp:session format="rtp-avp-0">
                <rtp:udp role="receive"
                 nettype="IN"
                 addrtype="IP4"
                 addr="43.196.180.1"
                 rtp-port="7800"
                 rtcp-port="7801"/>
            </rtp:session>
        </alt>
        <alt name="AVP-audio-18">
            <rtp:session format="rtp-avp-18">
                <rtp:udp role="receive"
                 nettype="IN"
                 addrtype="IP4"
                 addr="43.196.180.1"
                 rtp-port="7800"
                 rtcp-port="7801"
            </rtp:session>
        </alt>
    </component>
    <component name="video-stream-1" media="video">
        <alt name="AVP-video-34">
            <rtp:session format="rtp-avp-34">
                <rtp:udp role="receive"
                 nettype="IN"
                 addrtype="IP4"
                 addr="43.196.180.1"
                 rtp-port="7900"
                 rtcp-port="7901"/>
            </rtp:session>
        </alt>
        <alt name="AVP-video-31">
            <rtp:session format="rtp-avp-31">
                <rtp:udp role="receive"
                 nettype="IN"
                 addrtype="IP6"
                 addr="3ffe:1200:3012:c006:290:27ff:fe7d:d024"
                 rtp-port="7920"
                 rtcp-port="7921"/>
            </rtp:session>
        </alt>
        <alt name="AVP-video-98">
            <rtp:session format="rtp-avp-98">
                <rtp:udp role="receive"
                 nettype="IN"
                 addrtype="IP6"
                 addr="::ffff: 43.196.180.15"
                 rtp-port="7940"
                 rtcp-port="7941"/>
        </rtp:session>
    </component>
</cfg>
```

XML EXAMPLE 9

Please note the usage of the <cfg> section for specifying a given address/port pair as associated with two different payload types, whose choice depends on which QoS contract 1108 (out of the <e2enp:qoscfg> section) is enforced, according to AP rules and to the mappings described in the <rtp:map> element of the <e2enp:qosdef name="contracts"> section.

The difference between this proposal and legacy SDP and SDPng 912 consists in that the latter do not focus primarily on QoS negotiation 806, rather on capability negotiation 806. This means that SDP/SDPng 912 allow a sender giving information to the receiver(s) about format and transport information that the sender intends to use for sending.

Trying to match E2ENP 908 with this well-known approach, one should note that sheer capability negotiation 806 is already taken into account in the end-to-end QoS pre-negotiation phase 802. In fact, the pre-negotiation 802 phase can be considered as sufficiently general for indicating stream-level-only QoS contracts 1108 that peers may want to use both when sending and receiving. More specifically, the attribute "role" of the <rtp:map> element, of the <e2enp:qosdef name="contracts"> section allows doing that.

These two homonymous attributes are however dealing with two different aspects: the "role" attribute used in the <e2enp:qosdef name="contracts"> section allows receivers formulating APs and high-level QoS-contracts/APs based also on information/preferences disseminated by the senders. Whereas the "role" attribute of the <cfg> section merely allows application/middleware configure itself to use media streams 206 properly (in terms of capability and transport aspects), as aforementioned.

The <e2enp:qoscfg> section allows defining APs as well as QoS correlation 804 and time synchronization 805 constraints at various levels of abstractions, starting from stream level QoS contracts 1108. Each level of abstraction is identified by the attribute "name" of this section.

An example of this section at stream-level is indicated in the XML document fragment below.

```
<e2enp:qoscfg level="stream">
  <! --adaptation path for single media streams 206 -->
  <adapath name="audio1" ref_component="audio-stream-1">
    <default name="nominal"
    ref_contract="audio-contract-1"/>
    <alt name="choice1"
    ref_contract="audio-contract-2"/>
  </adapath>
  <adapath name="video1" ref_component="video-stream-1">
    <default name="nominal"
    ref_contract="video-contract-1"/>
    <alt name="choice1"
    ref_contract="video-contract-2"/>
    <alt name="choice2" ref_contract="video-contract-3"
    />
    <event id="video1-e-1" reason="higher-frame-rate">
      <path name="upgrade-1"
        guard=".ge. 15 .and. .le. 20"
        source="video-contract-1"
        target="video-contract-2"/>
      <path name="upgrade-2"
        guard=".ge. 20"
        source="video-contract-2"
        target="video-contract-3"/>
    </event>
    <event id="video1-e-2" reason="lower-frame-rate">
      <path name="degrade-2"
        guard=".ge. 15 .and. .le. 20"
        source="video-contract-3"
```

-continued

```
target="video-contract-2"/>
<path name="degrade-2"
guard=".le. 15"
target="video-contract-1"/>
</event>
</adapath>
<! -- Possible associations of media streams 206 between
user A and B -->
<context name="association1-1" scope="applicable">
<comp name="element1" ref_adapath="audio1"/>
<comp name="element2" ref_adapath="video1"/>
<constraints>
<par name="lipsync-delay" ref_adapath="audio1"
max="2"/>
<par name="aggregated-bw" max="64000"/>
</constraints>
</context>
<context name="association1-2" scope="possible">
<comp name="element1" ref_adapath="audio1"/>
</context>
<adapath name="associations-A-B">
<default name="nominal"
ref_context="association1-1"/>
<alt name="choice1" ref_context="association1-2"/>
</adapath>
</e2enp:qoscfg>
```

XML EXAMPLE 10

The following sub-paragraphs detail each element appearing in this section.

The first two instances of the <adapath> element appearing in the example above allow defining two distinct adaptation paths, by collecting a set of mutually exclusive, stream-level QoS contracts 1108, drawn from the set of <contract> elements of the <qosdef name=capabilities"> section, and associated with receivers only (according to the requirements set forth above). Each <adapath> element is associated with a specific <component> of the <cfg> section, via the "ref_component" attribute. This attribute is mandatory only for <adapath> elements describing stream-level APs.

Each QoS contract 1108 is an alternative option in the AP: hence the use of the <alt> construct for defining them (alt stands for alternative). By assuming the Hierarchical FSM model described above, each of these APs represent a distinct FSM, whose initial state is explicitly indicated by the element <default> of the given <adapath> construct.

By assuming the Hierarchical FSM model described above, the choice of switching from one QoS contract 1108 to another within a given AP may be dynamically determined by matching monitored QoS levels against the set of QoS contracts 1108 defined in the given AP, by using for instance fuzzy logic as described in "Enabling QoS adaptation decisions for Internet applications" (London/UK, 1999) by S. Bhatti and G. Knight, in the following referred to as [Bhatt99], and [BRAIN]. Alternatively the <adapath> construct may include a predefined set of state transitions among those QoS contracts 1108: in this case, the <event> construct indicates which transitions should be triggered upon detection of given events like frame-rate-increase or frame-rate-decrease, as in the example above. These events are designate well known monitor notifications, which applications and/or middleware may be designed to take into account. To this extent, both the name and the semantics of events shall be subject to standardization efforts. A given <event> can be associated with multiple paths, whose triggers determine the one that will be activated.

The individual transitions are described in <path> constructs, which describe the trigger condition (indicated as guard parameters) and the QoS contracts 1108 involved in the transition (indicated with the source and target attributes). The source attribute in the <path> construct is optional, insofar as there might be cases where the specification of that attribute could be omitted on purpose. In those cases, in fact, the corresponding transition would originate from whichever state the given Hierarchical FSM is currently set. In this way, the change of any QoS contract 1108 can be modeled within a given set, to a defined one in case the corresponding transition is triggered (a sort of default mechanism. In the example above, the event <video1-e-2->, triggered by the detection of a lower frame rate. (see the <reason> attribute), would force the FSM described by the <adapath> construct named video1 to enforce video-contract-1, no matter which contract 1108 was enforced at the time the event was thrown. In order to achieve interoperability, one should note that the peers should agree upon the semantic of the reason attribute. Terms like "higher-frame-rate" or "lower-frame-rate" appearing in the example above should thus be subject to standardization, along with their meaning. This pre-definition of transitions sets is optional.

The attribute "scope" indicates in a request (negotiation bid) whether the corresponding SDPng 912 element is to be considered as a required ("applicable") or desired ("possible") option; whereas in a response (negotiation counteroffer), that attribute indicates whether the corresponding SDPng 912 element has been validated ("applicable") or rejected ("not-applicable")

```
scope:="not-applicable" | "applicable" | "possible"
```

The answerer 811 may also indicate in the counteroffer what capabilities it can support, and to what extent. If a given capability is supported "as is", only the corresponding identifier is indicated, along with the scope attribute set to applicable. If a given capability is not supported, the corresponding identifier is simply omitted. If the answerer 811 proposes in the counteroffer a modified version of the parameterization of a given capability in the <e2enp:qosdef> section (as a subset of the original bid), the entire description with the updates is returned in both the <e2enp:qosdef name="capabilities"> and <e2enp:qosdef name="contracts"> sections. In any case the <e2enp:qosdef name="contracts"> section contains in a response only updated codec parameterizations.

Additionally the answerer 811 can indicate a new option (unknown to the offerer 810 at pre-negotiation 802 time): this will be marked as "possible". The idea is that the offerer 810 can thus be informed of a potential option that could be eventually used later, should the offerer 810 be upgraded with a new capability matching that option.

The <context> elements define possible associations of the given media streams 206, and thus allow defining time-synchronization and/or QoS-correlation 804 constraints. As such, the <context> elements basically describe high-level Qos contract 1108.

In the example above, a video media stream 206 and an audio media stream 206 are defined as correlated in a given context ("association-1"), along with both time-synchronization and QoS-correlation 804 constraints defined. Alternatively, a context including only the audio media stream 206 ("association1-2") could also be used.

When and how to enforce either contexts, is described in the second instance of the <adapath> element appearing in the example above. In this case, the use of the <default> element is evident the combination ("association1-1") of Han audio media stream and a video media stream is indicated as the preferred one. The case where only an audio media stream is used ("association1-2") would then be considered as a backup case, which can be enforced in order to cope with e.g. QoS violations. The individual child elements of the <adapath> element reference the instances of the aforementioned <context> elements via the "ref_context" attribute.

As a general rule, one can thus notice the recurring occurrence of <adapath> and <context> elements referencing each other in an acyclic chain of references. Alternative <context> constructs are grouped in an <adapath> construct, which defines a FSM. This AP and any other (concurrent) ones can then be wrapped in turn within a <context> construct, which sets constraints at a higher level. Moreover, there is also the alternative to define such <context> constructs, which can then be collected in a higher-level AP. This process can be recursively applied.

A given user can enforce higher-level QoS correlation 804 and time synchronization 805 constraints—as a form of extended user profile information—in order to orchestrate resource utilization (and hence QoS) across given sets of media streams 206 established with different peers. To this extent, the given user does not need to negotiate this information with the peers.

However, should the given user require to enforce some new constraints at a later time, or discover that the preexisting constraints can no longer be met, due to the later joining/leaving of some peers to/from the currently opened telecommunication sessions 102, new rounds of the E2ENP 908 might be required, according to the given conferencing policies (which are outside of the scope of the underlying invention).

Eventually, peers may also resort on a third party entity managing pre-negotiations 802, negotiations 806, and re-negotiations 808 (the "full" ones), including higher level specification concerning QoS correlation 804 and time synchronization 805 aspects. This entity would act as a sort of QoS Broker as described in "QoS Support for an All-IP System Beyond 3G" (IEEE Communication Magazine, August 2001, Vol. 39, No. 8) by T. Robles, A. Kadelka, H. Velayos, A. Lappetelainen, A. Kassler, H. Li, D. Mandato, J. Ojala and B. Wegmann, in the following referred to as [Roble01], and [BRIAN], which are outside of the scope of the underlying invention.

Media streams can be associated in various manners. In the following example, the concept of a session 102 shall be proposed which is intended as e.g. an instance of a videoconference 1204*a/b*. To this extent, the associations of media streams 206 between the given user (user A) and its peers (B, C, and D) within the context of the given videoconference 1204*a/b* session 102 are clustered in various manners. Then, the resulting clusters are associated with QoS contexts, by using the aforementioned <context> constructs.

To this extent, each cluster can be associated with a set of constraints dictating specific levels of correlations 804/805 among the various associations of media streams 206 belonging to the given cluster. This means that the constraints affect all the media streams 206 belonging to each association, independently of the QoS specifications of the individual media streams 206 belonging to the given association. The <context> constructs thus specify QoS correlation 804/805 for concurrent bundles of media streams 206. Alternative contexts can then be possible, as described in the <adapath> constructs (one per instance of the video conference).

These <adapath> constructs are thus comparable to the description of a FSM, whose states contain in turn other concurrent <adapath> constructs, each describing the bundling of media streams 206 between the given user and a given peer. This recursive model allows using state charts as described in [Booch99].

```
<e2enp:qoscfg level="session">
  <context name="vc-session-1-1" scope="applicable">
    <comp name="element-1"
    ref__adapath="associations-A-B"/>
    <comp name="element-2"
    ref__adapath="associations-A-C"/>
    <constraints>
      <par name="aggregated-bw" max="140000"/>
      <par name="frame-rate" avg="8"/>
    </constraints>
  </context>
  <context name="vc-session-1-2" scope="applicable">
    <comp name="element-1"
    ref__adapath="associations-A-C"/>
    <constraints>
      <par name="frame-rate" avg="8"/>
    </constraints>
  </context>
  <context name="vc-session-2-1" scope="possible">
    <comp name="element-1"
    ref__adapath="associations-A-D"/>
  </context>
  <adapath name="videoconference 1204a/b-1" >
    <default name="nominal"
    ref__context="vc-session-1-1"/>
    <alt name="choice-1" ref__context="vc-session-1-2"/>
  </adapath>
  <adapath name="videoconference 1204a/b-2" >
    <default name="nominal" ref__context="vc-session-2-
  1"/>
    <alt name="choice-1" ref__context="vc-session-2-1"/>
  </adapath>
</e2enp:qoscfg>
```

XML EXAMPLE 11

Continuing the recursive approach described above, we can further aggregate media streams 206 based on a yet higher-level rationale. For instance, we can associate all of the media streams 206 managed by all the instances of a given application, and differentiate the resulting QoS context from other applications, as well as impose higher-level QoS correlation 804 specifications.

```
<e2enp:qoscfg level="application">
  <context name="videoconference-tool"
  scope="applicable">
    <comp name="choice-1" ref__adapath="videoconference-
1"/>
    <comp name="choice-2" ref__adapath=videoconference-
2"/>
    <constraints>
      <par name="num-active-flows" max="6"/>
      <par name="cpu-load" max="0.20"/>
      <par name="mem-req" max="110M"/>
    </constraints>
  </context>
</e2enp:qoscfg>
```

XML EXAMPLE 12

This example shows once again the use of the <e2enp:qoscfg> section for expressing the information described above. In the example we can see how this high-level specification allows easily expressing constraints on local resource consumption, in line with the BRENTA concept described in [Roble01] and [BRAIN].

The idea behind the end-to-end QoS compact re-negotiation phase 808 is to avoid performing a full re-negotiation 808, during time critical tasks like recovering from a QoS violation due to, say, a handover. This object can be achieved by enabling peers signaling each other the new (pre-negotiated) QoS contacts 1108 to enforce, and/or by signaling those (pre-negotiated) QoS contracts 1108 that—upon handover to a new access network 604 and/or network provider—result applicable and/or no longer applicable. To this extent, specific SDPng-based support for the E2ENP 908 is required.

The <e2enp:enforce> new SDPng section allows one of the peers (typically the first which detects a QoS change or violation) signaling the other peers, which QoS contracts 1108 should be enforced, out of the pre-negotiated APs.

The idea is to convey signaling information according to the hierarchical structure of the pre-negotiated QoS specification. This means to correctly scope each QoS contract name. At least two alternative implementations are available: using a name-space for QoS contracts 1108, or a language for referencing some part of a document like the XPath standard, as described in the "XML Path Language Recommendation" (W3C, XML Path Language Recommendation Version 1, http://www.w3.org/TRxpath, November 1999), or the not yet standardized XPointer technology as described in the "XPointer Recommendation" (W3C, 2000, work in progress, http://www.w3.org/TR/xptr), in the following referred to as [XPOINT].

The former solution is based on assigning fully specified names to QoS contract 1108, by pre-pending the names of any higher-level QoS contract 1108 from which the given QoS contract 1108 depends within the given tree-based QoS Specification, using as separator character e.g. the dot character. This solution requires however the consistent use of (often quite complex and long) names throughout a multiplicity of E2ENP 908 sections and of E2ENP PDUs. Furthermore, this solution forces applications to be able to correctly parse the given name-space.

For instance, the fully specified name of the video-contract-2 within the video1 AP, within the association-1-1 QoS context, out of the associations-A-B AP, would look like the following:

associations-A-B.association1-1.video1.video-contract-2.

The alternative solution is based instead on XPath or even on XPointer technology (that, as of the underlying invention, has not yet reached the standardization status), which both indicate the current trend concerning the unambiguously pointing of elements across various XML documents.

In the scope of the underlying invention, we decided to use this latter solution, without any loss of generality compared to the other one described above (or any other equivalent one), with respect to the concepts. To explain the solution of choice, we introduce the following XML document fragment describing the same information used in the example above:

```
<e2enp:enforce>
  <xsl:variable name="association">
    <xsl:value-of
    select=
      "//adapath[@name='associations-A-B']/
      alt[@ref_context='association1-1']"/>
  </xsl:variable>
  <xsl:variable name="stream">
    <xsl:value-of
    select=
      "//context[@name="$association"]/
      comp[@ref_adapath='video1']/"/>
  </xsl:variable>
  <xsl:variable name="contract">
    <xsl:value-of
      select=
        "//adapath[@name="$stream"]/
        alt[@ref_contract='video-contract-2']/"/>
  </xsl:variable>
  <target name="$contract"/>
</e2enp:enforce>
```

XML EXAMPLE 13

The QoS contract 1108 to enforce is indicated by the element <target>.

In this XML document fragment one can easily recognize the use of the name attribute for the root element of the given tree branch (associations-A-B), whereas the other elements in that branch are named via the reference attributes (ref_context, ref_adapath, ref_contract) of the respective parent. This means that only the name of the <contract>, <context>, and <adapath> elements must be uniquely used across multiple sections/phases, whereas the names of the XML child elements of the aforementioned elements can be arbitrarily chosen. By using this methodology, once can enforce signaling not only of media stream 206 level QoS contracts 1108, as in the example above, but also of any high-level QoS contract 1108, by terminating the specification above to the given QoS context. For instance, the XML document fragment below:

```
<e2enp:enforce>
  <xsl:variable name="association">
    <xsl:value-of
      select=
        "//adapath[@name='associations-A-B']/
        alt[@ref_context='association1-1']"
  </xsl:variable>
</e2enp:enforce>
```

XML EXAMPLE 14 could be used for signaling to the other peers that the high level association1-1 should be enforced, regardless of the currently enforced stream-level QoS contracts 1108 (in this case, default states would dictate which media stream 206 level QoS contracts 1108 to enforce in the new QoS context). Furthermore, the <e2enp:enforce> section can also be used for signaling to other peers a specific AP to enforce, in which default state would then be used to resolve the remaining lower-level information. For instance, the following <e2enp:enforce> section:

```
<e2enp:enforce>
  <xsl:variable name="association">
    <xsl:value-of
      select=
        "//adapath[@name='associations-A-B']/
        alt[@name='association1-1']"/>
  </xsl:variable>
  <xsl:variable name="stream">
    <xsl:value-of
      select=
        "//context[@name="$association"]/
        comp[@name='video1']/"/>
  </xsl:variable>
  <target name="$stream"/>
</e2enp:enforce>
```

XML EXAMPLE 15 would force peer A to use "video-contract-1" for the "video1" media stream 206, since that contract 1108 was specified as default in the pre-negotiated <e2enp:qoscfg> section.

The aforementioned XPath (or even the XPointer) technology can be used for allowing a peer signaling the others, which QoS contracts 1108 to block, according to the rationale above.

To this extent, a new SDPng section is hereby proposed: the <e2enp:block> section. The following example depicts the use of such new section.

```
<e2enp:block>
  <xsl:variable name="association">
    <xsl:value-of
      select=
        "//adapath[@name='associations-A-B']/
        alt[@ref__context='association1-1']"/>
  </xsl:variable>
  <xsl:variable name="stream">
    <xsl:value-of
      select=
        "//context[@name="$association"]/
        comp[@ref__adapath='video1']/"/>
  </xsl:variable>
  <xsl:variable name="contract">
    <xsl:value-of
      select=
        "//adapath[@name="$stream"]/
        alt[@ref__contract='video-contract-2']/"/>
  </xsl:variable>
  <target name="$contract"/>
</e2enp:block>
```

XML EXAMPLE 16

The QoS contract 1108 to block is indicate d by the element <target>.

The aforementioned XPath (or even the XPointer) technology can also be used for allowing a peer signalling the others, which QoS contracts 1108 to unblock, according to the rationale described above.

To this extent, a new SDPng section is hereby proposed: the <e2enp:unblock> section. The following example depicts the use of such new section.

```
<e2enp:unblock>
  <xsl:variable name="association">
    <xsl:value-of
      select=
        "//adapath[@name='associations-A-B']/
        alt[@ref__context='association1-1']"/>
  </xsl:variable>
  <xsl:variable name="stream">
    <xsl:value-of
      select=
      "//context[@name="$association"]/
      comp[@ref__adapath='video1']/"/>
  </xsl:variable>
  <xsl:variable name="contract">
    <xsl:value-of
      select=
        "//adapath[@name="$stream"]/
        alt[@ref__contract='video-contract-2']/"/>
  </xsl:variable>
  <target name="$contract"/>
</e2enp:unblock>
```

XML EXAMPLE 17

The QoS contract 1108 to unblock is indicated by the element <target>.

Within the context of the solution presented in this chapter, the semantics of the original SDPng 912 <constraints> section as described in "Requirements for Session Description and capability negotiation" (IETF Internet Draft, work in progress, <draft-kutscher-mmusic-sdpng-req-01.txt>) by D. Kutscher et al., in the following referred to as [SDPNG01], can be interpreted as a form of QoS correlation 804 and/or time synchronization 805 constraint specification applied to the whole QoS specification described in the aforementioned new SDPng sections. Said document provides a set of requirements relevant for a framework for session 102 description and endpoint capability negotiation in multi-party multimedia conferencing scenarios.

By taking into account SIP 910 and SDPng 912 as protocols upon which the E2ENP 908 should be mapped on, it is necessary to point out that SIP 910 is a non-symmetrical protocols The SIP offerer 914—answerer 911 model gives no possibility for signaling errors, failure conditions or exceptions (statechanges) at their occurrence at the offerer 914's side. The E2ENP 908 requires several SIP-message round trips within its phases and every one-way message of a round trip should be proved both on its correctness and acceptability at all involved peers in the E2ENP signaling. Additionally, state changes of the end peers within the runtime of a E2ENP phase should be considered. These changes may concern a peer being involved into:

higher priority negotiation(s);

the starting of higher priority internal processes of the peer, which affect the resource management and the E2ENP 908 profile settings;

hardware and/or software-crashes, resulting in resource drop-outs.

To this extent, E2ENP 908 using SIP 910 should carry, within its SDPng 912 body, error codes indicating failures occurring by the offerer 914 and reasons for the failure; or the SIP 910 error code for both the offerer 914 and the answerer 911. The study of the possible SDPng error codes with respect to E2ENP and their structure should be thoroughly considered: The respective new SDPng:XML-fragments for describing the E2ENP error codes and signaling errors for solving this problem are considered as possible solution but not shown in the examples for the sake of simplicity. Since. E2ENP 908 is applied to SIP 910 via piggybacking, respective piggybacked error codes and messages within the SDPng 912 should be taken into account by the development of the E2ENP 908. In general the offerer 914 should consider repeating the calls with reasons-notification within the SDPng 912 part of the message and the answerer 911 should take advantage of using the SIP 910 "Status Codes" by also describing reasons in the SDPng 912 message part.

The E2ENP SHOULD be able to deliver the same possibility to signal both internal and external failure conditions, exceptions and errors occurring at many of the peers involved in the E2ENP signaling. To this extent, the E2ENP SHOULD be symmetrical by applying error codes at the peers affected by the E2ENP.

According to "An Offer/Answer Model with SDP" (IETF Internet Draft, work in progress, <draft-rosenberg-mmusic-sdp-offer-answer-00.txt>) by J. Rosenberg and H. Schulzrinne, in the following referred to as [SDPOA00], it can be stated that "an offer MUST be prepared to receive media described by that offer once it has been sent by an offerer 914". This approach is not failure-tolerant with respect to the E2ENP 908 and the adaptation mechanisms, since it should be taken into account the possible dynamic reconfiguration of the peers both in failure and upgrade cases, when the negotiated data becomes invalid within'the time of a running negotiation 806 or before media streaming has started.

It should also be considered that some intermediate components interacting with end peers along the E2ENP 908 signaling path might cause disturbances of the protocol if they do not understand it. In this case, there should be mechanisms for detecting and recovering such disturbances.

The following is a description of possible errors cases, where some form of notification between the offerer 914 and the answerer 911 is necessary to indicate the changing conditions and the caused disturbances. The arrow (→) indicates possible solutions. The 'A' indicates an answerer 911 and the 'O' an offerer 914.

1. Push Mode
   - The answerer 911 discovers that the proposal of the offerer 914 matches none of its capabilities
     - The answerer 911 has the capabilities to download codecs
       - The answerer 911 should inform the offerer 914 that the transaction may last a bit longer, because she/he needs time for the download and adjustment of his profile data.
         - → A->O answer with "100 Trying" or "183 Sessions Progress",
     - The answerer 911 has no capabilities to download codecs
       - If the answerer 911 is a service → A->O answer with "380 Alternative Service" if the answerer 911 knows such a service. The offerer 914 may then start a new pre-negotiation 802 with the alternative service.
       - → The answerer 911 removes all the offerer's 106*b* capabilities from the <e2enp:qosdef name="capabilities"> and makes a counteroffer for the capabilities and the contracts 1108 (<e2enp:qosdef name="capabilities"> and <e2enp:qosdef name="contracts">).
         - If the offerer 914 can download codecs →Offerer 914 downloads codecs, eventually rearranges profiles, eventually starts a new pre-negotiation 802.
         - If the offerer 914 cannot download codecs → The offerer 914 should take into account the usage of a transcoder-service.
       - → The answerer 911 may also issue 606 Not Acceptable if the offerer 914 asks for capability-support that is not available at the moment.
   - The answerer 911 discovers that the Proposal of the offerer 914 matches the answerer 911's capabilities but the offered contracts 1108 cannot be supported.
     - The answerer 911 trims respectively her/his profile
       - The answerer 911 should inform the offerer 914 that the transaction may last a bit longer because of the profile adjustment.
         - → A->O answer with "100 Trying" or "183 SessionProgress".
       - → The answerer 911 may also issue 606 Not Acceptable if the offerer 914 asks for QoS-support that is not available at the moment.
     - The answerer 911 has no possibility to adjust her/his profile
       - If the answerer 911 is a service A->O answer with "380 Alternative Service" if the answerer 911 knows such a service. The offerer 914 may then start a new pre-negotiation 802 with the alternative service.
       - The answerer 911 makes a counteroffer for the (<e2enp:qosdef name="contracts">) by trimming the ranges of the contracts 1108 of the offerer 914 or by proposing completely new ranges → It is up to the offerer 914 to adjust her/his profile and eventually start a new pre-negotiation 802.
2. Pull Mode
   - The offerer 914 discovers that the reply of the answerer 911 matches none of her/his capabilities
     - →The offerer 914 has the capabilities to download codecs
       - → The offerer 914 downloads the codecs, adjusts respectively his profile and starts a new pre-negotiation 802
     - The offerer 914 has no capabilities to download codecs
       - → The offerer 914 should take into account the usage of a transcoder-service.
   - The offerer 914 discovers that the proposal of the answerer 911 matches none of her/his "contract"-profiles
     - → The offerer 914 adjusts her/his profile accordingly before creating a counteroffer to the answerer 911
     - → The offerer 914 start a new pre-negotiation 802 in push-mode in order to enforce the adaptation of the answerer 911
3. Push-Pull Mode.
   - This case should be treated as a combination of the above two cases.

It may happen that some of the pre-negotiated and saved data at the offerer 914 and/or the answerer 911 alter due to reasons of changing profile information:

- Different users impose their performance policies on the devices (offerer 914 and/or answerer 911).
- Some higher priority (internal and/or external) processes use the resources so that the pre-negotiated profiles are no longer valid.
- Some system configuration changes have taken place, like:
  - Failures by local resource reservation, due to occupation or resource malfunction.
  - Failure by network resource reservation if e.g. the network 604 supports only "best effort" with respect to the lower network QoS levels.

New codecs and/or hardware sub-devices are being installed thus influencing the capabilities and the QoS profiles.

The offerer 914 and/or the answerer 911 may discover such premature expiry by the time they try to start an additional pre-negotiation 802 or a negotiation 806. In such a case the peers should be able to enforce the expiry of the pre-negotiated data at the side of their communication partners thus pushing it prematurely into "zombie" state.

→ Necessary indication of the premature expiry with following new pre-negotiation 802. To this extent, the <expires> element is set to zero and an additional command "expire" may be used.

If a profile change occurs within the time of running media streaming→ the side which discovers the violation should start new Full re-negotiation 808 E2ENP 908 process.

If a called peer receives a message with an indication for a negotiation 806 mode which it does not support a failure occurs at its side. → In such case the answerer 811 sends "606 Not Acceptable" to the offerer 810, indicating in the message body the negotiation 806 mode, which the answerer 811 supports. The offerer 810 should start respectively anew the negotiation 806 phase.

This might be the case by using services, since services should be able to support in parallel multiple clients and thus may have preferences for the negotiation 806 mode.

Due to peer and/or network 604 failures the body of a SIP message (the SDPng 912) or the whole SIP message may be malformed. If the answerer 911 gets such a message the possible answers may be:

→ "400 Bad Request"—if the whole SIP message is malformed.

→ "420Bad Extenson"—if only the SDPng 912 message if malformed.

If the offerer 914 gets a malformed message or has received a "malformed-message" notification → The offerer 914 should repeat the SIP 910 request.

When a third party interferes with the negotiation 806 wishing to start a negotiation 806, the following steps are performed:

If the call has the same priority:

→ The peer issues "182 Queued" if the peer decides that it can handle the call at later time.

→ The peer issues "600 Busy" if some other peer was quicker with issuing the call and has occupied all the available capacities of the answering peer. This is especially true by already running media streams 206 when eventual full re-negotiation 808 might be required.

The peer issues "603 Decline" if some other peer was quicker with issuing the call and occupied all the available capacities of the answering peer but the answering peer knows how long the call shall continue. This is also the case that a similar transaction with respect to priority is being processed at the moment and the caller has to wait.

→ The peer issues "380 Alternative Service" if the peer is a service and has information on common alternative services.

If the call has higher priority:

On the offerer 914 side:

→ The offerer 914 should be able to inform the answerer 911 about the interruption of the negotiation 806—some SDPng 912 error code.

On the answerer 911 side:

→ The answerer 911 may issue "600 Busy" or "603 Decline" with some reason indicating the interruption.

Depending on the priority of the call and the currently available resources by already running media streams 206, the peer may perform quick or full re-negotiation 808, or completely cancel the media streaming.

According to [SIPBIS04], it can be stated that "proxies generally do not modify the session 102 description, but MAY do so if necessary, e.g. for network 604 address translators, and if the session 102 description is not protected by a cryptographic integrity mechanism". This means that the Proxies understand the SDPng 912 bodies of the messages and may change them. In order to protect the E2ENP 908 messages from being altered from components, which do not understand the protocol, → digital signatures → and digests should be applied for the E2ENP-messages. Some additional signaling mechanisms should also be applied in the SDPng 912 for E2ENP 908 in order to enable the peers to inform each other that an E2ENP-message is being altered by some network 604 component not concerned in the E2ENP 908.

The integrity of the messages should be considered a security issue, which is a topic of future studies. If an answerer 911 in general understands E2ENP 908 but not the version of it. →The answerer 911 issues "606 Not Acceptable" message with SDPng 912 description indicating that the E2ENP 908 version is not supported but that an other E2ENP 908 version is supported. This is also necessary to guarantee backward compatibility of the E2N 908 versions. This means that the XML-part describing the E2ENP 908 version should be uniform for all E2ENP 908 versions.

The consideration of screened networks 604 (i.e. use of proxies, firewalls) is a security issue, which is a topic of future studies. The following is only a short description on how security may influence the E2ENP 908 error messaging:

1. The screening component does not understand E2ENP 908 but understands SIP 910 and/or SDPng 912. In this case, a non-E2ENP 908 pre-negotiation 802 with the screening component would be necessary to make it transparent for the following E2ENP-protocol.
2. The screening component understands E2ENP 908. In this case, the E2ENP 908 may carry information which concerns the non-transpatent components in form of references to eventually non-E2ENP 908 information (authentication, security, etc.) thus enabling the non-transparent components to silently check and forward the E2ENP-messages. The offerers **106*b* and the answerers 106*a*2 not interested in this information may simply discard it. This approach allows silently dealing with non-transparent (with respect to E2ENP 908) components, thus making the network 604 explicitly transparent, and masking so-me of the SIP 910 "Request Failures 4xx" messages which may negatively influence the E2ENP 908**.

Particular issues with the usage of SIP 910 concerning E2ENP 908 can be summarized as follows:

1. The E2ENP 908 is a meta protocol over SIP 910, insofar as the E2ENP 908 does not follow the layering paradigm.
2. The E2ENP meta protocol SHOULD be explicitly named in the SIP messages in order to avoid the interference of the intermediate components in the E2ENP-sessions 103. According to the SIP 910 definition in [SIPBIS04], the "Subject" header field "provides a summary or indicates the nature of the call, allowing call filtering without having to parse the session 102 description", thus the indication

| Subject: E2ENP |
|---|

can be used to define the start of a E2ENP 908 session 103 in the start request of the E2ENP 908. The intermediate components understanding E2ENP 908 would then simply forward the messages of an E2ENP 908 call as indicated in the SIP 910 definition.

In order to keep track of the E2ENP 908 messages along the signaling path and to assure that the call for end-to-end negotiation 806 is unmistakably understood, an additional indication of the meta protocol SHOULD be carried in the "Content-Type" header:

| Content-Type: application/e2enp/sdpng |
|---|

in order to inform all the intermediate components understanding SIP 910 that the message bodies of E2ENP 908 SHALL NOT undergo changes. This additional indication is necessary since the "Subject" header by definition is used only with the request-calls, which is insufficient with respect to the inviolability of the response-calls. In the structure of the content-type name "application/e2enp/sdpng"

the indication of the E2ENP 908 is in the middle, thus avoiding the misusage of the message body from components which understand SIP 910 and SDPng 912 but not E2ENP 908. The components which understand E2ENP 908 should per se also understand SDPng 912.

3. Note: Additional usage of the status call reply "380 Alternative Service" should be considered by performing third-party-negotiation. The answerer 811, in a structural model offerer-mediator-answerer, is the "alternative service" from the perspective of the mediator **106*a*1**.

In the following section, some examples shall be presented depicting how the solution can be used in practical cases. The first example deals with videoconference **1204*a/b* services, in which one-to-one and one-to-many scenarios are used. The second example deals with third-party-assisted negotiation 806** scenarios. The third example depicts the cases of a many-to-many scenario.

Figure 12:
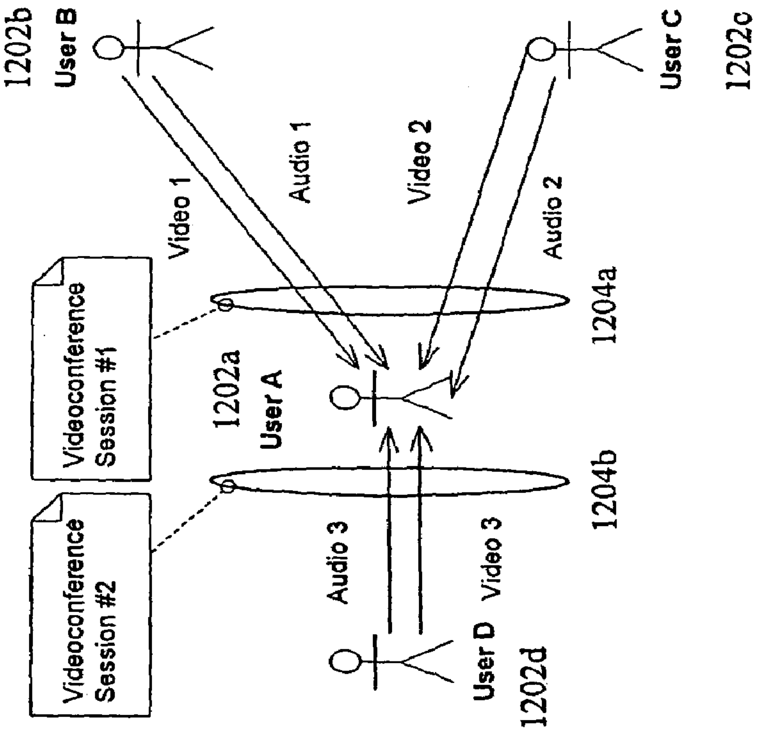
FIG. 12 shows an example of a user who simultaneously joins two different videoconference sessions.

More specifically, the case of a given user A shall be considered who simultaneously joins two different videoconference sessions **1204*a/b* as depicted in FIG. 12. User A is NOT acting as a mixer on behalf of the other peers, rather is simply participating to two different video conferences 1204*a/b*. In our terminology, each instance of the videoconference application is named "videoconference session" 1204*a/b*. User A 1202*a* will then open the videoconference session #1 with user B 1202*b* and user C 1202*c*, and the video-conference session #2 with user D 1202*d***.

In this example, we simply focus on the level of QoS requested and perceived by user A **1202*a*. Therefore, we limit this example to the negotiation 806 of the level of QoS that user A 1202*a*-wishes to obtain for incoming media streams 206 from her/his peers 1202*b/c/d*; furthermore, we may well assume that user A 1202*a* has enough information to enforce QoS correlation 804 and time synchronization 805 on all of the media streams 206 included in both videoconference sessions 1204*a/b***.

In the rest of this section the following convention is applied:

1. Message sequence charts are first presented, detailing the protocol procedures to be applied. The SDPng content is referenced by keywords: bids are referenced with the keyword "bid-x", answers with the keyword "answer-y", in which in both cases x and y stand for an incremental integer positive value.
2. A detailed description of the SDPng content is then collected in a separate sub-paragraph.

The following diagram refers to a pre-negotiation in a one-to-one communication scenario 100:

Push mode:

```
Peer A: Receiver/Offerer 914 - Peer B:
Sender/answerer 911
A: Local-Admission-Control (bid-1.1 - the
initial proposal):
    successful
A: OPTIONS (bid-1.1) -> B
B: Local-Admission-Control (bid-1.1):
    answer-1.1
B: 200 OK (answer-1.1) ->A
```

Pull mode:

```
Peer A: Receiver/Offerer 914 - Peer B:
Sender/answerer 911
A: OPTIONS -> B
B: Local-Admission-Control (bid-1.2):
    successful
B: 200 OK (bid-1.2) ->A
A: Local-Admission-Control (bid-1.2):
    answer-1.2 ⊆ bid-1.2
    A: OPTIONS (answer-1.2 ) -> B
B: 200 OK ->A
```

Note (1): The offerer 914 may or may not need to notify the answer, to the answerer 911 with the second OPTIONS method.

For instance, in the case of a Video on Demand scenario the offerer 914 might equivalently use the RTSP DESCRIBE method to gather information about QoS contracts 1108 associated with a given media. In that case, the answerer 911 (e.g. a VoD server) would not need to be informed about the offerer 914's (i.e. client's) choice, until the actual media streaming is started. In this document we focus however on SIP-based conference scenarios, in which peers are to be considered substantially on an equal footage: each peer intends to be informed about other peers for later communication. This is especially true, if e.g. peer B intends to enforce QoS correlation 804 and time synchronization 805. Therefore, the scenario depicted above does apply to the example hereby addressed.

Push-Pull mode

```
Peer A: Sender-Receiver/Offerer 914 - Peer B:
Sender-Receiver/answerer 911
A: Local-Admission-Control (bid-1.3):
    successful
A: OPTIONS (bid-1.3) -> B
```

-continued

```
B: Local-Admission-Control (bid-1.4):
    successful
B: Local-Admission-Control (bid-1.3):
    answer-1.3 ⊆ bid-1.3
B: 200 OK (answer-1.3 + bid.1.4) ->A
A: Local-Admission-Control (bid-1.4):
    answer-1.4 ⊆ bid-1.4
A: OPTIONS (answer-1.4) -> B
B: 200 OK ->A
```

Note (2): Upon receiving a bid from the offerer 914, the answerer 911 first of all validates its own bid (e.g. based on user profile information), and then the offerer 914's bid, by following a sub-case of the economy principle (commit first to local resources, and then to remote peer's ones).

In the following section, the SIP message bodies indicated with the keywords bid-x, answer-y in the previous examples is described.

```
Bid-1.1
<e2enp:purpose>
  <session user="Mary" session-id="2890843112"
      version="28908413931" nettype="IN" addrtype="IP4"
      addr="43.196.180.1">
    <expires time="36000"/>
  </session>
  <description
      type="request"
      name="pre-negotiation"
      mode="push"/>
</e2enp:purpose>
<e2enp:qosdef name="capabilities">
  <audio:codec name="PCMU" scope="applicable"/>
  <audio:codec name="G729" scope="applicable"/>
  <audio:codec name="G722" scope="possible"/>
  <rtp:pt name="rtp-avp-0" pt="0" format="PCMU"/>
  <rtp:pt name="rtp-avp-18" pt="18" format="G729"/>
  <rtp:pt name="rtp-avp-9" pt="9" format="G722"/>
  <video:codec name="H263" scope="applicable"/>
  <video:codec name="H261" scope="applicable"/ >
  <video:codec name="WAVI" scope="possible"/>
  <rtp:pt name="rtp-avp-34" pt="34" format="H263"/>
  <rtp:pt name="rtp-avp-31" pt="31" format="H261"/>
  <rtp:pt name="rtp-avp-100" pt="100" format="WAVI">
    <video:codec frame-rate-range="5, 30"
      frame-size-set="QCIF, CIF"
      color-quality-range="9100, 10000"
        overall-quality-range="9100, 10000"/>
  </rtp:pt>
</e2enp:qosdef>
<e2enp:qosdef name="contracts">
  <policy
  name="Let us optimize ((memory && network) || CPU)">
    <predicate id="predicate-1"
    first-term="optMemoryUsage"
      second-term="optNetworkPerformance"
    function="and"/>
    <predicate id="predicate-2"
      first-term="predicate-1"
      second-term="optCpuLoad"
      function="or"/>
    <criterion type="expression" idref="predicate-2"/>
  </policy>
  <audio>
    <contract name="audio-contract-1"
    sampling-rate-set="4000, 8000" channel-set="1"/>
    <contract name="audio-contract-2"
    sampling-rate-set="8000, 12000" channel-set="1,2"/>
    <contract name="audio-contract-3"
    sampling-rate-set="12000, 16000" channel-set="1"/>
    <rtp:map contract="audio-contract-1"
    format="rtp-avp-0" role="receiver"/>
    <rtp:map contract="audio-contract-2"
```

-continued

```
    format="rtp-avp-18" role="receiver"/>
    <rtp:map contract="audio-contract-3"
    format="rtp-avp-9" role="receiver"/>
  </audio>
  <video>
    <contract name="video-contract-1"
    frame-rate-set="10,15" frame-size-set="CIF"
    color-quality-range="9100, 9700"
    overall-quality-range="9500, 9800"/>
    <contract name="video-contract-2"
    frame-rate-set="15,20" frame-size-set="QCIF"
    color-quality-range="9700, 9850"
    overall-quality-range="9800, 9900"/>
    <contract name="video-contract-3"
    frame-rate-set="20,25" frame-size-set="QCIF, CIF"
    color-quality-range="9850, 9900"
    overall-quality-range="9900, 9960"/>
    <rtp:map contract="video-contract-1"
    format="rtp-avp-34" role="receiver"/>
    <rtp:map contract="video-contract-2"
    format="rtp-avp-31" role="receiver"/>
    <rtp:map contract="video-contract-2"
    format="rtp-avp-100" role="receiver"/>
  </video>
</e2enp:qosdef>
```

XML EXAMPLE 18

Answer-1.1

The counteroffer indicates what capabilities the answerer 911 supports, and to what extent. If a given capability is supported "as is", only the corresponding identifier is indicated, along with the scope attribute set to applicable. If a given capability is not supported the corresponding identifier is simply omitted (in the example, the G.729 audio codec and the WAVI video codec). If a given capability is updated in the <e2enp:qosdef name="contracts"> section, the entire description with the updates is returned. In any case, the <e2enp:qosdef name="contracts"> contains in a response only updated codec parameterizations. In the example, the PCMU audio codec and the H.261 video codecs are reparameterized by the answerer 911.

Eventually, the counteroffer may list some capabilities not supported by the offerer 914. In the example, a L16 audio codec and an MPEG-2 video codec.

Counteroffers to the <e2enp:qosdef name="contracts"> part of a bid can be proposed by the answerer 911, independently of the corresponding lines in the <e2enp: qosdef="capabilities"> section, and vide versa. In the example, the scope of the G.722 audio codec is counter-offered as applicable in the <e2enp:qosdef name="capabilities"> section, but the corresponding contract 118 in the <e2enp:qosdef name="contracts"> section is kept as it is.

As aforementioned, a counteroffer to the contract 1108 relative to the PCMU audio codec is proposed in the <e2enp: qosdef name="contracts"> section, whereas the corresponding bid in the <e2enp:qosdef name="capabilities"> section is kept as is. This flexibility is due to the modular definition of the various sections.

Changes with respect to the original bid are indicated in boldface. In this example, the answerer 911 replies to the offerer 914 by indicating that:

The G729 audio codec cannot be supported (corresponding lines removed).

The L16 audio codec could be supported (indicated as "possible" with configuration set).

The WAVI video codec cannot be supported corresponding lines removed).

The MPEG-2 video codec could be supported (indicated as "possible" with configuration set).

Only network resource optimization policy shall be used

Audio-contract-1: only a subset of the proposed sampling-range can be applied.

Video-contract-2: only a subset of the proposed frame-rate-range can be applied.

```
<e2enp:purpose>
  <session user="Mary" session-id="2890843112"
      version="2890841393" nettype="IN" addrtype="IP4"
      addr="43.196.180.1">
    <expires time="36000"/>
  </session>
  <description
    type="response"
    name="pre-negotiation"
    mode="push"/>
</e2enp:purpose>
<e2enp:qosdef name="capabilities">
  <audio:codec name="PCMU" scope="applicable"/>
  <audio:codec name="G722" scope="applicable"/>
  <audio:codec name="L16" scope="possible"/>
  <rtp:pt name="rtp-avp-0" pt="0" format="PCMU"/>
  <rtp:pt name="rtp-avp-9" pt="9" format="G722"/>
  <rtp:pt name="rtp-avp-11" pt="11" format="L16"/>
  <video:codec name="H263" scope="applicable"/>
  <video:codec name="H261" scope="applicable"/>
  <video:codec name="MP2T" scope="possible"/>
  <rtp:pt name="rtp-avp-34" pt="34" format="H263"/>
  <rtp:pt name="rtp-avp-31" pt="31" format="H261"/>
  <rtp:pt name="rtp-avp-33" pt="33" format="MP2T">
    <video:codec frame-rate-range="30, 30"
      frame-size-set="SIF"
      color-quality-range="0, 10000"
      overall-quality-range="0, 10000"/>
</e2enp:qosdef>
<e2enp:qosdef name="contracts">
  <policy name="Let us optimize ((memory && network) || CPU)">
    <criterion type="optNetworkPerformance"/>
  </policy>
  <audio>
    <contract name="audio-contract-1"
    sampling-range="5000, 7000" channels="1"/>
    <contract name="audio-contract-3"/>
  </audio>
  <video>
    <contract name="video-contract-1"/>
    <contract name="video-contract-2"
    frame-rate-range="15,18"
    frame-size="QCIF" quality-range="9700–9850"/>
  </video>
</e2enp:qosdef>
```

XML EXAMPLE 19

Bid-1.2 and Answer-1.2.

Said bid and answer differ from the others described in the previous paragraphs insofar as the <e2enp:purpose> section indicates the pull mode in this case.

```
For the "OPTIONS":
<e2enp:purpose>
  <session user="Mary" session-id="2890843112"
    version="2890841393" nettype="IN" addrtype="IP4"
    addr="43.196.180.1">
    <expires time="3600"/>
  </session>
  <description
```

-continued

```
      type="request"
      name="pre-negotiation"
      mode="pull"/>
    </e2enp:purpose>
```

XML EXAMPLE 20

For the "Bid-1.2":

```
<e2enp:purpose>
  <session user="Mary" session-id="2890843112"
      version="2890841393" nettype="IN" addrtype="IP4"
      addr="43.196.180.1">
    <expires time="3600"/>
  </session>
  <description
    type="response"
    name="pre-negotiation"
    mode="pull"/>
</e2enp:purpose>
... "Bid-1.2" content ...
```

XML EXAMPLE 21

For the "Answer-1.2":

```
<e2enp:purpose>
  <session user="Mary" session-id="2890843112"
      version="2890841393" nettype="IN" addrtype="IP4"
      addr="43.196.180.1">
    <expires time="3600"/>
  </session>
  <description
    type="request"
    name="pre-negotiation"
    mode="pull"/>
</e2enp:purpose>
... "Answer-1.2" content ...
```

XML EXAMPLE 22 and the final reply from peer B is:

```
<e2enp:purpose>
  <session user="Mary" session-id="2890843112"
      version="2890841393" nettype="IN" addrtype="IP4"
      addr="43.196.180.1">
    <expires time="3600"/>
  </session>
  <description
    type="response"
    name="pre-negotiation"
    mode="pull"/>
</e2enp:purpose>
```

XML EXAMPLE 23

These bids and answers differ from those described in the previous paragraphs, insofar as the, the <e2enp:purpose> section indicates in this case the push-pull mode. The “Bid-1.3” shall include as <e2enp:purpose> the following:

```
<e2enp:purpose>
   <session user=“Mary” session-id=“2890843112”
   version=“2890841393” nettype=“IN” addrtype=“IP4”
   addr=“43.196.180.1”/>
   <description
      type=“request”
      name=“pre-negotiation”
      mode=“push-pull”/>
</e2enp:purpose>
```

XML EXAMPLE 24

More specifically, “Answer-1.3+Bid-1.4” accounts for the case in which the E2ENP 908 SDPng content includes both the bid and the answer of the answerer 911. In order to distinguish the bid from the answer, each of them shall feature a distinct <e2enp:purpose> section. This means that the push-pull pre-negotiation 802 results in the interleaving of two pre-negotiation 802 sessions 103, each with its own identifier.

More concretely, if for instance the “Bid-1.3” features a <e2enp:purpose> section like the one indicated above, the “Answer-1.3+Bid-1.4” shall then feature two <e2enp:purpose> sections like the following:

```
<e2enp:purpose>
   <session user=“Mary” session-id=“2890843112”
         version=“2890841393” nettype=“IN” addrtype=“IP4”
         addr=“43.196.180.1”>
      <expires time=“36000”/>
   <description
      type=“response”
      name=“pre-negotiation”
      mode=“push-pull”/>
</e2enp:purpose>
... “Answer-1.3” content ...
<e2enp:purpose>
   <session user=“Kate” session-id=“2890844526”
         version=“2890842807” nettype=“IN” addrtype=“IP4”
         addr=“43.196.180.145”>
      <expires time=“36000”/>
   <use>
      <session user=“Mary” session-id=“2890843112”
      version=“2890841393” nettype=“IN” addrtype=“IP4”
      addr=“43.196.180.1”/>
   </use>
   <description
      type=“request”
      name=“pre-negotiation 802”
      mode=“push-pull”/>
</e2enp:purpose>
... “Bid-1.4” content ...
```

XML EXAMPLE 25

The answerer 911’s bid references the offerer 914’s bid via the <use> construct, insofar as the answerer 911 formulates its bid based not only on answerer 911’s preferences (e.g. from user profile information) but also on the offerer 914’s bid (and eventually based on QoS correlation 804 and/or time synchronization 805 constraints).

Of course, by following the above example, the “Answer-1.14” shall include as <e2enp:purpose> the following:

```
<e2enp:purpose>
   <session user=“Kate” session-id=“2890844526”
         version=“2890842807” nettype=“IN” addrtype=“IP4”
         addr=“43.196.180.145”>
      <expires time=“3600”/>
   </session>
   <use>
      <session user=“Mary” session-id=“2890843112”
      version=“2890841393” nettype=“IN” addrtype=“IP4”
      addr=“43.196.180.1”/>
   </use>
   <description
      type=“response”
      name=“pre-negotiation”
      mode=“push-pull”/>
</e2enp:purpose>
```

XML EXAMPLE 26

In the following section, the negotiation and resource reservation shall be described:

Push mode

```
Peer A: Receiver/Offerer 914 - Peer B:
Sender/Answerer 911
A: Local-Admission-Control (bid-2.1):
      successful
A: Local-Resource-Reservation (bid-2.1):
      successful
A: INVITE (bid-2.1) -> B
B: Local-Admission-Control (bid-2.1):
      answer-2.1 ⊆ bid-2.1
B: Local-Resource-Reservation (answer-2.1):
      successful
B: 183 Session Progress (answer-2.1) ->A
A: Local-Resource-Reservation (answer-2.1):
      successful
A: PRACK (command-start-reservation) -> B
B: 200 OK (of PRACK)
      (command-start-reservation) -> A
A: Network 604 reservation (based on answer-
2.1)
B: Network 604 reservation (based on answer-
2.1)
B. COMET (command-ready-reservation)-> A
A: 200 OK (of COMET) -> B
A. COMET (command-ready-reservation) -> B
B: 200 OK (of COMET) -> A
B: 180 Ringing -> A
B: 200 OK (of INVITE) -> A
A: ACK -> B
```

Note (1):
After having pre-booked local resource with respect to “Bid-2.1”, peer A finally reserves the negotiated subset “Answer-2.1” in order to release any excess resource.

Pull mode

| |
|---|
| Peer A: Receiver/Offerer 914 - Peer B: Sender/Answerer 911 |
| A: INVITE -> B |
| B: Local-Admission-Control (bid-2.2): successful |
| B: Local-Resource-Reservation (bid-2.2): successful |
| B: 183 Session Progress (bid-2.2) ->A |
| A: Local-Admission-Control (bid-2.2): answer-2.2 $\subseteq$ bid-2.2 |
| A: Local-Resource-Reservation (answer-2.2): successful |
| A: PRACK (answer-2.2 - see Note (3))-> B |
| B: Local-Resource-Reservation (answer-2.2): successful |
| B: 200 OK (of PRACK) (command-start-reservation) -> A |
| A: Network 604 reservation (based on answer-2.2) |
| B: Network 604 reservation (based on answer-2.2) |
| B. COMET (command-ready-reservation) -> A |
| A: 200 OK (of COMET) -> B |
| A. COMET (command-ready-reservation) -> B |
| B: 200 OK (of COMET) -> A |
| B: 180 Ringing -> A |
| B: 200 OK -> A |
| A: ACK -> B |

Note (2):
After having pre-booked local resource with respect to “Bid-2.2”, peer B finally reserves the negotiated subset “Answer-2.2” in order to release any excess resource.
Note (3):
“Bid-2.2” and “Answer-2.1” are substantially equivalent to (correspondingly) “Bid-2.1” and “Answer-2.1”, except for the <e2enp:purpose> section, which features the attribute “mode” set to “pull” and, in the case of “Answer-2.2”,the attribute “type” set to “start-reservation”.

Push-Pull mode

| |
|---|
| Peer A: Sender-Receiver/Offerer 914 - Peer B: Sender-Receiver/Answerer 911 |
| A: Local-Admission-Control (bid-2.3): successful |
| A: Local-Resource-Reservation (bid-2.3): successful |
| A: INVITE (bid-2.3) -> B |
| B: Local-Admission-Control (bid-2.4): successful |
| B: Local-Admission-Control (bid-2.3): answer-2.3 $\subseteq$ bid-2.3 |
| B: Local-Resource-Reservation (bid-2.4): successful |
| B: Local-Resource-Reservation (answer-2.3): successful |
| B: 183 Session Progress (answer-2.3 + bid-2.4) ->A |
| A: Local-Resource-Reservation (answer-2.3): successful |
| A: Local-Admission-Control (bid-2.4): answer-2.4 $\subseteq$ bid-2.4 |
| A: Local-Resource-Reservation (answer-2.4): successful |
| A: PRACK (answer-2.4- see Note (6))-> B |
| B: Local-Resource-Reservation (answer-2 .4): successful |
| B: 200 OK (of PRACK: command-start-reservation) -> A |
| A: Network 604 reservation (based on answer-2.3 + answer-2.4) (Note (7)) |

-continued

| |
|---|
| B: Network 604 reservation (based on answer-2.3 + answer-2.4) (Note (8)) |
| B. COMET (command-ready-reservation) -> A |
| A: 200 OK (of COMET) -> B |
| A. COMET (command-ready-reservation) -> B |
| B: 200 OK (of COMET) -> A |
| B: 180 Ringing -> A |
| B: 200 OK -> A |
| A: ACK -> B |

Note (4):
After having pre-booked local resource with respect to “Bid-2.3”, peer A finally reserves the negotiated subset “Answer-2.3” in order to release any excess resource.
Note (5):
After having pre-booked local resource with respect to “Bid-2.4”, peer B finally reserves the negotiated subset “Answer-2.4” in order to release any excess resource.
Note (6):
“Bid-2.3”/“Bid-2.4” and “Answer-2.3”/“Answer-2.4” are substantially equivalent to (correspondingly) “Bid-2.1” and “Answer-2.1”, except for the <e2enp:purpose> section, which features the “mode” element set to push-pull and, inthe case of “Answer-2.4”, the attribute “type” set to “start-reservation”.
Note (7):
The “Answer-2.3” is a TSpec for receiving, the “Answer-2.4” is a TSpec for sending.
Note (8):
The “Answer-2.3” is a TSpec for sending, the “Answer-2.4” is a TSpec for receiving.

In the following section, the SIP message bodies indicated with the keywords bid-x, answer-y in the previous examples shall be described.

Bid-2.1

This bid refers to pre-negotiated information, by indicating the session 103 identifier uniquely indicating that information via the <use> construct in the <e2enp:purpose> section. In this example, the referred information is “Bid-1.1”, which was used for pre-negotiating capabilities and stream-level QoS contracts 1108. Alternatively, the peers could have pre-negotiated the AP information contained in this paragraph, directly in “Bid-1.1” in order to speed up the negotiation 806 phase.

```
<e2enp:purpose>
  <session user=“Mary” session-id=“2890844526”
      version=“2890842807” nettype=“IN” addrtype=“IP4”
      addr=“43.196.180.1”>
    <expires time=“3600”/>
  </session>
  <use>
    <session user=“Mary” session-id=“2890843112”
    version=“2890841393” nettype=“IN” addrtype=“IP4”
    addr=“43.196.180.1”/>
  </use>
  <description
    type=“request”
    name=“negotiation”
    mode=“push”/>
</e2enp:purpose>
<cfg>
  <component name=“audio-stream-1” media=“audio”>
    <alt name=“AVP-audio-0”>
      <rtp:session format=“rtp-avp-0”>
        <rtp:udp role=“receive” nettype=“IN”
        addrtype=“IP4” addr=“43.196.180.1”
        rtp-port=“7800”
        rtcp-port=“7801”/>
      </rtp:session>
    </alt>
```

-continued

```
<alt name="AVP-audio-9">
  <rtp:session format="rtp-avp-9">
    <rtp:udp role="receive" nettype="IN"
    addrtype="IP4" addr="43.196.180.1"
    rtp-port="7840"
    rtcp-port="7851"/>
  </rtp:session>
</alt>
</component>
<component name="video-stream-1" media="video">
  <alt name="AVP-video-34">
    <rtp:session format="rtp-avp-34">
      <rtp:udp role="receive" nettype="IN"
      addrtype="IP4" addr="43.196.180.1"
      rtp-port="7900"
      rtcp-port="7901"/>
    </rtp:session>
  </alt>
  <alt name="AVP-video-31">
    <rtp:session format="rtp-avp-31">
      <rtp:udp role="receive" nettype="IN"
      addrtype="IP4" addr="43.196.180.1"
      rtp-port="7920"
      rtcp-port="7921"/>
    </rtp:session>
  </component>
</cfg>
<e2enp:qoscfg level="stream">
  <! --adaptation path for single media streams 206 -->
  <adapath name="audio1" ref_component="audio-stream-1">
    <default name="nominal"
    ref_contract="audio-contract-1"/>
    <alt name="choice1"
    ref_contract="audio-contract-3"/>
  </adapath>
  <adapath name="video1" ref_component="video-stream-1">
    <default name="nominal"
    ref_contract="video-contract-1"/>
    <alt name="choice1"
    ref_contract="video-contract-2"/>
  </adapath>
  <! -- Possible associations of media streams 206 between
user A and B -->
  <context name="association1-1" scope="applicable">
    <comp name="element1" ref_adapath="audio1"/>
    <comp name="element2" ref_adapath="video1"/>
    <constraints>
      <par name="lipsync-delay" reference="audio1"
      max="2"/>
      <par name="aggregated-bw" max="64000"/>
    </constraints>
  </context>
  <context name="association1-2" scope="possible">
    <comp name="element1" ref_adapath="audio1"/>
  </context>
  <adapath name="associations-A-B" >
    <default name="nominal"
    ref_context="association1-1"/>
    <alt name="choice1" ref_context="association1-2"/>
  </adapath>
</e2enp:qoscfg>
```

XML EXAMPLE 27

Answer-2.1

Concerning the SDPng 912 <cfg> section, the answerer 911 in this example replies to the offerer 914 by listing only the transport information upon which agreement has been reached. Changes with respect to the original bid are indicated in boldface. In this example, the answerer 911 replies to the offerer 914 by indicating the following:

The "AVP-video-33" option cannot be supported, due to e.g. IPv6 not supported by the answerer 911 (corresponding lines removed).

"association1-1": Only a subset of the proposed "lipsync-delay" can be applied.

association1-1: Only a subset of the proposed "aggregated-bw" can be applied.

"association1-2": Confirmed as applicable.

At this phase, the peers negotiate media stream 206 AP and association AP, via the <E2enp:qoscfg> section: in this example, the answerer 911 replies with a subset of the bid QoS correlation 804 and time synchronization 805 constraints (only changed elements are detailed: changes are indicated in boldface).

```
<e2enp:purpose>
  <session user="Mary" session-id="2890844526"
      version="2890842807" nettype="IN" addrtype="IP4"
      addr="43.196.180.1">
    <expires time="3600"/>
  </session>
  <use>
    <session user="Mary" session-id="2890843112"
    version="2890841393" nettype="IN" addrtype="IP4"
    addr="43.196.180.1"/>
  </use>
  <description
    type="response"
    name="negotiation"
    mode="push"/>
</e2enp:purpose>
<cfg>
  <component name="audio-stream-1" media="audio">
    <alt name="AVP-audio-0"/>
    <alt name="AVP-audio-9"/>
  </component>
  <component name=" audio-stream-1" media="video">
    <alt name="AVP-audio-34"/>
    <alt name="AVP-audio-31"/>
  </component>
</cfg>
<e2enp:qoscfg level="stream">
  <! --adaptation path for single media streams -->
  <adapath name="audio1"/>
  <adapath name="video1"/>
  <! -- Possible associations of media streams between
user A and B -->
  <context name="association1-1" scope="applicable">
    <comp name="element1" ref_adapath="audio1"/>
    <comp name="element2" ref_adapath="video1"/>
    <constraints>
      <par name="lipsync-delay" reference="audio1"
          max="1.5"/>
      <par name="aggregated-bw" max="56000"/>
    </constraints>
  </context>
  <context name="association1-2" scope="applicable">
    <comp name="element1" ref_adapath="audio1"/>
  </context>
  <adapath name="associations-A-B"/>
</e2enp:qoscfg>
```

XML EXAMPLE 28

To signal the command to a peer to start reserving resources, the SDPng content will simply feature a <e2enp:purpose> section with the attribute "name" set to "start-reservation", as in the following example:

```
<e2enp:purpose>
  <session user="Mary" session-id="2890843112"
  version="2890841393" nettype="IN" addrtype="IP4"
  addr="43.196.180.1"/>
  <description
```

-continued

```
        type="request"
        name="start-reservation"/>
    </e2enp:purpose>
```

XML EXAMPLE 29

To signal the peer that reservation has been accomplished, the SDPng content will simply feature a <e2enp:purpose> section with the attribute "name" set to "ready-reservation", as in the following example:

```
<e2enp:purpose>
    <session user="Mary" session-id="2890843112"
    version="2890841393" nettype="IN" addrtype="IP4"
    addr="43.196.180.1"/>
    <description
        type="request"
        name="ready-reservation"/>
</e2enp:purpose>
```

XML EXAMPLE 30

As anticipated above, the peers could have pre-negotiated the AP information described in the rest of this paragraph directly in "Bid-1.1" in order to speed up the negotiation 806 phase. Following is an example of pre-negotiation 802 bid and answer information (for the simple case of a push mode pre-negotiation 802), and then the negotiation 806 bid and answer (again, push mode). The following example is based on the corresponding ones described above.

Bid-1.1—with media stream 206 AP and Group AP (with respect to stream associations)

```
<e2enp:purpose>
  <session user="Mary" session-id="2890843112"
    version="2890841393" nettype="IN"
    addrtype="IP4" addr="43.196.180.1">
    <expires time="36000"/>
  </session>
  <description
    type="request"
    name="pre-negotiation"
    mode="push"/>
</e2enp:purpose>
<e2enp:qosdef name="capabilities">
  <audio:codec name="PCMU" scope="applicable"/>
  <audio:codec name="G729" scope="applicable"/>
  <audio:codec name="G722" scope="possible"/>
  <rtp:pt name="rtp-avp-0" pt="0"
  format="PCMU"/>
  <rtp:pt name="rtp-avp-18" pt="18"
  format="G729"/>
  <rtp:pt name="rtp-avp-9" pt="9"
  format="G722"/>
  <video:codec name="H263" scope="applicable"/>
  <video:codec name="H261" scope="applicable"/ >
  <video:codec name="WAVI" scope="possible"/>
  <rtp:pt name="rtp-avp-34" pt="34"
  format="H263"/>
  <rtp:pt name="rtp-avp-31" pt="31"
  format="H261"/>
  <rtp:pt name="rtp-avp-100" pt="100"
  format="WAVI">
    <video:codec frame-rate-range="5, 30"
     frame-size-set="QCIF, CIF"
```

-continued

```
     color-quality-range="9100, 10000"
    overall-quality-range="9100, 10000"/>
  </rtp:pt>
</e2enp:qosdef>
<e2enp:qosdef name="contracts">
  <policy name="Let us optimize ((memory && network) || CPU)">
    <predicate id="predicate-1"
     first-term="optMemoryUsage"
     second-term="optNetworkPerformance"
     function="and"/>
    <predicate id="predicate-2"
     first-term="predicate-1"
     second-term="optCpuLoad"
     function="or"/>
    <criterion type="expression"
    idref="predicate-2"/>
  </policy>
  <audio>
    <contract name="audio-contract-1"
    sampling-rate-set="4000, 8000"
    channel-set="1"/>
    <contract name="audio-contract-2"
    sampling-rate-set="8000, 12000"
    channel-set="1,2"/>
    <contract name="audio-contract-3"
    sampling-rate-set="12000, 16000"
    channel-set="1"/>
    <rtp:map contract="audio-contract-1"
    format="rtp-avp-0" role="receiver"/>
      <rtp:map contract="audio-contract-2"
      format="rtp-avp-18" role="receiver"/>
      <rtp:map contract="audio-contract-3"
      format="rtp-avp-9" role="receiver"/>
    </audio>
    <video>
      <contract name="video-contract-1"
      frame-rate-set="10,15"
      frame-size-set="CIF"
      color-quality-range="9100, 9700"
      overall-quality-range="9500, 9800"/>
      <contract name="video-contract-2"
      frame-rate-set="15,20"
      frame-size-set="QCIF"
      color-quality-range="9700, 9850"
      overall-quality-range="9800, 9900"/>
      <contract name="video-contract-3"
      frame-rate-set="20,25"
      frame-size-set="QCIF, CIF"
      color-quality-range="9850, 9900"
      overall-quality-range="9900, 9960"/>
      <rtp:map contract="video-contract-1"
      format="rtp-avp-34" role="receiver"/>
      <rtp:map contract="video-contract-2"
      format="rtp-avp-31" role="receiver"/>
      <rtp:map contract="video-contract-2"
      format="rtp-avp-100" role="receiver"/>
  </video>
</e2enp:qosdef>
<e2enp:qoscfg level="stream">
  <! --adaptation path for single media streams -
  ->
  <adapath name="audio1"
  ref_component="audio-stream-1">
    <default name="nominal"
    ref_contract="audio-contract-1"/>
    <alt name="choice1"
    ref_contract="audio-contract-3"/>
  </adapath>
  <adapath name="video1"
  ref_component="video-stream-1">
    <default name="nominal"
    ref_contract="video-contract-1"/>
    <alt name="choice1"
    ref_contract="video-contract-2"/>
  </adapath>
  <! -- Possible associat. of media streams 206 between
user A & B -->
  <context name="association1-1" scope="applicable">
    <comp name="element1" ref_adapath="audio1"/>
```

-continued

```
    <comp name="element2" ref__adapath="video1"/>
    <constraints>
      <par name="lipsync-delay"
      reference="audio1" max="2"/>
      <par name="aggregated-bw" max="64000"/>
    </constraints>
  </context>
  <context name="association1-2" scope="possible">
    <comp name="element1" ref__adapath="audio1"/>
  </context>
  <adapath name="associations-A-B" >
    <default name="nominal"
    ref__context="association1-1"/>
    <alt name="choice1"
    ref__context="association1-2"/>
  </adapath>
</e2enp:qoscfg>
```

XML EXAMPLE 31

Answer-1.1—with media stream 206 AP and Group AP (with respect to stream associations)

```
<e2enp:purpose>
  <session user="Mary" session-id="2890843112"
       version="2890841393" nettype="IN"
       addrtype="IP4" addr="43.196.180.1">
    <expires time="36000"/>
  </session>
  <description
    type="response"
    name="pre-negotiation 802"
    mode="push"/>
</e2enp:purpose>
<e2enp:qosdef name="capabilities">
  <audio:codec name="PCMU" scope="applicable"/>
  <audio:codec name="G722" scope="applicable"/>
  <audio:codec name="L16"scope="possible"/>
  <rtp:pt name="rtp-avp-0" pt="0"
  format="PCMU"/>
  <rtp:pt name="rtp-avp-9" pt="9"
  format="G722"/>
  <rtp:pt name="rtp-avp-11"pt="11"
  format="L16"/>
  <video:codec name="H263" scope="applicable"/>
  <video:codec name="H261" scope="applicable"/>
  <video:codec name="MP2T" scope="possible"/>
  <rtp:pt name="rtp-avp-34" pt="34"
  format="H263"/>
  <rtp:pt name="rtp-avp-31" pt="31"
  format="H261"/>
  <rtp:pt name="rtp-avp-33" pt="33"
  format="MP2T">
    <video:codec frame-rate-range="30, 30"
        frame-size-set="SIF"
        color-quality-range="0, 10000"
      overall-quality-range="0, 10000"/>
</e2enp:qosdef>
<e2enp:qosdef name="contracts">
  <policy name="Let us optimize ((memory && network) || CPU)">
    <criterion type="optNetworkPerformance"/>
  </policy>
  <audio>
    <contract name="audio-contract-1"
    sampling-range="5000, 7000"
    channels="1"/>
    <contract name="audio-contract-3"/>
  </audio>
  <video>
    <contract name="video-contract-1"/>
    <contract name="video-contract-2"
     frame-rate-range="15,18"
     frame-size="QCIF"
```

-continued

```
      quality-range="9700-9850"/>
  </video>
</e2enp:qosdef>
<e2enp:qoscfg level="stream">
  <! --adaptation path for single media streams
  -->
  <adapath name="audio1"/>
  <adapath name="video1"/>
  <!-- Possible ass. of media streams 206 between
  user A & B -->
  <context name="association1-1"
  scope="applicable">
    <comp name="element1"
    ref__adapath="audio1"/>
    <comp name="element2"
    ref__adapath="video1"/>
    <constraints>
      <par name="lipsync-delay"
      reference="audio1" max="1.5"/>
      <par name="aggregated-bw"
      max="56000"/>
    </constraints>
  </context>
  <context name="association1-2"
    scope="applicable">
    <comp name="element1"
    ref__adapath="audio1"/>
  </context>
  <adapath name="associations-A-B"/>
</e2enp:qoscfg>
```

XML EXAMPLE 32

Bid-2.1—only referencing media stream 206 AP and Group AP (with respect to stream associations)

```
<e2enp:purpose>
  <session user="Mary" session-id="2890844526"
     version="2890842807" nettype="IN"
     addrtype="IP4" addr="43.196.180.1">
    <expires time="3600"/>
  </session>
  <use>
    <session user="Mary"
    session-id="2890843112"
    version="2890841393" nettype="IN"
    addrtype="IP4" addr="43.196.180.1"/>
  </use>
  <description
    type="request"
    name="negotiation"
    mode="push"/>
</e2enp:purpose>
<cfg>
  <component name="audio-stream-1"
    media="audio">
    <alt name="AVP-audio-0">
      <rtp:session format="rtp-avp-0">
        <rtp:udp role="receive"
        nettype="IN" addrtype="IP4"
        addr="43.196.180.1"
        rtp-port="7800"
        rtcp-port"7801"/>
      </rtp:session>
    </alt>
    <alt name="AVP-audio-9">
      <rtp:session format="rtp-avp-9">
        <rtp:udp role="receive"
        nettype="IN" addrtype="IP4"
        addr="43.196.180.1"
        rtp-port="7840"
        rtcp-port="7851"/>
      </rtp:session>
```

-continued

```
        </alt>
    </component>
    <component name="video-stream-1"
      media="video">
      <alt name="AVP-video-34">
        <rtp:session
        format="rtp-avp-34">
          <rtp:udp role="receive"
          nettype="IN" addrtype="IP4"
          addr="43.196.180.1"
          rtp-port="7900"
          rtcp-port="7901"/>
        </rtp:session>
      </alt>
      <alt name="AVP-video-31">
        <rtp:session
        format="rtp-avp-31">
          <rtp:udp role="receive"
          nettype="IN" addrtype="IP4"
          addr="43.196.180.1"
          rtp-port="7920"
          rtcp-port="7921"/>
      </rtp:session>
    </component>
  </cfg>
```

XML EXAMPLE 33

Answer-2.2—only referencing media stream 206 AP and Group AP (with respect to stream associations)

```
  <e2enp:purpose>
    <session user="Mary" session-id="2890844526"
        version="2890842807" nettype="IN"
        addrtype="IP4" addr="43.196.180.1">
      <expires time="3600"/>
    </session>
    <use>
      <session user="Mary"
      session-id="2890843112"
      version="2890841393" nettype="IN"
      addrtype="IP4" addr="43.196.180.1"/>
    </use>
    <description
      type="response"
      name="negotiation"
      mode="push"/>
  </e2enp:purpose>
  <cfg>
    <component name="audio-stream-1"
      media="audio">
      <alt name="AVP-audio-0"/>
      <alt name="AVP-audio-9"/>
    </component>
    <component name=" audio-stream-1"
      media="video">
      <alt name="AVP-audio-34"/>
      <alt name="AVP-audio-31"/>
    </component>
  </cfg>
```

XML EXAMPLE 34

In this case, both the offerer 914 and the answerer 911 implicitly agree on enforcing the pre-negotiated APs, by starting media streaming with the contracts 1108 indicated by the <default> construct.

Should either peer decide otherwise due to some conditions applying at the time of the negotiation 806 (and of the start of media streaming, which would apply immediately after negotiation 806), a reduced version of the <e2enp:qoscfg> could be included, indicating the new default contract 1108(s).

Remember that the default state corresponds, in the Hierarchical FSM model, to the initial state of a given (eventually nested) FSM.

In case of re-negotiation 808, the "mode" attribute of the <e2enp:purpose> section is not used.

```
Peer A: Receiver/Answerer 911 - Peer B:
Sender/Offerer 914
B: detected QoS violation/change:
    select new QoS level to enforce from pre-
negotiated APs ⇒bid-3.1
B: Local-Admission-Control (bid-3.1):
    successful
B: Local-Resource-Reservation (bid-3.1):
    successful
B: DO (bid-3.1) -> A (See Note (3))
A: Local-Admission-Control (bid-3.1):
    answer-3.1 ⊆bid-3.1
A: Local-Resource-Reservation (answer-3.1):
    successful
A: 200 OK (answer-3.1 - See Note (4)) ->B
B: DO (command-start-reservation) -> A
A: 200 OK
A: Network 604 reservation (based on answer-
3.1)
B: Network 604 reservation (based on answer-
3.1)
A. COMET (command-ready-reservation) -> B
B: 200 OK (of COMET) -> A
B. COMET (command-ready-reservation) -> A
A: 200 OK (of COMET) -> B
```

Note (1):
Both peers reserve resources corresponding to the re-negotiated QoS levels, by adding any required resource and/or releasing any excess resource., with respect to the amount of previously reserved resources.
Note (2):
For a description of the "Command-start-reservation" and "Command-stop-reservation" please refer to the description above.
Note (3):
The DO method uses the simple, reliable acknowledgement mechanism of the BYE method. Other methods are also possible. For instance the use of a re-INVITE would enforce the three-way acknowledgement, which guarantees that the peers begin media streaming with the new QoS level in a coordinated and safe manner.It might be useful for forcing the peer to use another terminal or for performing an end-to-end QoS full re-negotiation 808. The choice of the right method is open for discussion.
Note (4):
The "Answer-3.1" in this message features the attribute "type" set to "start-reservation".

In the following section, the SIP message bodies indicated with the keywords bid-x, answer-y in the previous examples shall be described.

Bid-3.1

In this example, with respect to the information already negotiated during previous phases (the last of which is identified by the <session> element wrapped by the <use> element of the <e2enp:purpose> section), peer B requests peer A to enforce an alternative QoS contract. More specifically, peer B requests peer A to enforce the stream-level QoS contract 1108 "video-contract-2", instead of the default one "video-contract-1", with respect to the video media stream 206 "video1" of the currently active association, "association-1". This command is expressed via the <enforce> section. In this XML fragment, the use of XPath is shown in a simplified way in order to capture the concept of the <enforce> section. A rigorously formal description of the overall hereby-proposed SDPng extensions will be provided at a later time.

Furthermore, peer A can discover that video-contract-1 is no longer applicable with the new type of access network 604/network provider: therefore peer A signal a "block" for that contract 1108. Should spare contracts 1108 be available and now valid, an "unblock" signal could also be included in this bid.

```
<e2enp:purpose>
   <session user="Mary" session-id="2890844526"
         version="2890842807" nettype="IN" addrtype="IP4"
         addr="43.196.180.1">
       <expires time="3600"/>
   </session>
   <use>
       <session user="Mary" session-id="2890843112"
       version="2890841393" nettype="IN" addrtype="IP4"
       addr="43.196.180.1"/>
   </use>
   <description
       type="request"
       name="re-negotiation"/>
</e2enp:purpose>
<e2enp:enforce>
  <xsl:variable name="association">
    <xsl:value-of
    select="//adapath[@name='associations-A-B']/alt[@ref__context='association1-1']"/>
  </xsl:variable>
  <xsl:variable name="stream">
   <xsl:value-of
    select="//context[@name="$association"]/comp[@ref__adapath='Video1']/"/>
  </xsl:variable>
  <xsl:variable name="contract">
   <xsl:value-of
    select="//adapath[@name="$stream"]/alt[@ref__contract='video-contract-2']/"/>
  </xsl:variable>
  <target name="$contract"/>
</e2enp:enforce>
<e2enp:block>
  <xsl:variable name="association">
    <xsl:value-of
      select="//adapath[@name='associations-A-B']/alt[@ref__context='association1-1']"/>
  </xsl:variable>
  <xsl:variable name="stream">
    <xsl:value-of
     select="//context[@name="$association"]/comp[@ref__adapath='video1']/"/>
  </xsl:variable>
  <xsl:variable name="contract">
    <xsl:value-of
     select="//adapath[@name="$stream"]/alt[@ref__contract='video-contract-1']/"/>
  </xsl:variable>
  <target name="$contract"/>
</e2enp:block>
```

XML EXAMPLE 35

Alternatively, peer B can also simply indicate to peer A some higher-level information, in which peer A would then resolve the remaining lower-level information by resorting to default values. For instance, the following <e2enp:enforce> section:

```
<e2enp:enforce>
   <xsl:variable name="association">
       <xsl:value-of
       select="//adapath[@name='associations-A-B']/
       alt[@ref__context='association1-1']"/>
   </xsl:variable>
   <xsl:variable name="stream">
     <xsl:value-of
     select="//context[@name="$association"]/
     comp[@ref__adapath='video1']/"/>
   </xsl:variable>
   <target name="$stream"/>
</e2enp:enforce>
```

XML EXAMPLE 36 would force peer A to use "video-contract-1" for the "video1" media stream 206, since that contract 1108 was specified as default in the pre-negotiated <e2enp:qoscfg> section. Furthermore, peer B can request peer A to switch to a totally different group of media streams 206, selected out of the pre-negotiated information. For instance, assumed the currently active association of media streams 206 between peer A and peer B is "association1-1", peer B can request peer A to select the "association1-2", like in the following example of <e2enp:enforce> section:

```
<e2enp:enforce>
   <xsl:variable name="association">
     <xsl:value-of
      select="//adapath[@name='associations-A-B']/
      alt[@ref__context='association1-2']]"/>
   </xsl:variable>
   <target name="$association"/>
</e2enp:enforce>
```

XML EXAMPLE 37

Answer-3.1

According to requirement 31, the answerer 911 should limit its reaction to either approve the offerer 914's bid, or simply choose a lower QoS level, to be selected from pre-negotiated information. Following the example indicated in the previous-paragraph, peer A could then choose either to accept the proposal as is, or select an alternative option out of the pre-negotiated information, which still satisfies the original bid of the offerer 914.

In the former case, the “Answer-3.1” would look like the following:

```
<e2enp:purpose>
  <session user=“Mary” session-id=“2890844526”
      version=“2890842807” nettype=“IN” addrtype=“IP4”
      addr=“43.196.180.1”>
    <expires time=“3600”/>
  </session>
  <use>
    <session user=“Mary” session-id=“2890843112”
    version=“2890841393” nettype=“IN” addrtype=“IP4”
    addr=“43.196.180.1”/>
  </use>
  <description
    type=“response”
    name=“re-negotiation”/>
</e2enp:purpose>
```

XML EXAMPLE 38

The absence of the <e2enp:enforce> section in the answerer 911's response indicated that the answerer 911 has agreed on the offerer 914's bid.

In the case the answerer 911 (peer A in this example) preferred a lower QoS level, the “Answer-3.1” would look like the following:

```
<e2enp:purpose>
      <session user=“Mary” session-id=“2890844526”
            version=“2890842807” nettype=“IN” addrtype=“IP4”
            addr=“43.196.180.1”>
         <expires time=“3600”/>
      </session>
      <use>
         <session user=“Mary” session-id=“2890843112”
         version=“2890841393” nettype=“IN” addrtype=“IP4”
         addr=“43.196.180.1”/>
      </use>
      <description
         type=“response”
         name=“re-negotiation”/>
</e2enp:purpose>
<e2enp:enforce>
   <xsl:variable name=“association”>
      <xsl:value-of
      select=“//adapath[@name=‘associations-A-B’]/alt[@ref_context=‘association1-1’”/>
   </xsl:variable>
   <xsl:variable name=“stream”>
     <xsl:value-of
        select=“//context[@name=“$association”]/comp[@ref_adapath=‘video1’]/”/>
   </xsl:variable>
   <xsl:variable name=“contract”>
     <xsl:value-of
     select=“//adapath[@name=“$stream”]/alt[@ref_contract=‘video-contract-3’]/”/>
   </xsl:variable>
   <target name=“$contract”/>
</e2enp:enforce>
```

XML EXAMPLE 39

In this example, it shall be assumed that a video-contract-3 defining a lower level of QoS compared to the one defined by the proposed video-contract-1, has been previously negotiated between the two peers (not shown in the previous examples). Alternatively, peer A can specify a lower level of QoS by specifying another association, like described in the previous paragraph:

```
<e2enp:purpose>
  <session user=“Mary” session-id=“2890844526”
      version=“2890842807” nettype=“IN” addrtype=“IP4”
      addr=“43.196.180.1”>
    <expires time=“3600”/>
  </session>
  <use>
    <session user=“Mary” session-id=“2890843112”
    version=“2890841393” nettype=“IN” addrtype=“IP4”
    addr=“43.196.180.1”/>
  </use>
  <description
    type=“response”
    name=“re-negotiation”/>
</e2enp:purpose>
<e2enp:enforce>
 <xsl:variable name=“association”>
  <xsl:value-of
  select=“//adapath[@name=‘associations-A-B’]/
  alt[@ref_context=‘association1-2’”/>
 </xsl:variable>
 <target name =“$association”/>
</e2enp:enforce>
```

XML EXAMPLE 40

In the following section, a pre-negotiation 802 in a one-to-many communication scenario 200 shall be described:

Push mode

Peer A: Offerer 914 - Peers $B_1$ ... $B_n$: Answerers 106a2
A: Local-Admission-Control: (bid-1.1)
  successful
A: OPTIONS (bid-1.1) -> $B_j$
$B_j$: Local-Admission-Control (bid-1.3):
  answer-1.1.$B_j$
$B_j$: 200 OK (answer-1.3.$B_j$) -> A  $j \in \{1,n\}$ Note (1): the various answers "Answer-1.1.$B_j$" can coincide, partially differ, or differ completely from each other. Substantially they are equivalent to "Answer-1.1" described above.

Note (2): after receiving all replies from peer $B_j$, peer A may enforce QoS correlation 804 and time synchronization 805 constraints, and thus re-negotiate with peers $B_j$ new lower QoS levels.

Pull mode

Peers $A_1$ ... $A_n$: Offerers 106b - Peer B: Answerer 911
$A_j$ : OPTIONS -> B
B: 200 OK (bid-1.2) -> $A_j$
$A_j$: Local-Admission-Control (bid-1.2):
  answer-1.2.$A_j$
$A_j$: OPTIONS (answer-1.2.$A_j$) -> B
$B_j$: Local-Admission-Control (answer-1.2.$A_j$):
  successful
B: 200 OK (answer-1.2.$A_j$) -> $A_j$  $j \in \{1,n\}$ Note (3): the various answers "Answer-1.2.$A_j$" can coincide, partially differ, or differ completely from each other. Substantially "Answer-1.2.$A_j$" are equivalent to "Answer-1.2" described above. "Bid-1.2" is substantially equivalent to the one described above as well.

Note (4): during local admission control, peer B could enforce QoS correlation 804 and time synchronization 805 constraints before replying to each peer $A_j$, but the various $A_j$ generally carry out this E2ENP 908 phase independently of each other.

Therefore, it is not generally possible to withhold replies to OPTIONS beyond the corresponding SIP timer duration. Alternatively, peer B can decide to accept request within a certain time window, after which peer B can enforce QoS correlation 804 and time synchronization 805 constraints and consequently carry out new pre-negotiations 802 with each peer $A_j$.

In this case, peer B would then take the offerer 914 role. As an example, peer B could be a sender like in the lecture scenario, which pre-negotiates QoS with each receiver first individually, and then eventually reruns some pre-negotiation 802 in order to enforce QoS correlation 804 and time synchronization 805 constraints.

Pre-negotiating bi-directional connections for the case one-to-many may result in an actual many-to-many connection; therefore this case is not treated here.

Bi-directional negotiation 806 is not hereby presented, since this might result in a case of many-to-many scenario, in which particular attention to synchronization issues should be paid. The following scenario are thus valid for the case where the "One" peer of the one-to-many relationship is a sender (receiver) and each of the "Many" peer of such relationship is a receiver (sender).

Push mode

Peer A: Offerer 914 - Peers $B_1$ ... $B_n$: Answerers 106a2
A: Local-Admission-Control (bid-2.1 - see Note (1)):
  successful
A: Local-Resource-Reservation (bid-2.1):
  successful
A: INVITE (bid-2.1) -> $B_j$
$B_j$: Local-Admission-Control (bid-2.1):
  answer-2.1.$B_j$ ⊆bid-2.1
$B_j$: Local-Resource-Reservation (answer-2.1.$B_j$):
  successful
$B_j$: 183 Session Progress (answer-2.1.$B_j$) -> A
A: Eventually correlates media streams 206 coming from or going to the different $B_j$
A: Local-Resource-Reservation (answer-2.1.$B_j$):
  successful (Note (2))
A: PRACK (command-start-reservation) -> $B_j$
$B_j$: 200 OK (of PRACK)
  (command-start-reservation) -> A
A: Network 604 reservation (Note (3))
$B_j$: Network 604 reservation (Note (4))
$B_j$: COMET (command-ready-reservation) -> A
A: 200 OK (of COMET) -> $B_j$
A. COMET (command-ready-reservation) -> $B_j$
$B_j$: 200 OK (of COMET) -> A
$B_j$: 180 Ringing -> A
$B_j$: 200 OK (of INVITE) -> A
A: ACK -> $B_j$  $j \in \{1, n\}$ Note (1):
"Bid-2.1" is substantially equivalent to the one described in the preceding examples.
Note (2):
Balance resources upon the answers of $B_j$ by releasing any excess resource.
Note (3):
By using the command-start-reservation signaling, peer A will be able to determine if and when the network resource reservations should be carried out based on all {"Answer-2.1.$B_j$"}, or only on whatever subset thereof is currently available.
Note (4):
Based on the $B_j$'s answer-2.1.$B_j$ Pull mode Peers $A_1$ ... $A_m$: offerers 106b - Peer B: answerer 911
$A_j$: INVITE -> B
B: Local-Admission-Control (bid-2.2):
  successful
B: Local-Resource-Reservation (bid-2.2):
  successful
B: 183 Session Progress (bid-2.2.$A_j$) -> $A_j$
$A_j$: Local-Admission-Control (bid-2.2.B):
  answer-2.2.$A_j$ ⊆bid-2.2 (Note (5))
$A_j$: Local-Resource-Reservation (answer-2.2.$A_j$):
  successful
$A_j$: PRACK (answer-2.2.$A_j$ - see Note (6)) -> B
B: Eventually correlates media streams 206 coming from- or going to- the different $A_j$
B: Local-Resource-Reservation (answer-2.2.$A_j$):
  successful
B: 200 OK (of PRACK)
  (command-start-reservation) -> $A_j$
$A_j$: Network 604 reservation (Note (7))
B: Network 604 reservation (based on all {answer-2.2.$A_j$})
B. COMET (command-ready-reservation) -> $A_j$
$A_j$: 200 OK (of COMET) -> B
$A_j$. COMET (command-ready-reservation) -> B
B: 200 OK (of COMET) -> $A_j$
B: 180 Ringing -> $A_j$ -continued

|  |  |
|---|---|
| B: 200 OK -> $A_j$ | |
| $A_j$: ACK -> B | j ∈ {1, m} |

Note (5):
The various answers "Answer-2.2.$A_j$" can coincide, partially differ, or differ completely.
Note (6):
"Bid-2.2" and "Answer-2.2.$A_j$" are substantially equivalent to (correspondingly) "Bid-2.1" and "Answer-2.1", except for the <e2enp:purpose> section, which features the attribute "mode" set to "pull" and, in the case of "Answer-2.2.$A_j$", the attribute "name" set to "start-reservation".
Note (7):
Based on the $B_j$'s "Answer-2.2.$A_j$".
Note (8):
By using the command-start-reservation signaling, peer A will be able to determine if and when network resource reservations should be carried out based on all {"Answer-2.2.$A_j$"}, or only on whatever subset thereof is currently available.

Negotiating bi-directional connections for the case one-to-many may result in an actual many-to-many connection; therefore this case is not treated here.

In general, the re-negotiation 808 of multi-party connections (as the one-to-many connections are), should be considered equivalent to the case of one-to-one connections. The requirement 37 leads to only two special cases, when more than one media stream 206 should be re-negotiated simultaneously. These two cases are determined by the following circumstances:

- If the central component (the "one") discovers a violation, it should check if the affected media stream 206 is a media stream 206 of a group and if it belongs to a group, is the context of the group in sense of QoS affected. By single media streams 206 and by discovering that the context of the group is not affected the central component performs one-to-one negotiation 806 with the respective peer, otherwise the central component performs one-to-many re-negotiation 808 as described in the first case below.
- If one of the "many" discovers a violation it signals this the central component in one-to-one fashion, since the "many" do not know-about the eventual media stream 206 grouping performed by the central component. In order to decide how to proceed the central component checks the dependencies of the affected media stream 206:
  - If the media stream 206 does not belong to a group or the context of the group is not affected, the central component continues the negotiation 806 in one-to-one fashion.
  - If the central component discovers dependencies affecting not only the single media stream 206, it signals the waiting offerer 914 (as described below—case 2) that from now on it would be responsible for the re-negotiation 808. The offerer 914 should cancel its call and wait for an offer from the central component.

The following are the examples on the two one-to-many re-negotiation 808 cases:

1. The central party of a given one-to-many connection discovers a violation affecting a single media stream 206 of the given group thereof and, according to the profile settings (i.e. to the pre-negotiated high-level APs) of this group, performs the necessary adaptation of the whole media stream 206 group. In the case one-to-many connections, it is in fact only the peer acting as the "one", who takes care of media stream 206 grouping.

```
Peer A: The peer acting as "one" discovers the violation -
Peers B1..Bm: affected peers
A: detected QoS violation/change:
    select new QoS level to enforce from pre-
    negotiated APs ⇒bid-A|Bj
    (bid-1j may be the same or different for every
    Bj)
A: Local-Admission-Control (bid-A|Bj):
    successful
A: Local-Resource-Reservation (bid-A|Bj):
    successful
A: Do (bid-A|Bj) -> Bj
Bj: Local-Admission-Control (bid-A|Bj):
     answer-Bj ⊆bid-A|Bj
     (answer-Bj is drawn from pre-negotiated APs, and
may be the same or different for every Bj)
Bj: Local-Resource-Reservation (answer-Bj):
     successful
Bj: 200 OK (answer-Bj) ->A
A: Eventual reconfiguration of the stream-group to
    meet the requirements of the single Bj-s and avoid
    eventual multiple-source of failure caused by one
    or many peers of the affected group.
A: DO (command-start-reservation) -> Bj
Bj: 200 OK->A
Bj: Network 604 reservation (based on answer-Aj)
A: Network 604 reservation (based on all answer-Aj)
Bj. COMET (command-ready-reservation) -> A
A: 200 OK (of COMET) -> Bj
A. COMET (command-ready-reservation) -> Bj
Bj: 200 OK (of COMET) -> A                    j ∈ {1,m}
```

2. One of the "many" peers discovers a violation:

```
Peer B: one of the "many", discovering the violation -
Peers A: Responsible for the media stream 206 grouping
B: detected QoS violation/change:
    select new QoS level to enforce from pre-
negotiated APs ⇒bid-1
B: Local-Admission-Control (bid-1):
    successful
B: Local-Resource-Reservation (bid-1):
    successful
B: DO (bid-1) -> A
A: Check the necessity of the group reconfiguration:
   Reconfiguration necessary
A: 200 OK(answer-1)-> B (The answer-1 signalizes that
A is notified about the violation and is ready to take
care).
... The rest is like the example above
```

In the following, an example of how third-party-assisted negotiation using the E2ENP 968 shall be described.

The negotiating parties are:

A—the peer for which the mediation is being done,
B—the mediator peer **106*a*1**, and
C—the offerer peer 914, which addresses the mediator **106*a*1**.

The third-party-assisted negotiation is being triggered when an offerer 914 calls a mediating device and this respective peer discovers that it cannot handle the call itself but has the possibility to delegate the call to another answerer 911. The discovered answerer 911 is an alternative device from the perspective of the mediator **106*a*1, which the calling offerer 914 may use instead of the mediator 106*a*1 and by respective approval of the user, which device the mediator 106*a*1** is.

The purpose of pre-negotiations 802 with a mediator **106*a*1 is to allow the mediator 106*a*1 gathering information about those peers, which may be involved in possible-future redirections. The mediator 106*a*1 may do this by using some service discovery mechanism like JINI as described in documents published by JINI™ Network 604 Technology (cf. http://www.sun.com/jini/), in the following referred to as [JINI], Bluetooth SDP as described in [BLUE], etc., or by directly calling the affected peers for which the facilitation is being done. In the latter case, the pre-negotiation 802 can be performed similarly to the case of one-to-one pre-negotiations 802, in which the mediator 106*a*1 acts as the offerer 914 and the peer, for which the mediation is done, acts as the answerer 911. To this extent, a special indication in the <e2enp:purpose> section is required, to indicate that the offerer 914 is the mediator 106*a*1** (<mediation mode="third-party-assisted"/>).

In the case that the party for which the mediation is done starts the pre-negotiation 802 with the mediator **106*a*1** the SIP scheme is as follows:

A: REFER ->B
B: 202 Accepted ->A
B: OPTIONS -> A
A: 200 OK (answer) ->B
B: NOTIFY (answer or reference to the answer)->A
A: 200 OK The mediator **106*a*1 just picks the settings of A (answer) and uses them to perform the mediation. The pre-negotiation 802 between the mediating peer and the offerer 914 is very much the same as by the one-to-one pre-negotiation 802 with the indication in the purpose section that the answerer 911 is the mediator 106*a*1 (<mediation mode="third-party-assisted"/>). The offerer 914 should use push or push-pull mode to trigger the facilitating functionality of the mediator 106*a*1. Instead of using "200 OK" as answer for the OPTIONS the mediator 106*a*1 uses "380 Alternative Service" thus indicating that it is not the peer which is going to communicate. The offerer 914 is already informed on this stage about the existence of an alternative peer and in some cases, where the called user is informed and agrees on the usage of the alternative peer, the offerer 914 may directly start a negotiation 806 with the alternative peer by applying the one-to-one negotiation 806** scheme.

The third-party-assisted negotiation should always be performed in push or push-pull mode with the mediator **106*a*1** in order to trigger the facilitating functionality of the mediating peer in case it cannot support a bid.

C: Local admission control (bid1):
  successful
C: Local resource reservation (bid1):
  successful
C: INVITE (bid1)->B
B: Local admission control (bid1): unsuccessful (B cannot support such settings as in bid1)
B: 183 Session Progress (answer1) ->C (answer1 contains information that B would be a mediator 106a1 and C should expect eventually 380 Alternative Service as a reply later)
C: PRACK ->B
B: 200 OK(PRACK) ->C
B: Check, if alternatives are available (Ask naming, registration service): successful
B: Check alternatives (These are the settings of A, which B eventually knows from a pre-negotiation 802): successful
B: Ask if the user agrees on the call: successful (This information can be retrieved from the user profile or by direct signaling the user on the spot, e.g. by popping up a GUI window or by playing a tone.)

-continued

B: INVITE (bid2) ->A
  (bid2 is a combination of bid1 and indication that B is a mediator 106a1)
A: Local admission control (bid2):
  answer2 $\subseteq$bid2
A: 200 OK (answer2)
B: ACK->A
B: Inform the user that the call is being redirected and on what device.
B: Reconfigure answer2 to inform C, which is the alternative service:
  answer2a
B: 380 Alternative Service (answer2a) ->C
B: BYE ->A
A: 200 OK ->B As a result of this negotiation, peer C knows who is peer A and the settings of it and can start a normal one-to-one negotiation with it (see one-to-one negotiation 806 example).

Performing a re-negotiation 808 over a mediator **106*a*1 makes sense only in case of full re-negotiation 808 when a new device should be chosen to communicate with, otherwise the re-negotiation 808 would become too complex. This would in fact contradict the requirement of simplicity of E2ENP 908, and would be in any case not really logical, since the offerer 914 already knows from the negotiation 806 phase who exactly its answerer 911 is. By re-negotiation 808 going over a mediator 106*a*1, the mediator 106*a*1 acts as a proxy. In the case of full re-negotiation 808 this process is the same as the pre-negotiation 802 and negotiation 806 described above. By re-negotiation 808, the mediator 106*a*1** should also fulfill the requirement on the completeness of the negotiated data.

The construction and the negotiation 806 of the many-to-many communication scenarios 300, 400 and 500 are context-dependant with respect to the considered scenarios, e.g. conferencing, gaming, etc. A general solution is not possible for this case, but taking some ready, topic-dependant scenarios as described in "Models for Multi-party Conferencing in SIP 910" (IETF SIP 910PING Working Group, work in progress, <draft-rosenberg-sip-conferencing-models-01.txt>) by J. Rosenberg and H. Schulzrinne, in the following referred to as [Rosen01], and "Models for Multi-party Conferencing in SIP" (IETF SIPPING Working Group, work in progress, <draft-ietf-sipping-conferencing-models-00.txt>) by J. Rosenberg and H. Schulzrinne, in the following referred to as [Rose00a], and developing them in terms of E2ENP 908 should help to understand how E2ENP 908 functions when multi-party connections are applied. The following example taken from [Rosen00a]] and further enhanced in terms of E2ENP is connected with ad-hoc networking.

Figure 13A:
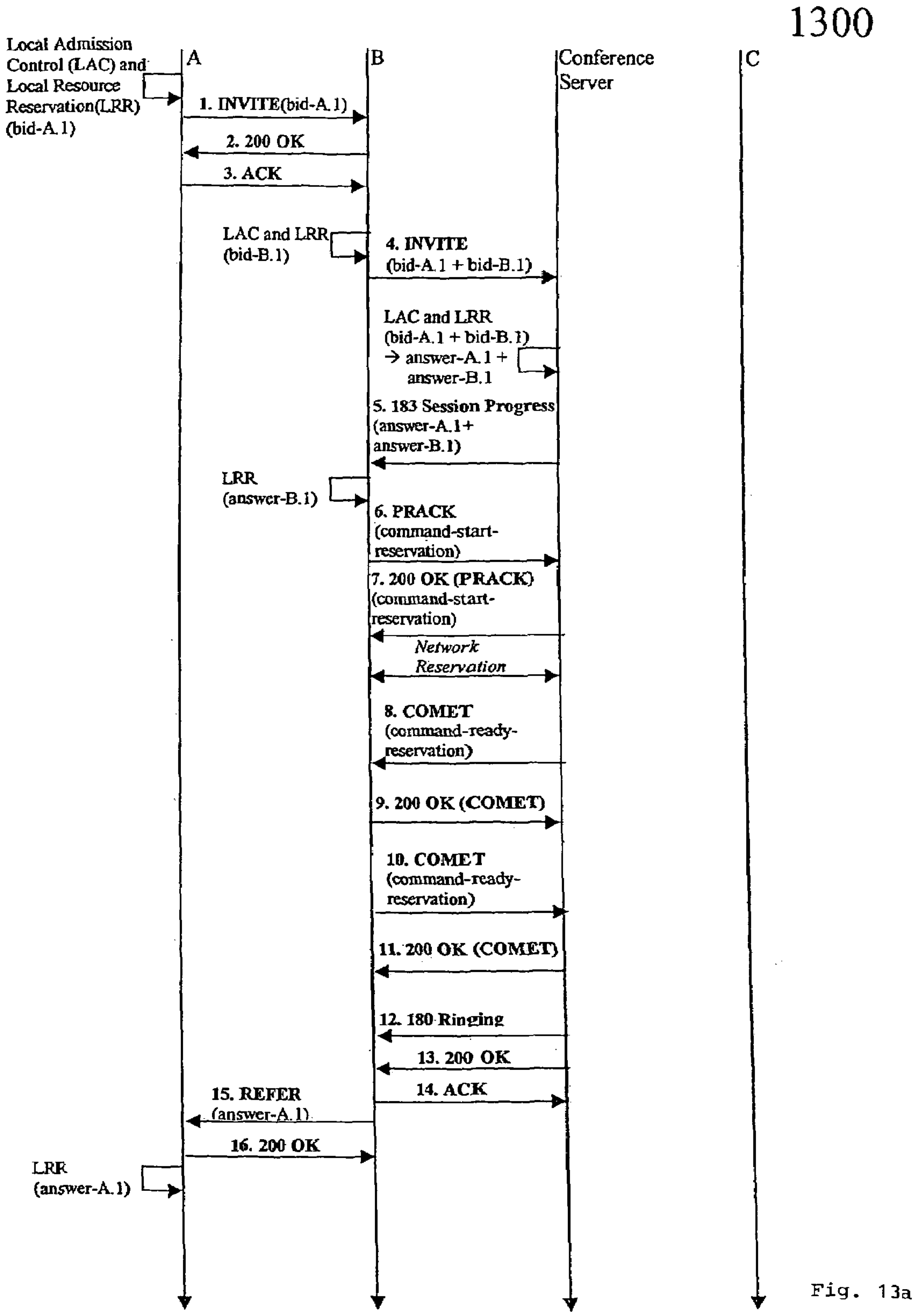
FIG. 13 shows an example of a many-to-many scenario which is called "Transitioning to Ad-hoc".
Figure 13B:
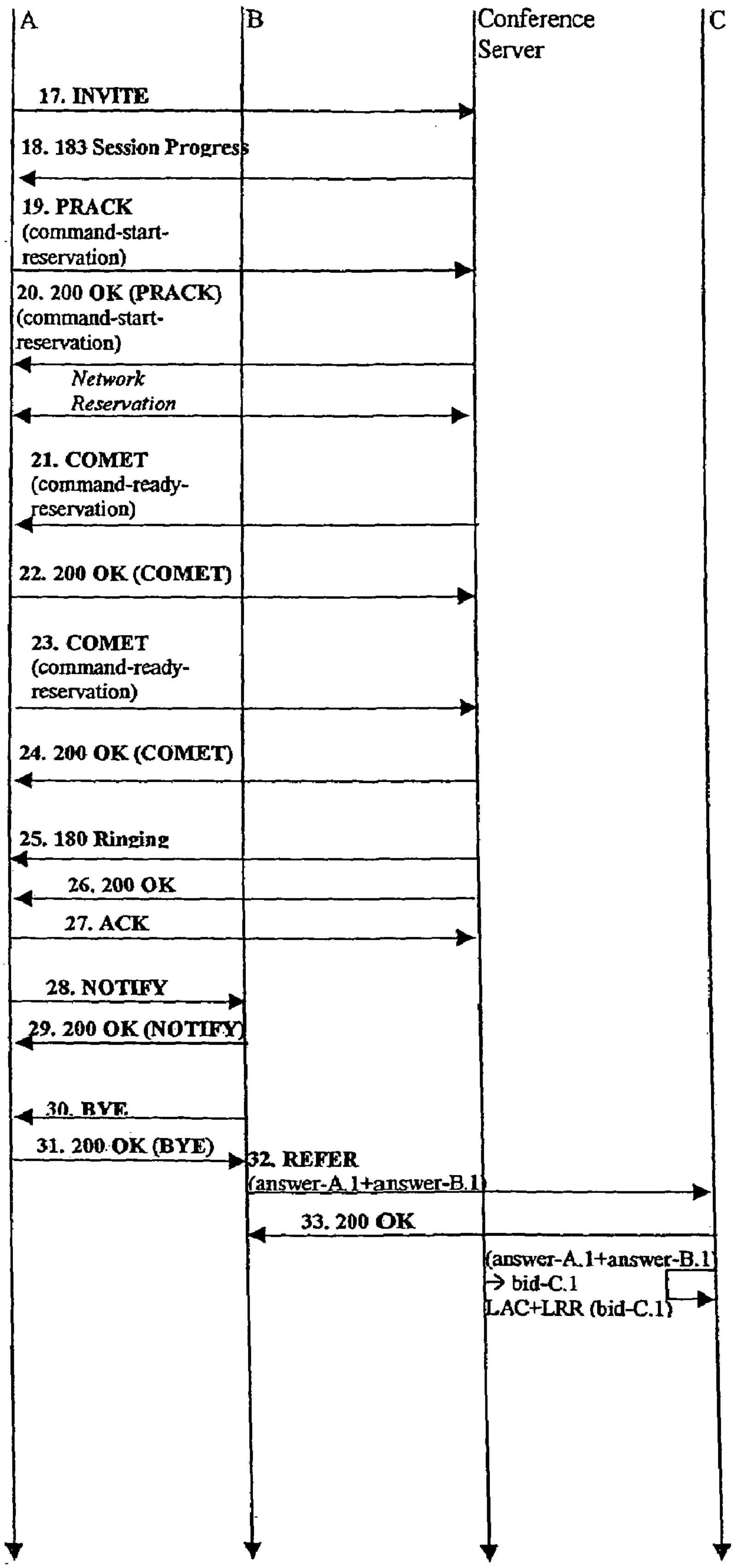

Considering the numbering in FIG. 13, the following steps are taken into account to apply the E2ENP 908:

At number 1—A supplies B with its QoS view.

At number 4—B supplies the conference server with the QoS view of A and B.

At number 4 to 14—The conf. server delivers his view on the conference (number 5) to B and B makes the reservations for himself up to the server.

At number 15—A gets to know the conference server view on the conference from B.

At number 17—A invites the conference server with the delivered from B server view on the QoS. This is just a reference to the server QoS view, since the both sides A and the conference server already know this common view.

At number 17 to 27—A makes the reservations for himself up to the server.

At number 32—B supplies C with the view of the server on the conference.

At number 34—C supplies the server with his view-on the conference restricted according to the information from B.

At number 34 to 44—C makes the reservations for himself up to the server.

At number 45—C informs B that he is ready.

At numbers 49 to 52—B additionally informs the conference server that all the partners are ready and the server should deliver a start command to all.

From this example, it is evident that some ideas from the one-to-one scenario concerning the reservations can also be applied to the peer-to-peer communication between the users and the conference server. The bids and the answers are common to those in the one-to-one negotiation example described above. This example depicts the reservation procedure with SIP messages in the same manner as in the one-to-one scenario, the only difference is what kind of messages are put as SDPng overhead. According to the example above, there are three different roles which the end peers can play:

Ad-hoc conference-initiator—Like B

Already-conference participant—Like A

New-conference participant—Like C

These three roles correspond three different communication patterns with the conference server with respect to the exchanged SDPng-messages.

The biggest communication overhead has B (the ad-hoc conference initiator), since it carries all the SDPng messages of the already-conference participants. This capability of B is a sort of mediation capability to initialize the conference by enforcing the affected peers to negotiate with the conferencing server and by ending of the negotiating to transfer the controls to the server.

The smallest communication overhead has an already-conference participant like A, since the conference server is already informed about the profile of A via B and A needs only to remind the server which profile belongs to it (cf. FIG. 13—message 17).

The new-conference-participant C gets to know the validated from the conference server profiles of the already-conference participants, thus minimizing its decision set and enabling it to meet a quicker agreement with the conference server. The communication overhead of C is thus approximately the same as by the one-to-one communication, since it has to meet the agreement with the server by itself.

The following examples illustrate some of the failure cases described above.

One-to-one communication scenario 100 pre-negotiation 802:

```
Peer A: Offerer 914 - Peer B: answerer 911
A: Local-Admission-Control (bid-1.1):
    successful
A: OPTIONS (bid-1.1) -> B
B: Local-Admission-Control (bid-1.1):
    unsuccessful
B: 600 Busy/603 Decline
```

Note (1):
The answerer 911 answers with "600 Busy" if at the moment there is no capacity to handle any call. Alternatively, the answerer 911 might answer with "603 Decline" indicating at what later time the call can take place, should this time is known. The same can be used both push and pull modes but in the pull mode the "OPTIONS" call contains no bid.

Negotiation 806:

```
Peer A: Offerer 914 - Peer B: answerer 911
A: Local-Admission-Control (bid):
    successful
A: Local-Resource-Reservation (bid):
    successful
A: INVITE (bid) -> B
B: Local-Admission-Control (bid):
    not successful
B: 600 Busy/603 Decline/606 Not Acceptable/380
Alternative Service
```

Note (2):
The answerer 911 issues "600 Busy" if some other offerer 914 was quicker with in issuing the call and occupied all the available capacities of the answerer 911. The answerer 911 issues "603 Decline" if some other offerer 914 was quicker with issuing the call and occupied all the available capacities of the answerer 911 but the answerer 911 knows how long the call shall continue. This is also the casethat a similar transaction with respect to priority is being processed at the moment and the caller has to wait. The answerer 911 issues "606 Not Acceptable" if the offerer 914 asks for QoS-support that is not available at the moment. The answerer 911 issues "380 Alternative Service" if the conditions of the offerer 914 are not acceptable for him but he knows an alternative service, which can support these conditions.This call should be used with automatic services like VoD. In any of the above cases the offerer 914 may start a new call with "OPTIONS" since the pre-negotiated conditions may no longer be valid. This scheme is applicable for all communication modes (push, pull, push-pull). The only difference between them is the sending of an initial bid with the "INVITE" or sending it later (pull mode).

Re-negotiation 808: The failure cases by the re-negotiation 808 are the same as by the negotiation 806. The respective error indications are returned as a reply to the "DO" calls of the offerer 914.

The structure of the negotiation 806 phases by the one-to-many scenario is very much like the one-to-one scenario, to this extent the E2ENP 908 error cases described in the one-to-one scenario are also valid in this case. Since the one-to-many scenario is connected with the possibility of multiple failures caused by the "many" peers, the central component (the "one") should have the ability to cope with such failures; The following are some suggestions how these may be treated:

Every negotiation 806 connection between the peer acting as the "one" and each of those acting as the "many" should be considered as single standalone one, with respect to SIP 910 signaling. In this way the peers acting as "many" involved in the negotiation 806 phase do not need to know about the failures, which some peers of the group make. The failure treatment takes place only at the central component.

If some of the negotiation 806 connections do not succeed within the time limit, they would be called at later time for repeated negotiation 806. The central component would detect this either by time-out of a SIP 910 call, or by receiving a SIP-error message from the called party. Since, E2ENP 908 has a requirement for consistency but not for isolation, it would be enough to save the current data of the unsuccessful calls to have a reference on their current state, before the failure, by the repetition of the call.

This means that no complete state saving of the E2ENP 908 runs is necessary, since no "undo" is necessary.

The central party should be able to reconfigure the media streams 206 on line. If some of the media streams 206 do not succeed to be re-negotiated within the time limit, the central component reconfigures accordingly only those which have succeeded and tries to re-negotiate the unsuccessful ones at later moment. Here again the successful negotiations 806 do not need to know that some of them failed.

The central component tries to call the parties with unsuccessful negotiation 806 several but limited number of times, e.g. 3 times. If there are parties whose negotiation 806 phases did not succeed after the 3rd call, they would be thrown out of the group and their media streams 206 would be eventually cancelled, if for example the RTP-signaling over the data connection is also nonexistent. This approach should give possibility to the unsuccessful "many" to have chance to recover and eventually start the negotiation 806 call by themselves.

The parallel performance of the negotiation 806 calls enables the quick execution of the negotiation 806. To this extent, the central component should have possibility flexibly to reconfigure its-resources. It is necessary to know how many parties in parallel the central component can serve and if this limit is exceeded the central component issues "486 Busy Here" or "380 Alternative Service" (if the central component is a service and knows an alternative one).

The following section refers to the case of a third-party-assisted E2ENP 908 in which the relocation 108 search fails:

| | |
|---|---|
| A: | Local admission control (bid1): successful |
| A: | Local resource reservation (bid1): successful |
| A: | INVITE (bid1)->B |
| B: | Local admission control (bid1): unsuccessful (B cannot support such settings as in bid1) |
| B: | 183 Session Progress (answer1) -> A (answer1 contains information that B would be a mediator 106a1 and A should expect eventually 380 Alternative Service as a reply later) |
| A: | PRACK ->B |
| B: | 200 OK (of PRACK) ->A |
| B: | Check, if alternatives are available (Ask naming, registration service): unsuccessful (the failure may happen also on the next line) |
| B: | Check alternatives (These are the settings of C, which B eventually knows from a pre-negotiation 802): unsuccessful |
| B: | 606 Not Acceptable ->A |

The mediator **106*a*1 signals that no alternative was found and the offerer 914 should call again in pull mode, adapting to the settings of the mediator 106*a*1**.

If the user declines the call relocation 108, the possible result of the negotiation 806 is:

| | |
|---|---|
| A: | Local admission control (bid1): successful |
| A: | Local resource reservation (bid1): successful |
| A: | INVITE (bid1)->B |
| B: | Local admission control (bid1): unsuccessful (B cannot support such settings as in bid1) |
| B: | 183 Session Progress (answer1) ->A (answer1 contains information that B would be a mediator 106a1 and A should expect eventually 380 Alternative Service as a reply later) |
| A: | PRACK ->B |

-continued

| | |
|---|---|
| B: | 200 OK (of PRACK) ->A |
| B: | Check, if alternatives are available (Ask naming, registration service): successful |
| B: | Check alternatives (These are the settings of C, which B eventually knows from a pre-negotiation 802): successful |
| B: | Ask if the user agrees on the call: unsuccessful (This information can be retrieved from the user profile or by direct signaling the user on the spot, e.g. by popping up a GUI window or by playing a tone, etc.) |
| B: | 480 Temporarily Unavailable / 603 Decline / 606 Not Acceptable ->A |

The mediator **106*a*1** replies with:

"480 Temporarily Unavailable", if the user does not react on the signal or the popped up window for certain time, she/he should be considered unavailable.

"603 Decline", if the user explicitly declines the call.

"606 Not Acceptable", if the user declines the delegation of the call.

If the negotiation 806 with the expected answerer 911 (the C party) is unsuccessful or the to be delegated to party does not accept the call.

| | |
|---|---|
| A: | Local admission control (bid1): successful |
| A: | Local resource reservation (bid1): successful |
| A: | INVITE (bid1)->B |
| B: | Local admission control (bid1): unsuccessful (B cannot support such settings as in bid1) |
| B: | 183 Session Progress (answer1) -> A (answer1 contains information that B would be a mediator 106a1 and A should expect eventually 380 Alternative Service as a reply later) |
| A: | PRACK ->B |
| B: | 200 OK (of PRACK) -> A |
| B: | Check, if alternatives are available (Ask naming, registration service): successful |
| B: | Check alternatives (These are the settings of C, which B eventually knows from a pre-negotiation 802): successful |
| B: | Ask if the user agrees on the call: successful (This information can be retrieved from the user profile or by direct signaling the user on the spot, e.g. by popping up a GUI window or by playing a tone, etc.) |
| B: | INVITE (bid2) ->C (bid2 is a combination of bid1 and indication that B is a mediator 106a1) |
| | ... (Something goes wrong with C) |
| B: | Inform the user of B that the relocation 108 was not successful, eventually ask what to do by popping up a window. |
| B: | 480 Temporarily Unavailable / 603 Decline / 606 Not Acceptable ->A |

The meaning of these answers is:

"480 Temporarily Unavailable", if the user does not react on the signal or the popped up window for certain time, she/he should be considered unavailable.

"603 Decline", if the user explicitly declines the call

"606 Not Acceptable", if the user wants to communicate, but the delegation of the call is gone wrong. This answer would enable the initiation of a new negotiation 806 with the mediator **106*a*1 as an answerer 911; the offerer 914** should take care of performing the new negotiation 806 in pull mode in order to adapt himself to the profile of the mediator 106*a*1 by not triggering its facilitating functionality.

In conclusion, the main advantageous differences between the underlying invention and the state of the art can briefly be summarized as follows:

use of SDPng 912 for implementing the E2ENP 908 concept, thus exploiting the flexibility offered by an XML-based document structure, definition of a clear interface between E2ENP 908 and applications, due to the use of explicit identifiers uniquely mapping a given SDPng 912 description to a given phase of the E2ENP 908 process, capability of simultaneously describing a hierarchy of QoS contexts for several multimedia streams 206, capability of simultaneously negotiating a hierarchy of QoS contexts for several multimedia streams 206, incremental negotiation of said hierarchy of QoS contexts for several multimedia streams 206, by using the concept of sessions and phases, and the concept of a multiplicity of E2ENP external mediators controlled by the Transcoding Service core is considered as a novelty proposed by this invention.

TABLE 1

Used Abbreviations

| Abbr. | Brief Description |
|---|---|
| ATM | Asynchronous Transfer Mode |
| CC/PP | Composite capabilities/Preference Profiles |
| CSCW | Computer-Supported Cooperative Work |
| E2ENP | End-to-End Negotiation Protocol (E2ENP) |
| HDTV | High Definition Television |
| HTTP | Hyper Text Transport Protocol |
| IETF | Internet Engineering Task Force |
| IP | Internet Protocol |
| IRT | Initiator-Role-Token |
| MSC | Message Sequence Charts |
| OS | Operating System |
| RDF | Resource Description Framework |
| RTP | Real Time Protocol |
| RTSP | Real Time Media streaming Protocol |
| RSVP | resource reservation Protocol |
| SAP | Session Announcement Protocol |
| SCCP | Simple Conference Control Protocol |
| SDP | Session Description Protocol |
| SIP | Session Initiation Protocol |
| VoD | Video on Demand |
| UML | Unified Modeling Language |
| XML | Extended Markup Language |

The invention claimed is:

1. A method for exchanging media streams between end peers in a network and for supporting an End-to-End Negotiation Protocol (E2ENP), comprising:

pre-negotiating a plurality of QoS contracts before an establishment of a media stream;

carrying on QoS correlation and time synchronization of multiple streams or of group of streams;

negotiating the use of one of the pre-negotiated QoS contract, before or at the time of media stream establishment, and re-negotiating a QoS contract from among said pre-negotiated contracts, after detecting at least one of a QoS change or violation, wherein a Session Description Protocol Next Generation (SDPng) content is used as an input for the E2ENP that is derived from user profile information, and wherein the ones of the plurality of QoS contracts that are not supported by a network provider of the network or an access network of an end peer are indicated as spare contracts.

2. A method according to claim 1, wherein SDPng is used for defining terminal capability information to be used as input for the E2ENP.

3. A method according to claim 1, wherein a step of pre-negotiation of resource management policies among different peers is performed.

4. A method according to claim 1, wherein an admission of the current network provider is based on the spare contracts, and a concept of state block or unblock, respectively based on the presence or absence of spare marks indicating spare contracts in the underlying contract description.

5. A method according to claim 1, wherein the spare contracts are pro-actively negotiated in such a way that they can be used in case handover situations occur and at least one of said spare contracts becomes applicable.

6. A method according to claim 1, wherein a signaling of state block or state unblock during a re-negotiation whenever a change of technology and/or a change of the respective network provider caused by a handover situation occurs.

7. A method according to claim 1, wherein a detailed mapping of E2ENP is performed over SIP via piggybacking.

8. A method according to claim 1, wherein a signaling support of third-party-assisted negotiation is provided.

9. A method according to claim 1, wherein a signaling support of one-to-many communication scenario and many-to-many communication scenarios is provided.

10. A method according to claim 1, wherein the concept of deploying E2ENP signaling sessions exploiting incrementally any negotiation result of earlier E2ENP signaling sessions is provided, whereby each E2ENP signaling session corresponds to one of the various E2ENP phases.

11. A method according to claim 10, wherein the concept of deploying E2ENP phases (micro and/or macro) logically arranged in a tree-like structure which is built by means of several reference chains is provided.

12. A method according to claim 10, wherein the concept of leasing sub-trees for different E2ENP phases (micro and/or macro) that are arranged in treelike structures is provided.

13. A method according to claim 10, wherein the concept of deploying zombie states for the delayed release of expired sub-trees for said E2ENP phases (micro and/or macro), sub-trees which are then released as soon as all pending connections are closed is provided.

14. A method according to claim 10, wherein the concept of an incremental negotiation for micro phases is provided.

15. A method according to claim 10, wherein RTP is applied, wherein a re-negotiation is performed during the media streaming of the peers that is based on a pre-negotiated state referring to a pre-negotiated quality-of-service contract and a pre-negotiated set of capabilities, and wherein a sender peer can decide to change the format of the media stream by employing other negotiated codecs and signal this change by using well-known in-band to one or more receivers by substituting the RTP payload type in the RTP header with the payload type corresponding to the new codecs whenever remaining within an agreed QoS contract, or said sender peer can explicitly use an E2ENP signaling when a QoS violation and/or a QoS change occurs, and/or QoS correlation and time synchronization constraints have to be enforced across multiple media streams.

16. A method according to claim 10, wherein media streams are stopped when bandwidth degradations occur in order to flexibly maintain telecommunication sessions.

17. A method according to claim 10, wherein peers negotiate during the pre-negotiation step sets of quality-of-service contracts on a per-stream basis and/or on a per-stream-association basis at the finest level of resolution, in which media stream associations are bundles of media streams from one sender peer to a receiver peer.

18. A method according to claim 1, wherein peers are informed about changes in quality-of-service and/or capability configurations via E2ENP signaling.

19. A method according to claim 18, wherein pre-negotiated alternative quality and configuration information of a given type of media stream may already be available at a server for clients to choose from.

20. A method according to claim 1, further comprising the steps of:

protocol discovery, pre-negotiation, multi-media stream QoS synchronization and QoS correlation, fast-negotiation deploying an economy principle, re-negotiation deploying said economy principle and resource reservation release.

21. A method according to claim 20, wherein the steps of multi-media stream time synchronization and QoS correlation phase are required if an initiator communicates with multiple peers by using multiple media streams, which need to be correlated and synchronized, based on user policies to be enforced at the initiator side only.

22. A method according to claim 21, wherein the protocol discovery and pre-negotiation phases are executed a priori, and the results are applied to multiple successive signaling sessions for establishing multiple successive telecommunication session, and each telecommunication session is initiated with a specific optional multi-media stream time synchronization and QoS correlation phase.

23. A method according to claim 22, further comprising the step of:

applying the results of the multi-media stream time synchronization phase and QoS correlation phase to multiple successive telecommunication sessions that can be initiated with a specific fast-negotiation phase.

24. A method according to claim 20, wherein the protocol interacts with Local resource management units during pre-negotiation, multi-stream time synchronization and QoS correlation, fast-negotiation, re-negotiation and resource release phases.

25. A method according to claim 20, wherein during runtime of an established multimedia session, a component of a peer may request an adaptation to trigger a re-negotiation phase.

26. A method according to claim 20, further comprising the step of:

pre-negotiation of the type of E2ENP during the protocol discovery phase, either by forcing peers to query a directory server which may be implemented as a SIP registrar, or by having the peers announcing such information.

27. A method according to claim 26, further comprising the step of:

pre-negotiation of different capabilities during said pre-negotiation phase.

28. A method according to claim 20, further comprising the step of:

pre-negotiation of a complete codec list during said pre-negotiation phase.

29. A method according to claim 20, further comprising the step of:

pre-negotiation of adaptation paths at media stream level during the pre-negotiation phase.

30. A method according to claim 20, further comprising the step of:

pre-negotiation of adaptation paths at the media stream aggregation level during the multi-stream time synchronization phase and the QoS correlation phase.

31. A method according to claim 20, further comprising the steps of:

indexing pre-negotiated QoS contracts and capabilities for speeding up the fast-negotiation phase; and indexing pre-negotiated QoS contracts and capabilities for speeding up the re-negotiation phase.

32. A method according to claim 20, further comprising the step of:

handling installation and/or deinstallation of capabilities even at runtime, by exchanging asynchronous messages among peers for notifying such events.

33. A computer readable medium having a program recorded thereon, the program configured to perform a software routine that implements a method according to claim 1 when executed by a computing device.

34. A peer configured to implement a method according to claim 1, comprising a coordination unit coordinating the different phases of the End-to-End Negotiation Protocol (E2ENP) and of the distributed resource management process, wherein the coordination unit commands a protocol discovery, and triggers and coordinates pre-negotiation, optional multi-stream time synchronization and QoS correlation, fast-negotiation with economy principle, re-negotiation with economy principle, and resource reservation release phase.

35. A peer according to claim 34, further comprising:

a session protocol unit allowing the coordination unit to carry out the different phases of End-to-End Negotiation Protocol (E2ENP).

36. A method according to claim 1, wherein the negotiation and use of session identifiers is derived from session identifier tuples via hash in order to limit the size of E2ENP PDUs, in which the complete session identifier tuples, each comprising at least one calculated hash, are used in the first PDU of any given E2ENP phase or concatenation thereof.

37. A method according to claim 1, wherein the E2ENP encompasses a third-party-assisted negotiation by means of a mediator.

38. A method according to claim 1, wherein E2ENP mechanisms are configured to enforce consistency and avoid dead locks.

39. A method according to claim 1, wherein the E2ENP is configured to handle one-to-one communication scenarios, one-to-many communication scenarios, and many-to-many communication scenarios.

40. A method according to claim 1, wherein a transcoding service used for coupling transcoding units with SIP proxies and directory services to allow the offerer using a specific transcoding unit or a chain thereof whenever required.

41. A method according to claim 40, wherein the offerer has the possibility to ask for support from the network operator or any other service provider to provide transcoding service by managing third-party negotiation among the offerer, the various transcoders in the middle, and the answerer whenever the E2ENP session between these end peers fails in case no agreement has been reached.

42. A method according to claim 40, wherein the transcoding service orchestrates the pairing of nodes in the chain of peers, and takes care that resources are properly reserved via the E2ENP economy principle.

43. A method according to claim 40, wherein a cooperation of transcoding services are offered by different providers by using the E2ENP for performing third-party negotiation.

44. A method according to claim 36, wherein the error handling of the E2ENP is performed symmetrically by applying error codes indicating failures occurring at any of the peers involved in the E2ENP.

* * * * *

UNITED STATES PATENT AND TRADEMARK OFFICE

CERTIFICATE OF CORRECTION

PATENT NO. : 7,602,723 B2
APPLICATION NO. : 10/896319
DATED : October 13, 2009
INVENTOR(S) : Mandato et al.

It is certified that error appears in the above-identified patent and that said Letters Patent is hereby corrected as shown below:

On the title page, Item (73), the Assignees' information is incorrect. Item (73) should read:

-- (73) Assignees: Sony Deutschland GmbH, Cologne (DE); Nokia Siemens Networks GmbH, & Co. KG, Munich (DE) --

Signed and Sealed this

Fourth Day of May, 2010

David J. Kappos
*Director of the United States Patent and Trademark Office*